(12) United States Patent
Moore

(10) Patent No.: US 12,744,826 B2
(45) Date of Patent: Sep. 22, 2026

(54) VIDEO CONFERENCING SYSTEMS

(71) Applicant: Sloan Moore, Dallas, TX (US)

(72) Inventor: Sloan Moore, Dallas, TX (US)

( * ) Notice: Subject to any disclaimer, the term of this patent is extended or adjusted under 35 U.S.C. 154(b) by 0 days.

(21) Appl. No.: 19/399,393

(22) Filed: Nov. 24, 2025

(65) Prior Publication Data

US 2026/0156168 A1 Jun. 4, 2026

Related U.S. Application Data

(60) Provisional application No. 63/727,147, filed on Dec. 2, 2024.

(51) Int. Cl.
*H04L 65/403* (2022.01)
*G06F 40/166* (2020.01)

(52) U.S. Cl.
CPC .......... *H04L 65/403* (2013.01); *G06F 40/166* (2020.01)

(58) Field of Classification Search
CPC ..... H04L 51/02; H04L 51/216; H04L 51/224; G06F 9/543; G06F 9/753; G06F 3/0482; G06F 3/0484
USPC ........................................................ 348/14.02
See application file for complete search history.

(56) References Cited

U.S. PATENT DOCUMENTS 11,882,386 B2 1/2024 Han et al.
11,894,940 B2 2/2024 Rensfelt et al.
2006/0195519 A1* 8/2006 Slater .................. H04L 12/1822 709/204
2012/0324005 A1* 12/2012 Nalawade .............. G06Q 10/10 709/204
2020/0036543 A1* 1/2020 Suhail .................... H04N 7/147
2022/0295014 A1 9/2022 Dhawan
2023/0164295 A1 5/2023 Benson et al.
2024/0089410 A1 3/2024 Moon
2024/0097925 A1 3/2024 Palamadai et al.
2024/0097928 A1* 3/2024 Kaptelinin .......... H04L 12/1822
2024/0195850 A1 6/2024 Rubery et al.
(Continued)

FOREIGN PATENT DOCUMENTS

CN 109670394 A 4/2019
CN 117354074 A 1/2024

*Primary Examiner* — Maria El-Zoobi
(74) *Attorney, Agent, or Firm* — Johnston IP Law, PLLC

(57) ABSTRACT

A video conferencing system organizes participants into groups based on stored organizational data and displays participants in a graphical interface with visual organization by group. The system maintains a knowledge base containing group-specific information and monitors communications during video conference calls using artificial intelligence. The system automatically provides relevant information from the knowledge base to participants during calls based on monitored communications. The system includes dynamic group reorganization capabilities that automatically reassign participants between groups or subgroups based on real-time analysis of conference data. Additional features include group isolation to virtual waiting rooms during sensitive discussions, permanent user URL login systems that eliminate multiple credential management, and automated post-call summary generation with action item extraction. The system integrates with multiple conference calling applications through a single login interface while providing contextual knowledge base access based on group membership and security permissions.

16 Claims, 32 Drawing Sheets

(56) References Cited

U.S. PATENT DOCUMENTS

2024/0202555 A1* 6/2024 Mitra .................... G06V 40/20
2024/0223726 A1 7/2024 Dotan-Cohen et al.
2025/0028579 A1* 1/2025 Mehmeri ................ H04L 51/02

* cited by examiner

VIDEO CONFERENCING SYSTEMS

RELATED APPLICATION

This application claims the benefit of U.S. Provisional Patent Application 63/727,147 filed on Dec. 2, 2024, entitled "Video Conferencing Systems," which is incorporated herein by reference for all purposes.

TECHNICAL FIELD

This application is directed, in general, to video conferencing systems, and more particularly to video conferencing systems for organizing users and dynamically displaying data to users and groups.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Video conference systems allow for virtual meetings with multiple participants through networks. Video conference systems, through network connections, connect each participant in a virtual room to facilitate such meetings. Meeting participants may utilize a device such as a personal computer, tablet, or cellular phone to attend meetings that occur on video conference systems. The systems allow for participants to connect via audio or video and to share information between participants.

Even though video conference systems are known, improvements are desired.

SUMMARY

In one embodiment, a method for conducting a video conference call includes receiving login information from a user and displaying to the user a schedule of scheduled video conference calls. The method includes receiving from the user data indicating the user's desire to attend one of the scheduled video conference calls and connecting the user to the video conference call that the user desires to attend. The method includes associating each of a plurality of participants of the connected video conference call with at least one group of a plurality of groups based on stored user data. The method includes displaying to the user each participant of the connected video conference call in a graphical interface, wherein displaying includes visually organizing and displaying each participant by the group associated with each participant. The method includes monitoring the ongoing video conference call via a knowledge base artificial intelligence subsystem to detect relevant subject matter being discussed by the participants. In response to detecting relevant subject matter, the method includes automatically searching a knowledge base for information relevant to the detected subject matter and associated with at least one of the groups. The method includes displaying the relevant information from the knowledge base to at least one participant or group in substantial real-time during the ongoing video conference call.

In another embodiment, a video conferencing system includes at least one processor and at least one non-transitory computer-readable medium storing computer program instructions. When executed by the at least one processor, the instructions cause the system to receive user login information through a single login interface and display a schedule of available video conference calls to the user. The instructions cause the system to connect the user to a selected video conference call via one of a plurality of different conference call applications and organize a plurality of participants of the video conference call into a plurality of groups based on stored participant data. The instructions cause the system to generate a graphical user interface that visually displays each participant organized by their associated group, wherein participants from each group are displayed within distinct visual containers. The instructions cause the system to access a knowledge base database containing group-specific information associated with each of the plurality of groups and monitor ongoing audio and text communications during the video conference call. The instructions cause the system to automatically search the knowledge base database for relevant information based on detected keywords or topics from the monitored communications and display the relevant information from the knowledge base database to authorized participants during the ongoing video conference call based on group membership and access permissions.

In yet another embodiment, a method for managing participants in a video conference call includes organizing a plurality of participants into a plurality of groups based on participant data using an artificial intelligence process. The method includes displaying the plurality of participants in a graphical interface with visual organization by group and accessing a database containing knowledge base information associated with at least one of the plurality of groups. The method includes monitoring communications during the video conference call using an artificial intelligence process and automatically providing relevant information from the knowledge base to at least one participant during the video conference call based on the monitored communications using an artificial intelligence process.

Other embodiments are disclosed.

DESCRIPTION OF THE DRAWINGS

Illustrative embodiments of the present disclosure are described in detail below with reference to the attached drawing figures, which are incorporated by reference herein and wherein.

DETAILED DESCRIPTION

In the following detailed description of the preferred embodiments, reference is made to the accompanying drawings that form a part hereof, and in which is shown, by way of illustration, specific embodiments in which the disclosure may be practiced. These embodiments are described in sufficient detail to enable those skilled in the art to practice the disclosure, and it is understood that other embodiments may be utilized, and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense, and the scope of the present disclosure is defined only by the claims. Unless otherwise indicated, as used throughout this document, "or" does not require mutual exclusivity.

Figure 1:
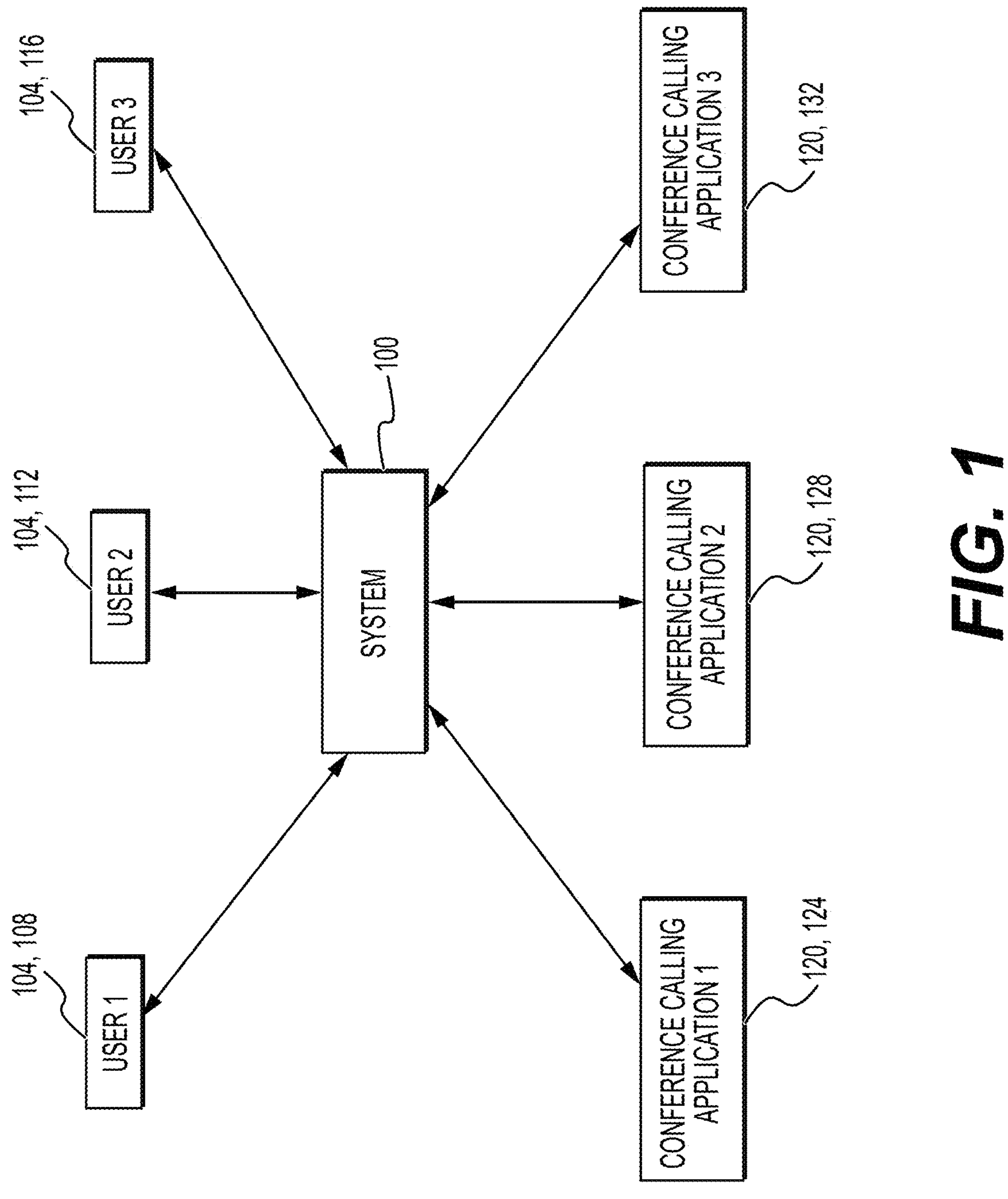
FIG. 1 presents a schematic, diagram of an illustrative embodiment of a video conferencing system in network communication with a plurality of users and a plurality of conference calling applications.

In this disclosure, some preliminary information is presented followed by a more focused disclosure beginning after that in connection with FIG. 1.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" may be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" or communication link may be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or user) device may include a computing device capable of sending or receiving signals, such as via a wired or a wireless network. A client device may, for example, include a desktop computer or a portable device, such as a cellular telephone, a smart phone (iPhone or Android or something else), a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device or mobile device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Google® Gmail, Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram®, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

Referring now primarily to FIG. 1, a video conferencing system 100 will be discussed. The video conferencing system 100 is coupled via network connections to a plurality of users 104. In FIG. 1, three users 104 (user 1 108, user 2 112, and user3 116) are shown for illustrative purposes. It will be appreciated that any number of users 104 may be associated with the video conferencing system 100 and that any number of users 104 may be connected to the video conferencing system 100 at any given time. The users 104 are individuals that desire to attend a virtual conference call.

The video conferencing system 100 is coupled by a network connection to a plurality of conference call applications 120. In FIG. 1, three conference call applications 120 are shown, which are conference call application 1 124, conference call application 2 128, and conference call application 3 132, for illustrative purposes. It should be understood that the depiction of three conference call applications 120 is illustrative and that the video conferencing system 100 may be able to connect to any number of conference call applications 120.

The conference call applications 120 are the applications that implement conference calls between the users 104 and other conference call participants. Examples of conference call applications 120 include Zoom, Teams, and the like.

The video conferencing system 100 may utilize a single login interface for users 104 regardless of the conference call application 120 that a user 104 desires to use for a virtual meeting. Once registered with the video conferencing system 100, a user 104 is assigned particular login information. Once the user 104 logs into the video conferencing system 100, the video conferencing system 100 displays scheduled calls in which the user 104 is an attendee.

The user 104 selects a particular scheduled virtual meeting that the user 104 desires to attend. The video conferencing system 100 then interfaces with the particular conference call application 120 for that virtual meeting and provides user 104 login or other identify information and meeting information to the conference call application 120 to initiate the meeting or the user's 104 participation in the virtual meeting.

As discussed in more detail below, the video conferencing system 100 facilitates, among other things, the scheduling of conference calls, the organization of users 104 participating in conference calls, and the presentation of data relevant to particular users 104. The video conferencing system 100 utilizes a knowledge base artificial intelligence sub-system 166 (FIG. 3) to organize attendees to a meeting into groups 138 (see, e.g. FIG. 2) (e.g. companies, teams, divisions, etc.) to visualize attendee groups 138 and assign to access and data mine both internal and external (API's) group assets.

Figure 2:
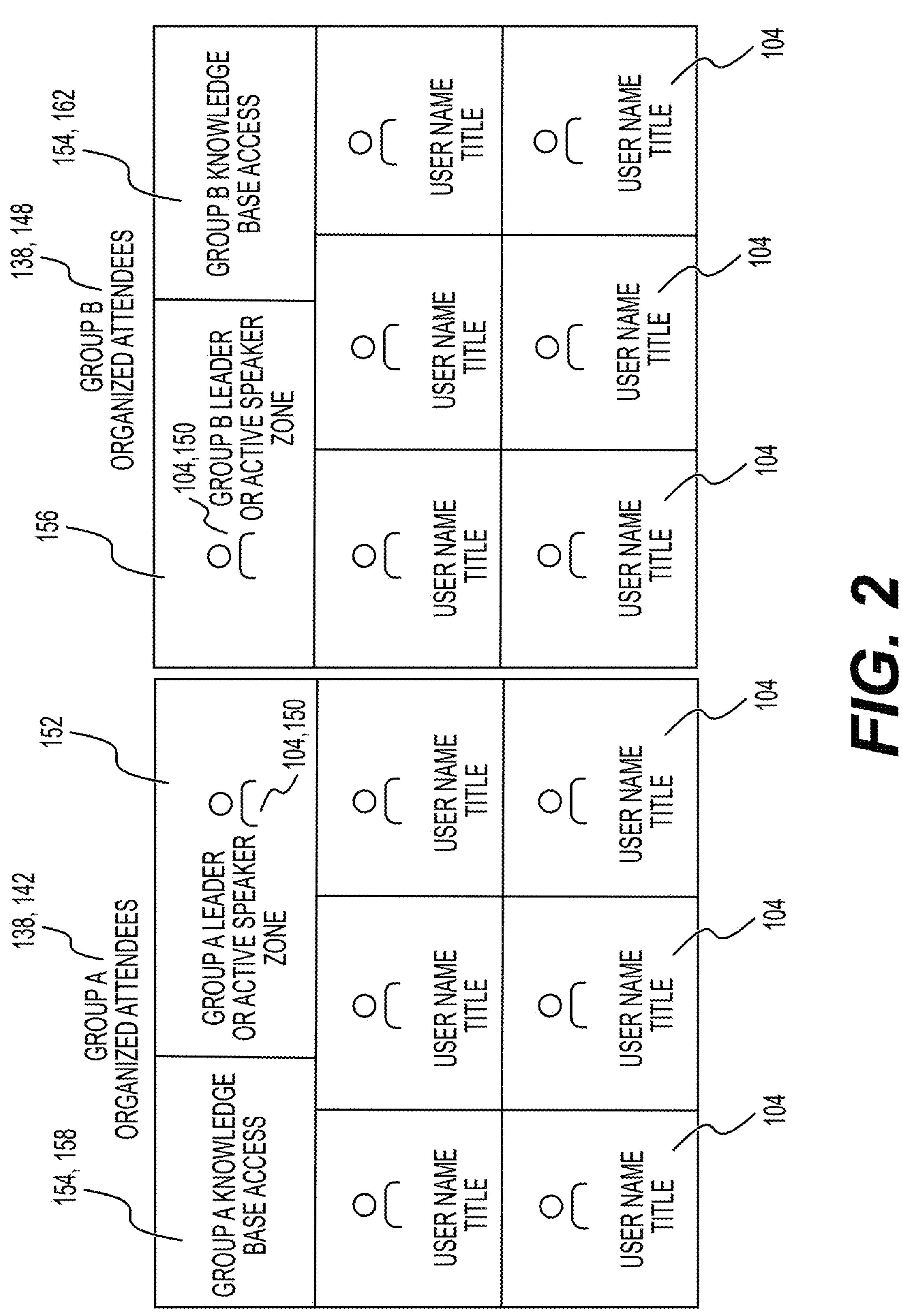
FIG. 2 presents a schematic, illustrative graphical display of participants of a video conference call of an illustrative embodiment of a video conferencing system.

Referring now primarily to FIG. 2, the use of groups 138 by the video conferencing system 100 will be described in further detail. Upon registration of a user 104 with the video conferencing system 100, data regarding the user 104 will be collected and saved within the video conferencing system 100. Such data may include the name of the user 104, the title or position of the user 104, any associations with the user 104 that may be used to place the user 104 into a particular group 138. For example, a user 104 may be associated with a company, a division within a company, a team, etc. Any association relevant to the virtual meeting may be utilized to group the user 104. In addition, groupings for a particular user 104 may vary depending on the purpose of the meeting. For example, users 104 that are participating in a video conferencing meeting that is internal within a company may be grouped by divisions within that company, but the same users 104 that are participating in a video conferencing meeting that includes members of different companies may be grouped by their associated companies.

The video conferencing system 100 eliminates confusion in virtual meetings by organizing, both visually and structurally, users 104 into groups 138. Upon joining a call every user 104 will be able to see what group 138 each other user 104 belongs to and each user 104 is visually organized on screen by the group 138 of each user 104.

FIG. 2 depicts an illustrative embodiment of the visual presentation of users 104 participating in a video conference meeting. In this example, there are two groups 138, which are group A 142 and group B 148. The users 104 may be, for example, from two different companies, and the users 104 from a first company are included in group A 142 and the users 104 from a second company are included in group B 148. The depiction of two groups is illustrative, any number of groups may be used.

The video conferencing system 100 utilizes any known associations with the user 104 to form the groups 138. Once a video conferencing call is initiated, each user 104 is depicted onscreen associated with that user's group 138. In FIG. 2, the group A 142 users 104 are organized within a box 152 onscreen and the group B 148 users 104 are organized with a box 156 onscreen. In this manner, a user 104 can quickly determine which users 104 are associated with which group 138. In some embodiments, the host may select the group criteria to be used.

In addition, relevant information regarding each user 104, such as a user name or title may be depicted along with the icon or video feed for that user 104. In some embodiments, logos or other customized branding is displayed along with the users 104 that are attending or their groups 138.

The users 104 within a particular group 138 may be further visually organized. For example, an emphasized user 150 for each group 138 may be presented towards the top of the screen or with a larger icon or video feed than other users 104, as shown in the illustrative embodiment of FIG. 2. An emphasized user 150 may be a group leader or active speaker. Executives, key speakers, or emphasized users 150 may be flagged with different coloration, placement or special icons. In some embodiments, a group leader or call organizer may be able to control the display order of users 104 within their group 138.

Another feature of the video conferencing system 100 is the display of group knowledge base information 154 relevant to the virtual meeting being conducted. In the embodiment of FIG. 2, group A 142 knowledge base information 154 is displayed in box 158 and group B 148 knowledge base information 154 is displayed in box 162. In some embodiments, the knowledge base information 154 for a particular group 138 may be displayed only to that group 138. In other embodiments, the knowledge base information 154 for a particular group 138 may be displayed to a limited number of users 104 of each group 138, including displaying to only the particular group 138 associated with the knowledge base.

One of the key structural advantages to creating groups 138 is it may allow for building knowledge base information 154 for each group 138 to access. The knowledge base information 154 for a particular group 138 may include any information relevant to the group 138 related to the subject matter of the virtual meeting. For example, the knowledge base information 154 may include information regarding group facts, industry facts, terminology, technical references, group collateral, attendee information, past presentation metrics including external questions and favored responses, or notes from a previous meeting.

Such information may be inputted in a backstage interface of the video conferencing system 100. The purpose of backstage is to be an artificial intelligence source of knowledge base information 154 that can be used to provide real-time data based on the current topic of a virtual meeting, as described further below. For example, based on questions asked or topics presented, the artificial intelligence system may suggest answers to questions asked; recommend which users 104 to call upon for information based on certain topics; or communicate securely and privately among group 138 members or specific sub-groups of users 104 discreetly while a call is ongoing. Backstage assets may also be able to incorporate outside datasets via permissioned APIs.

Such information becomes part of the knowledge base information 154 for a particular group 138 and is presented to, at least, the group 138 associated with the knowledge base information 154 in box 158, 162 during on ongoing conference call.

For example, if group A 142 is presenting to one of its customers, group B 148, and group B 148 asks for sales collateral on a specific topic or feature. The video conferencing system 100 identifies the appropriate collateral, presents it to group A 142 leaders for send-approval and, after approval, group A 142 users 104 then notify group B 148 users 104 that the collateral will be automatically provided via email or other means to group B 148 users 104 at the conclusion of the call. Alternatively, the collateral can be instantly attached to the video conferencing system 100 for access or download by group B 148 in real-time or substantial real-time or the collateral can be displayed onscreen to group B 148 users 104 in real-time or substantial real-time. Substantial real-time in some embodiments is within 5 minutes or less. Substantial real-time in some embodiments is within 2 minutes or less.

Grouping users 104 not only provides for a much more organized and visually pleasing call environment, but it also unlocks group specific elements such as group assets and group management that enable attendees to have more productive conference calls. In some embodiments, a subset of each of a group may have additional information compared to others. For example, in a job interview, a CEO may have salary information that others in the group do not.

The video conferencing system 100 better informs both users 104 of the presenting group 138 and the users 104 of other groups 138 as well as providing more granular control over group 138 users 104 attending a virtual conference. This is enabled through the use of groups 138 concept which does not rely solely on a single call host, but rather could take action as a group 138 or by a group host or leader.

By utilizing knowledge base information 154 (and potentially outside datasets via API), the video conferencing system 100 can run pre-call data driven call simulations and help tailor or give analysis to best utilize all the time of all users 104 attending a virtual call. The video conferencing system 100 can also generate a list of questions for attending groups 138 that may best address pertinent questions to their respective groups 138 based on the proposed tailored presentation.

Figure 3:
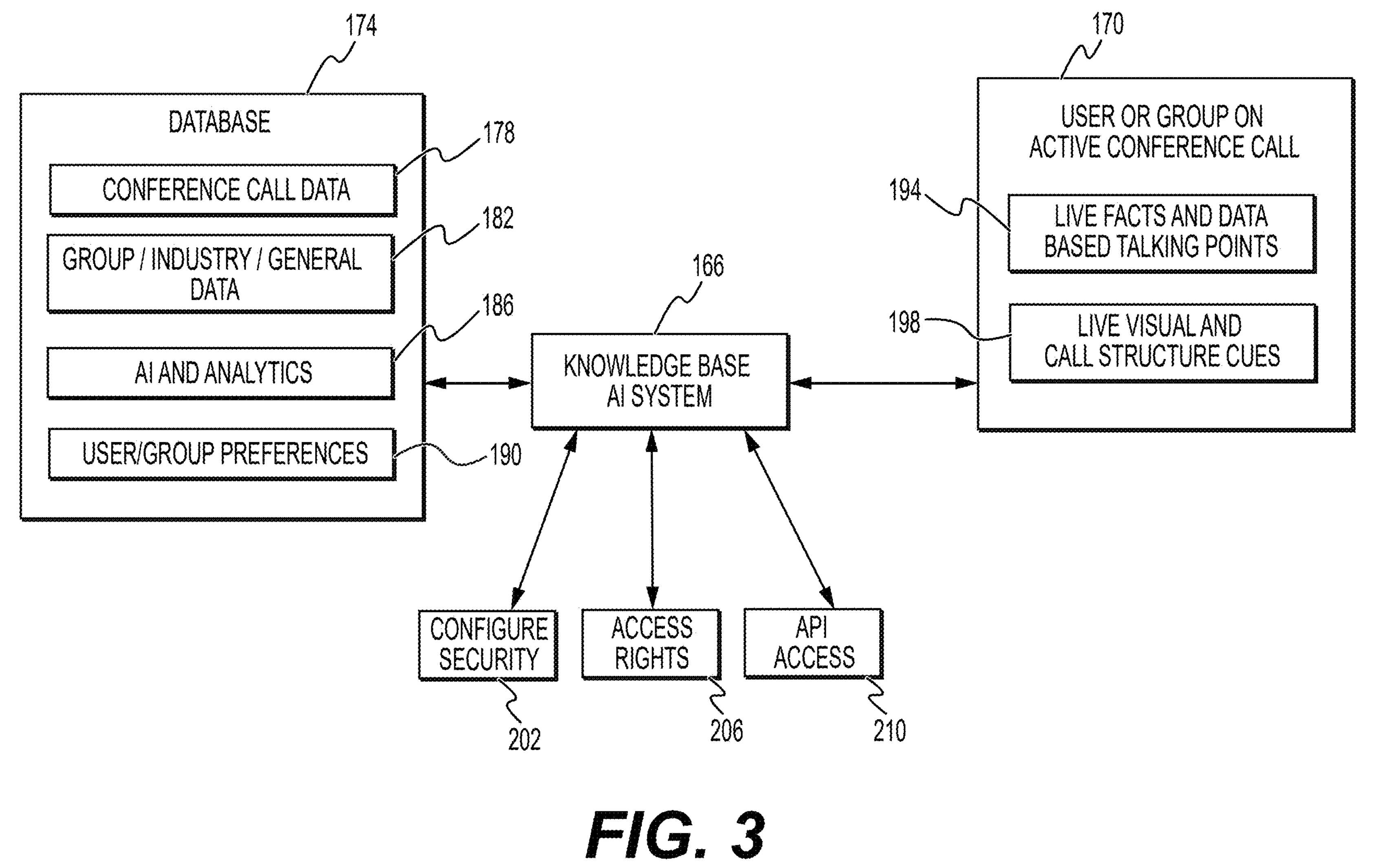
FIG. 3 presents a schematic, diagram of an illustrative knowledge base artificial intelligence subsystem of an illustrative embodiment of a video conferencing system.

The video conferencing system 100 may professionalize the way users 104 organize and conduct video calls. This may be done through a number of tools, powered by a knowledge base artificial intelligence sub-system 166 (FIG. 3).

One such tool is the presentation previews tool. The presentation previews tool presents to select users 104 the upcoming portion of a presentation. In some embodiments, the presentation previews tool may be toggled on for only a presenting group 138 to view or may be toggled on for multiple groups 138 to view. In some embodiments, the presentation previews tool may be utilized to create and deliver a presentation "trailer" to select users 104. In some embodiments, users 104 can add notes or links to knowledge base information 154 for use in conducting the expected upcoming virtual meeting.

Another such tool is an artificial intelligence or user created internal talking point tool, which allows users 104 of a group 138 to create a checklist of topics to be addressed in an upcoming virtual meeting, which may be a visible checklist to all users 104 of a particular group 138.

Another such tool is a historical notes and summaries tool. The historical notes and summaries tool uses knowledge base information 154 from prior group 138 or user 104 participation in virtual meetings. The video conferencing system 100 utilizes such knowledge base information 154 to create historical views of previous virtual meetings between attending groups 138 or users 104, which may include key notes, talking points, attendee information, agendas, or action items.

The video conferencing system 100 may also include a group 138 preselection tool, which, prior to a virtual meeting, selects the users 104 that are assigned to a particular group 138.

The video conferencing system 100 may also include a scheduling module, which automatically recommends alternative scheduling for virtual meetings when a proposed virtual meeting time conflicts with a pre-scheduled virtual meeting with the same user 104.

The video conferencing system 100 may also include a microphone control tool for a group leader or call organizer. The microphone control tool may allow for automatically alerting a particular user 104 when that user 104 turn is scheduled to present and automatically activating a microphone of the user 104; allow all executives or call leaders to one-click-mute any or all users 104; smart mute or automatically mute users 104 that are causing audio reverberation or excessive background noise; recommending fixes to users 104 that are causing audio reverberation or excessive background noise;

The video conferencing system 100 may also include an introduction management tool which may: allow a group leader to click on attendee to highlight them for introductions; auto-highlight attendees and allow for introduction of users 104 in a defined order for a predetermined amount of time; and provide an introduction counter to indicate how many introductions remain and which group 138 will stage for introductions next.

The video conferencing system 100 may also include chat features which may allow for: one on one chats between users 104 of the same or different groups 138 or between select groups 138 or sub-groups.

Referring now primarily to FIG. 3, an illustrative knowledge base artificial intelligence sub-system 166 of the video conferencing system 100 will be further described. The knowledge base artificial intelligence sub-system 166 is used to process, analyze, and display knowledge base information 154 (FIG. 2) to particular users 104 or groups 138. The process may occur outside of a virtual meeting, such as before a virtual meeting for preparation purposes or after a meeting for post-meeting review and analysis. However, the process provides live real time interaction and information with users 104 or groups 138 on an active conference call 170.

Knowledge base information 154 (FIG. 2) is contained within a database 174. Examples of the types of information that may be included in the knowledge base information 154 include conference call information 178, group/industry/general data 182, artificial intelligence produced information and analytics 186, and user/group preferences 190.

While a user 104 or groups 138 are on an active conference call 170, the knowledge base artificial intelligence sub-system 166 monitors the conference call and users 104 that are participating in the conference call. The knowledge base artificial intelligence sub-system 166 may detect certain prompts, actions, or words that indicate that further information may be useful to facilitate the ongoing discussions, for example, a user 104 may ask a question, a user 104 may mention certain data such as sales figures, a user 104 may mention certain products or services, etc. Upon detection of such an event, the knowledge base artificial intelligence sub-system 166 automatically converts the event into a request for data and searches the knowledge base information 154 contained within the database 174 for relevant information.

If relevant information is located by the knowledge base artificial intelligence sub-system 166, the information in presented to users 104 or groups 138 that have been allowed access to the information. For example, the knowledge base artificial intelligence sub-system 166 may present to users 104 or groups 138 on an active conference call 170 live facts of data based talking points 194 or live visual and call structure cues 198.

Information transfer to the appropriate users 104 or groups 138 is controlled by access and security measures to ensure that particular users 104 or groups 138 only receive authorized information. Access and display rights may be controlled by security configurations 202, access rights 206, or API access 210 to ensure that only users 104 or groups 138 are able to access the live information displayed to the users 104 or groups 138 on an active conference call 170.

It will be appreciated by one skilled in the art that the knowledge base information 154 may be any type of information that may be relevant to any particular application or use of the video conferencing system 100 and that the particular listed types of information (conference call information 178, group/industry/general data 182, artificial intelligence produced information and analytics 186, and user/group preferences 190) contained within the database 174 and that the types of live information (live facts of data based talking points 194 or live visual and call structure cues 198) presented to the users 104 or groups 138 on an active conference call 170 are illustrative. The knowledge base information 154 contained with the database 174 may be any information relevant to a particular conference call, user 104, group 136, company, team, project, product, service, etc.

The knowledge base artificial intelligence sub-system 166 may also access information that is not contained within the database 174. For example, if a user 104 mentions a particular website or product and the database 174 does not contain information relevant to the website or product, the knowledge base artificial intelligence sub-system 166 may access the website or search for information regarding the product and incorporate this information into the live facts of data based talking points 194 or live visual and call structure cues 198 presented to the users 104 or groups 138 on an active conference call 170. The knowledge base artificial intelligence sub-system 166 may then add the new information into the knowledge base information 154 contained with the database 174 for future access.

In some embodiments, the system 100 may use facial recognition to determine who is in attendance and assign group membership. In some embodiments an algorithm may analyze faces for stress or emotions.

Figure 4:
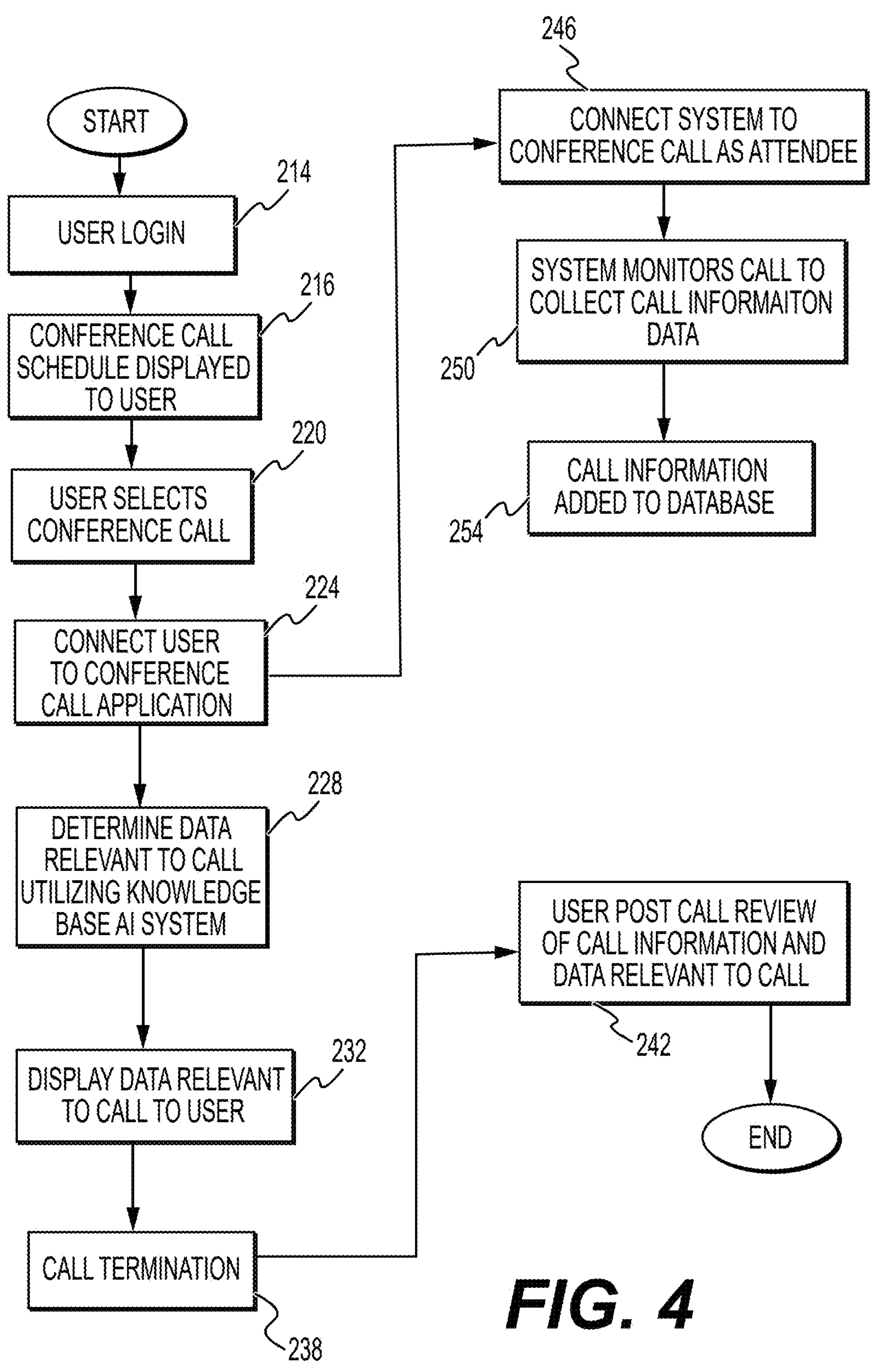
FIG. 4 is an illustrative embodiment of a process flow of an illustrative embodiment of a video conferencing system.

Referring now primarily to FIG. 4 a process for interfacing a user with a video conference system 100 will be described. The process begins a step 214 where a user 104 logs onto the user's account with the video conferencing system 100. Upon login, the process moves to step 216 where the user 104 will be presented with a display containing all of the conference calls or virtual meetings that the user 104 has scheduled for a certain time frame. The time frame may be the current day, the current week, the current month, or a predetermined number of days in the future. The time frame may be varied by selection of the appropriate option by the user 104.

It should be noted that the upcoming scheduled video conferences or virtual meetings that are associated with the user 104 may be scheduled to occur on any number of video conference calling applications 120 (FIG. 1).

Upon the next step 220, the user 104 selects a particular conference call or virtual meeting that the user 104 desires to attend. The video conferencing system 100 then, at step 224 takes the appropriate actions to connect the user 104 with the scheduled conference call or virtual meeting. This step may include the sub steps of: connecting to the particular video conference calling application 120 hosting the scheduled conference call or virtual meeting; providing the user 104 login or other credentials to the particular video conference calling application 120 hosting the scheduled conference call; or adjusting the settings of the device used by the user 104 to particular values preferred by the particular video conference calling application 120 hosting the scheduled conference call.

In addition, the video conferencing system 100 may, at step 224, associate the user 104 and any other participants to the conference call or virtual meeting with a particular group 138. The video conferencing system 100 may also present a graphical user interface to the user 104, such as shown in FIG. 2, that displays each participant to the video conferencing by group 138.

The process then continues to step 228, and in some embodiments to step 246 that will be described further below. Step 228 occurs during the ongoing conference call or virtual meeting. During step 228, the knowledge base artificial intelligence sub-system 166 monitors ongoing conference call or virtual meeting to ascertain relevant knowledge base information 154 to the user 104 or the group 138 associated with the user 104 as described in relation to FIG. 3.

At step 232, the relevant knowledge base information 154 is displayed or otherwise presented to the user 104 or the group 138 associated with the user 104 while the conference call or virtual meeting is ongoing.

At step 238, the conference call or virtual meeting is terminated.

At step 242, the video conferencing system 100 may present post call review information and relevant data to the user 104 for post call analysis, follow up steps, or action items related to the conference call or virtual meeting.

At step 246, which in some embodiments, occurs after step 224, the video conferencing system 100 connects to the conference call or virtual meeting as an attendee. The video conferencing system 100, as an attendee, then monitors or records the call to collect call information data at step 250. At step 254, the knowledge base artificial intelligence sub-system 166 analyzes the call information data and adds it into the knowledge base information 154 stored in database 174.

Figure 5:
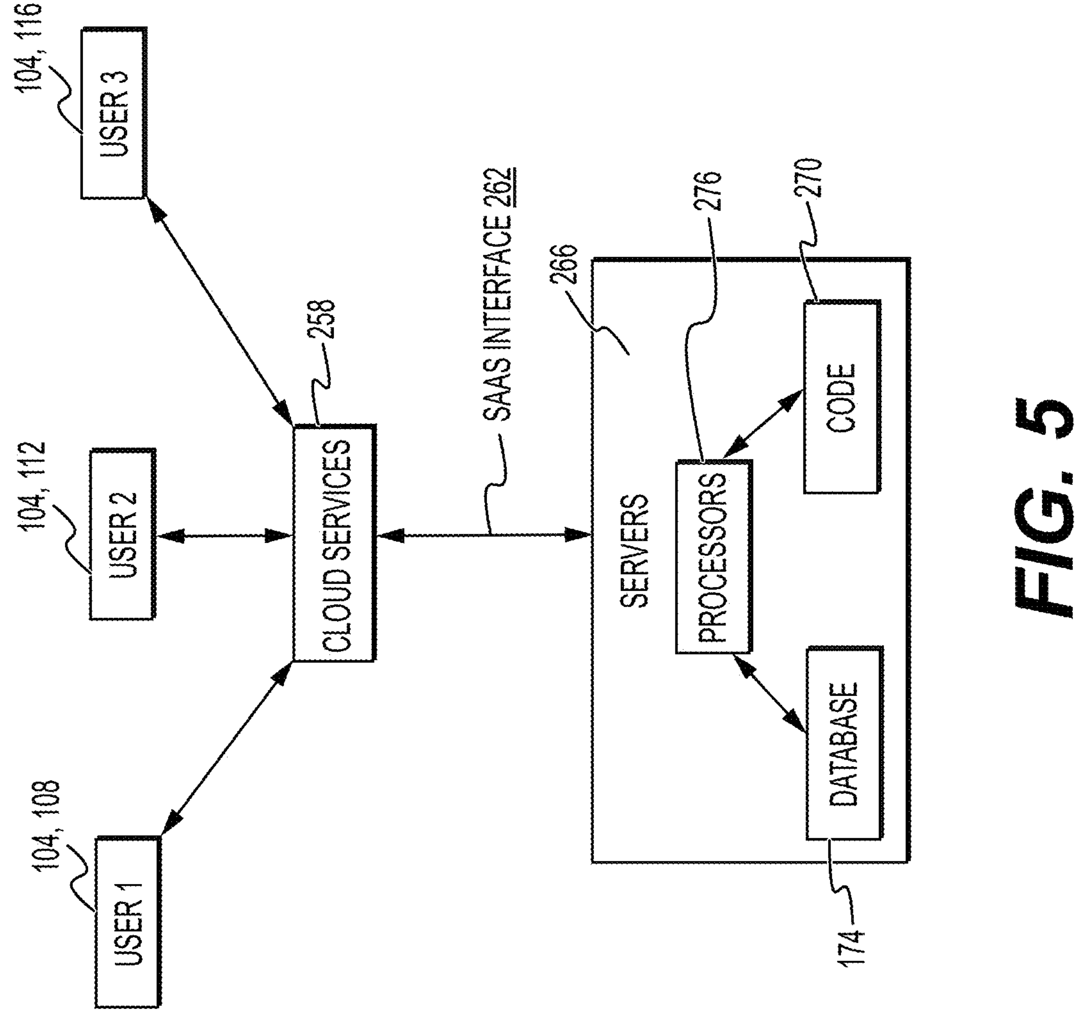
FIG. 5 presents a schematic, diagram of an illustrative embodiment of a video conferencing system in network communication with a plurality of users.
Figure 6:
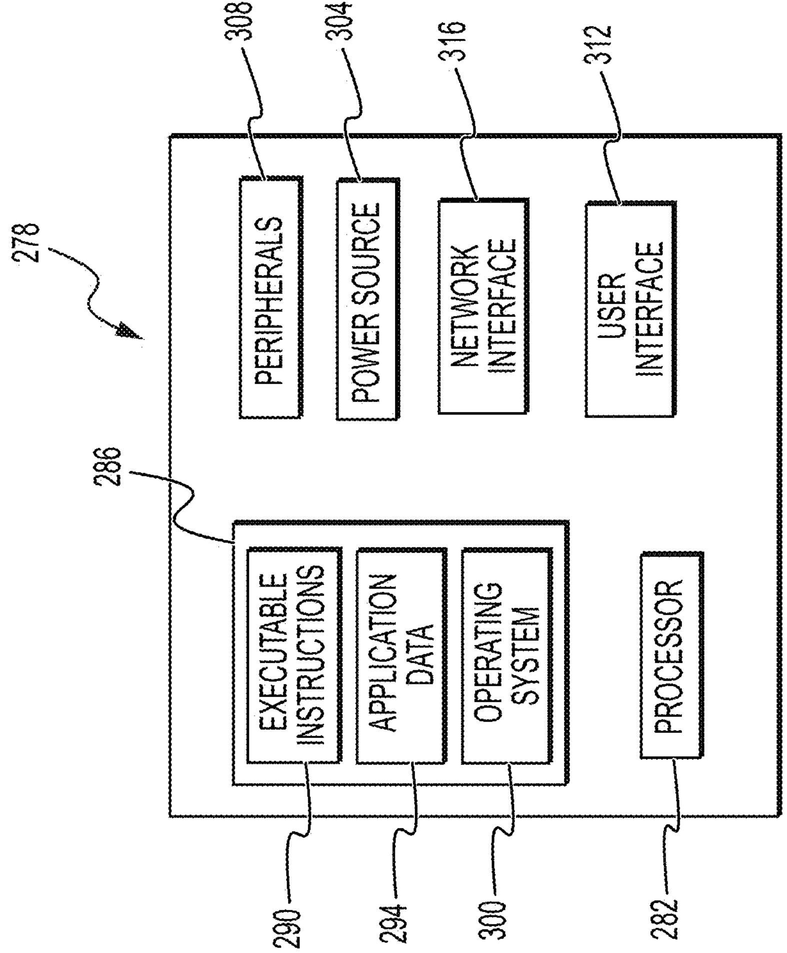
FIG. 6 presents a schematic, diagram of an illustrative computing device of an illustrative embodiment of a video conferencing system.
Figure 7:
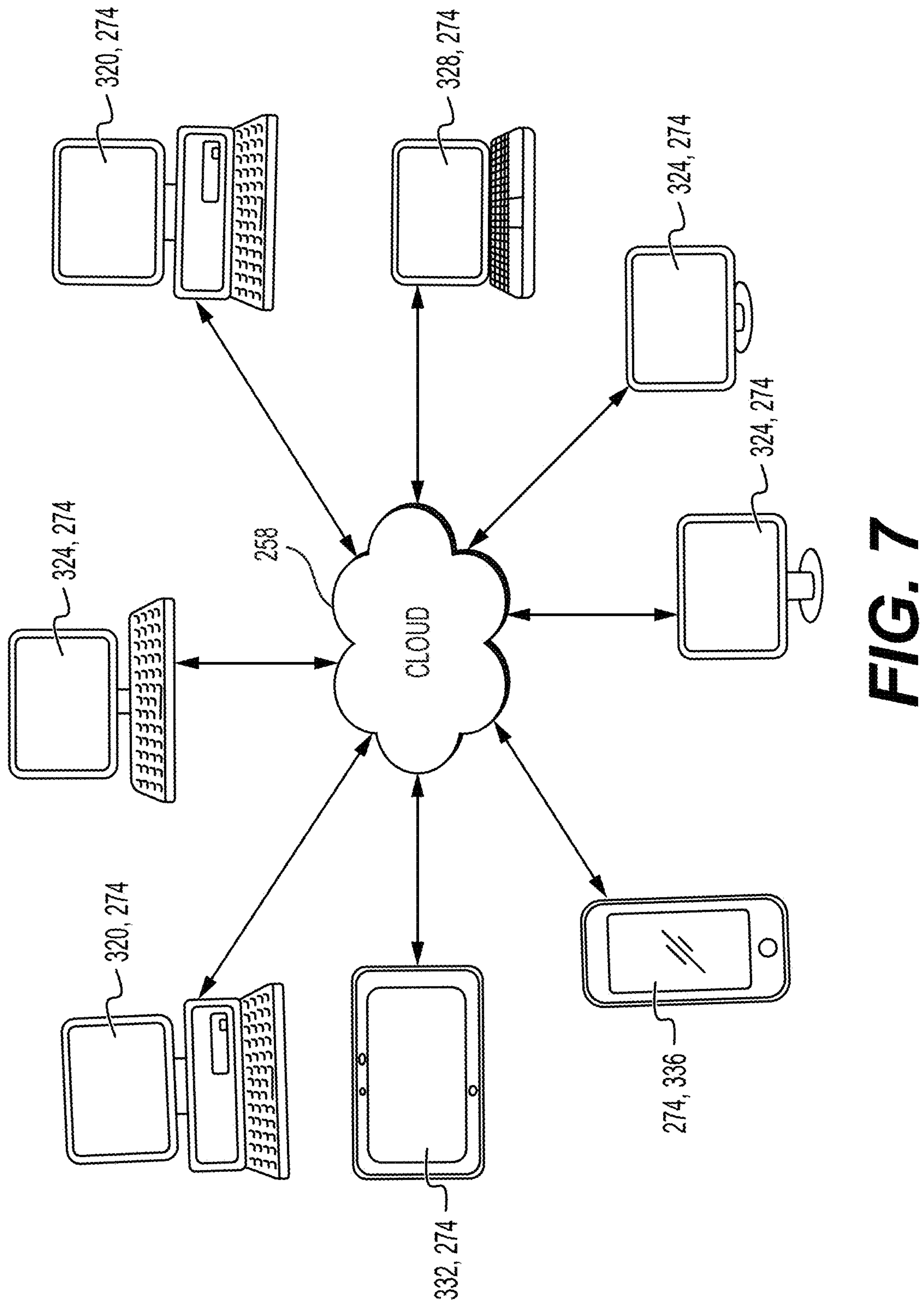
FIG. 7 presents a schematic, diagram of a plurality of user devices in network communication with an illustrative embodiment of a video conferencing system.

Referring now primarily to FIGS. 5, 6, and 7, the processes, devices, and connectivity of the video conferencing system 100 will be further discussed. As shown in FIG. 5, each user 104, such as user 1 108, user 2 112, and user 116 is communicatively coupled by network connections to cloud services 258, which in turn couple the user 104, via a SaaS interface 262, to servers 266. The video conferencing system 100 is stored on and operated by the servers 266. The database 174 and code 270 are also stored on the servers 266. Processors 276 access the code 270 and database 174 within the servers 266.

The database 174 may be a relational database management system, an object database, an XML database, a configuration management database, a management information base, one or more flat files, other suitable non-transient storage mechanisms, or a combination thereof.

Users 104 access the video conferencing system 100 by and through a user device 274 (FIG. 7), which is in network communication with cloud services 258 and the servers 266. The network communication between the user devices 274 and the cloud services 258 and the servers 266 may include, for example, the Internet, a local area network, a wide area network, a virtual private network, or another public or private means of electronic computer communications capable of transferring data between a user device 274 and one or more servers 266. In some embodiments, a user device 274 can connect to the network via a communal connection point, link, or path or using a distinct connection point, link, or path. For example, a connection point, link, or path can be wired, wireless, use other communication technologies or a combination thereof.

The user devices 274, server 266, or any other element of combination of elements of the video conferencing system 100 can include network hardware such as routers, switches, other network devices, of combinations thereof. For example, servers 266 may include a load balancer for routing traffic from the network to various servers 266 and user devices 274 associated with the video conferencing system 100. The load balancer can route or direct computing communications traffic, such as signals or messages, to respective elements of the video conferencing system 100.

FIG. 6 is a block diagram of an illustrative computing device 278 utilized in the video conferencing system 100. For example, the computing device 278 may be a user device 274, server 266, or other component that implements one or more software components of the video conferencing system 100.

The computing device 278 includes a processor 282, which is a central processing unit, such as a microprocessor, and can include single or multiple processors having single or multiple processing cores. Alliteratively, the processor 282 can include another type of device, or multiple devices for manipulating or processing information. For example, the processor 282 can include multiple processors interconnected in one or more manners, including hardwired networked or wirelessly networked. For example, the operations of the processor 282 can be distributed across multiple devices or units that can be coupled directly or across a local area or other suitable type of network. The processor 282 can include a cache, or cache memory, for local storage of operating data or instructions.

The memory 286 includes one or more memory components, which may each be volatile memory or non-volatile memory. For example, the volatile memory of the memory 286 can be random access memory (e.g. a DRAM module such as DDR SDRAM) or another form of volatile memory. In another example, the non-volatile memory of the memory 286 can be a disk drive, solid state drive, flash memory, phase-change memory, or another form of non-volatile memory configured for persistent electronic information storage. The memory 286 may also include other types of devices configured for storing data or instructions for processing by the processor 282. In some implementations, the memory 286 can be distributed across multiple devices. For example, the memory 286 can include network-based memory or memory in multiple user devices 274 or servers 266 performing the operations of those multiple devices.

The memory 286 can include data for immediate access by the processor 282. For example, the memory 286 can include executable instructions 290, application data 294, and an operating system 300. The executable instructions 290 can include one or more application programs, which can be loaded or copied, in whole or in part, from non-volatile memory to volatile memory to be executed by the processors 282. For example, the executable instructions 290 can include instructions for performing some or all of the techniques of the disclosure. The application data 294 can include user data, database date (e.g. knowledge base information 154), or the like. In some implementations, the application data 290 can include functional programs, such as a web browser, a web server, a database server, another program, or combination thereof. The operating system 300 can be, for example, Microsoft WINDOWS, Mac OS, LINUX, an operating system for a mobile device such as a smartphone or tablet device (e.g. ANDROID), or an operating system for non-mobile devices such as mainframe computer.

The power source 304 includes a source for providing power to the computing device 278. For example, the power source 304 can be an interface to an external power distribution system. In another example, the power source 304 can be a battery, such as where the computing device 278 is a mobile device or is otherwise configured to be operated independently of an external power distribution system. In some implementations, the computing device 278 may include or otherwise use multiple power sources. In such implementations, the power source 304 can be a backup battery.

The peripherals 308 include one or more sensors, detectors, or other devices configured for monitoring the computing device 278 or the environment around the computing device 278.

The user interface 312 includes one or more input interfaces or output interfaces. An input interface may, for example, be positional input device, such as a mouse, touchpad, touchscreen, or the like, a keyboard, or another suitable human or machine interface device. In some implementations, an input device may be a camera or microphone. An output interface may for example, be a display, such as a liquid crystal display, a cathode-ray tube, a light emitting diode display, or tother suitable display.

The network interface 316 provides a connection or link to a network. The network interface 316 can be a wired network interface or a wireless network interface. The computing device 278 can communicate with other devices via the network interface 316 using one or more network protocols, such as using Ethernet, transmission control protocol, internet protocol, power line communication, an IEE 802.X protocol (e.g. WI-FI, Bluetooth, etc.), infrared, visible light, general packet radio service, global system for mobile communications, code-divisions multiple access, or a combination thereof.

Referring now primarily to FIG. 7, hardware components of the video conferencing system 100 will be further discussed. The user devices 274 in network communication with the servers 266 may be any computing device 278 device capable of providing network communication to the servers 266, accepting user input (such as video and audio feeds), and displaying information to the users 104. For example, a user device 274 may be a desktop computer 320, terminal 324, laptop computer 328, tablet 332, cellular phone 336, or other computing device 278.

The user devices 274 may connect to the servers 266 through various network architectures and communication protocols as described above. For example, a desktop computer 320 may connect via Ethernet using transmission control protocol and internet protocol through a local area network, while a cellular phone 336 may connect via wireless protocols such as Wi-Fi, LTE, or other cellular technologies. The network interface 316 of each computing device 278 facilitates these connections using appropriate network protocols, whether wired (such as Ethernet) or wireless (such as IEEE 802.11 Wi-Fi, Bluetooth, or cellular standards like GSM, UMTS, or LTE Advanced). The processors 282 within each user device 274 execute the executable instructions 290 stored in memory 286 to implement the video conferencing functionality, while the user interface 312 components—including cameras, microphones, displays, keyboards, and touchscreens—capture user input and present the graphical interface displaying participants organized by groups 138. The cloud services 258 and SaaS interface 262 enable scalable distribution of the video conferencing system 100 across multiple servers 266, allowing for load balancing and routing of computing communications traffic between user devices 274 and the appropriate server resources. This distributed architecture supports the real-time processing requirements of the knowledge base artificial intelligence subsystem 166, which relies on the processors 276 accessing code 270 and database 174 to monitor conference content and provide dynamic group-specific information display during ongoing video conferences.

Figure 8:
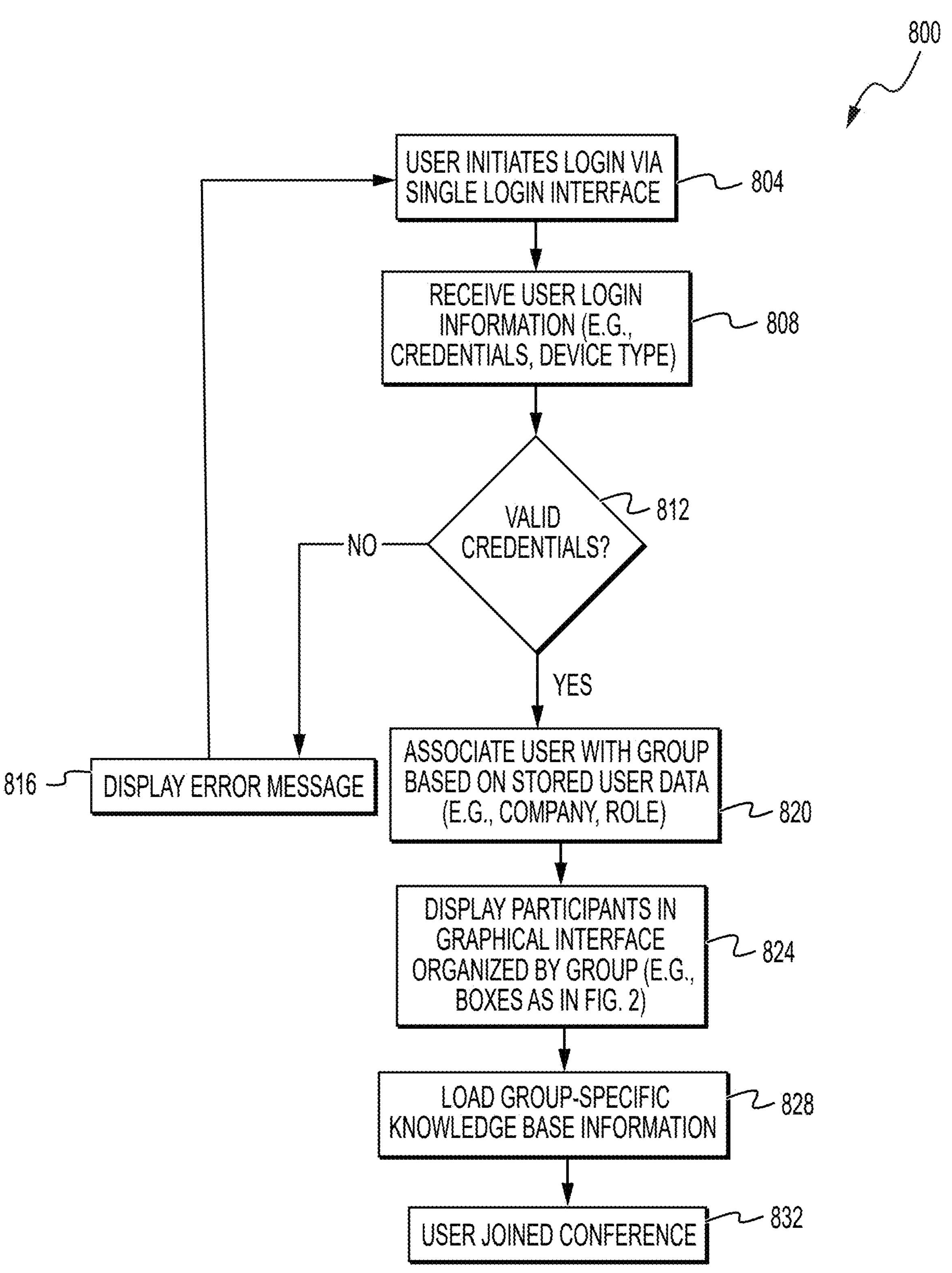
FIG. 8 is a flowchart illustrating a participant login and initial grouping process of an illustrative embodiment of a video conferencing system.

FIG. 8 illustrates a participant login and initial grouping process 800 that addresses the technical challenge of seamlessly integrating users into group-based video conferences while maintaining security and organizational structure. The overall purpose of this process 800 is to authenticate users through a unified interface, automatically associate them with appropriate groups based on stored organizational data, and initialize their access to group-specific knowledge base resources—all while providing a streamlined user experience that eliminates the confusion typically associated with multi-participant video conferences.

This may prevent or reduce fragmentation and inefficiency present in conventional video conferencing systems, where users must manage multiple login credentials across different platforms, manually identify other participants'organizational affiliations during calls, and lack access to contextual information relevant to their group's role in the meeting. Traditional systems suffer from what could be termed the "Brady Bunch problem," where all participants appear in an undifferentiated grid regardless of their organizational relationships, leading to confusion about roles, responsibilities, and access privileges.

The process 800 begins at step 804 with the presentation of a single login interface to the user, eliminating the need for platform-specific credentials. At step 808, the system receives user login information, including credentials and device type data, which is transmitted through the network interface 316 of the user's computing device 278 to the servers 266 via the cloud services 258 and SaaS interface 262 described earlier in the specification. The authentication verification occurs at decision step 812, where the system validates credentials against the database 174 using the processors 276 executing the appropriate code 270.

If authentication fails, the process 800 routes to step 816, displaying an error message through the user interface 312 of the user device 274, and returns to the start of the process 800. Upon successful authentication, the process 800 advances to step 820, where the system associates the user 104 with appropriate groups 138 based on stored user data contained within the database 174. This association leverages the organizational data collected during user registration, such as company affiliation, role, or project assignment, and may vary depending on the specific meeting context.

At step 824, the system generates and displays the graphical interface organized by groups, utilizing the display capabilities of the user interface 312 to present participants in distinct visual containers or boxes 152, 156 as illustrated in FIG. 2. This visual organization immediately communicates group relationships to all participants, solving the identification problem inherent in traditional video conferencing layouts. Step 828 involves loading group-specific knowledge base information 154 from the database 174, ensuring that relevant data, collateral, and resources are accessible to the appropriate group members based on their access rights 206 and security configurations 202.

The process 800 concludes at step 832 with the user successfully joined to the conference, having been authenticated, grouped, and provided with appropriate access to both the video conference interface and relevant knowledge base resources. This streamlined process 800 transforms the typically cumbersome experience of joining multi-party video conferences into an efficient, organized, and contextually-aware interaction that enhances productivity and reduces confusion for all participants.

Figure 9:
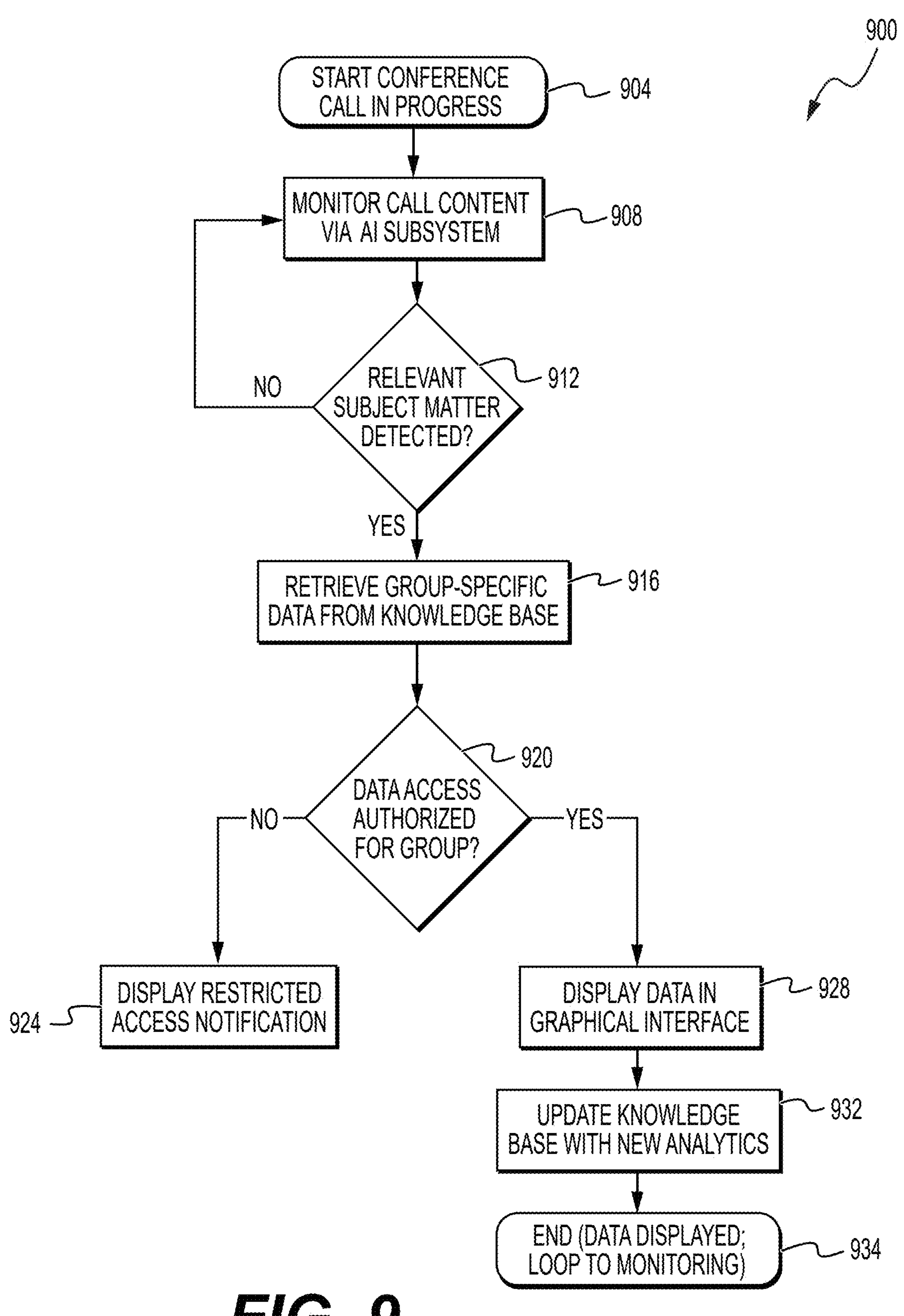
FIG. 9 is a flowchart illustrating an AI knowledge base activation and real-time data display process of an illustrative embodiment of a video conferencing system.

FIG. 9 illustrates an AI knowledge base activation and real-time data display process 900 that addresses the challenge of providing contextually relevant information to video conference participants in real-time without disrupting the natural flow of conversation. The overall purpose of this process 900 is to continuously monitor ongoing conference communications through artificial intelligence analysis, automatically detect when participants would benefit from additional information or resources, and seamlessly deliver group-specific knowledge base content to authorized users during active discussions—all while maintaining security protocols and access controls.

The process 900 may address an information gap that exists in conventional video conferencing systems, where participants often lack immediate access to relevant data, documentation, or contextual information that could enhance their contributions to the discussion. Traditional systems require participants to manually search for information, interrupt conversations to request data, or rely on memory for complex details, leading to inefficient meetings, missed opportunities, and suboptimal decision-making. This process 900 transforms passive video conferencing into an intelligent, data-enhanced collaboration environment.

The process 900 begins at step 904 with an active conference call in progress, where participants are already organized into their respective groups 138 as established in the login process 800. At step 908, the knowledge base artificial intelligence subsystem 166 continuously monitors call content through multiple channels, including audio streams processed through natural language processing, video feeds analyzed for visual cues, and chat messages parsed for keywords and context. This monitoring utilizes the processors 276 executing specialized code 270 to analyze communication patterns and identify potential information needs.

A decision point occurs at step 912, where the AI subsystem determines whether relevant subject matter has been detected based on predetermined triggers such as specific keywords, questions posed by participants, mentions of products or services, or discussion topics that align with available knowledge base content. If no relevant subject matter is detected, the process 900 returns to step 908 to continue monitoring. When relevant content is identified, the process 900 advances to step 916, where the system retrieves group-specific data from the knowledge base information 154 stored in database 174, ensuring that the information is tailored to the requesting group's context and needs.

Before displaying any information, the process 900 implements a security checkpoint at decision step 920, where the system verifies that data access is authorized for the requesting group based on access rights 206 and security configurations 202 established in the database 174. If access is not authorized, the process 900 routes to step 924, displaying a restricted access notification to maintain transparency while protecting sensitive information. Upon successful authorization, the process 900 proceeds to step 928, where the relevant data is displayed in the graphical interface through the user interface 312, typically appearing in the group-specific knowledge base information boxes 158, 162 as illustrated in FIG. 2.

The process 900 concludes its current cycle at step 932, where the system updates the knowledge base with new analytics and insights generated from the interaction, including AI-produced information and analytics 186 that can improve future responses and recommendations. At step 934, the process 900 returns to the monitoring phase, creating a continuous loop that ensures ongoing support throughout the conference duration. This cyclical approach enables the system to adapt to evolving conversation topics and provide increasingly relevant assistance as the meeting progresses, ultimately transforming static video conferences into dynamic, intelligence-augmented collaborative sessions.

Figure 10:
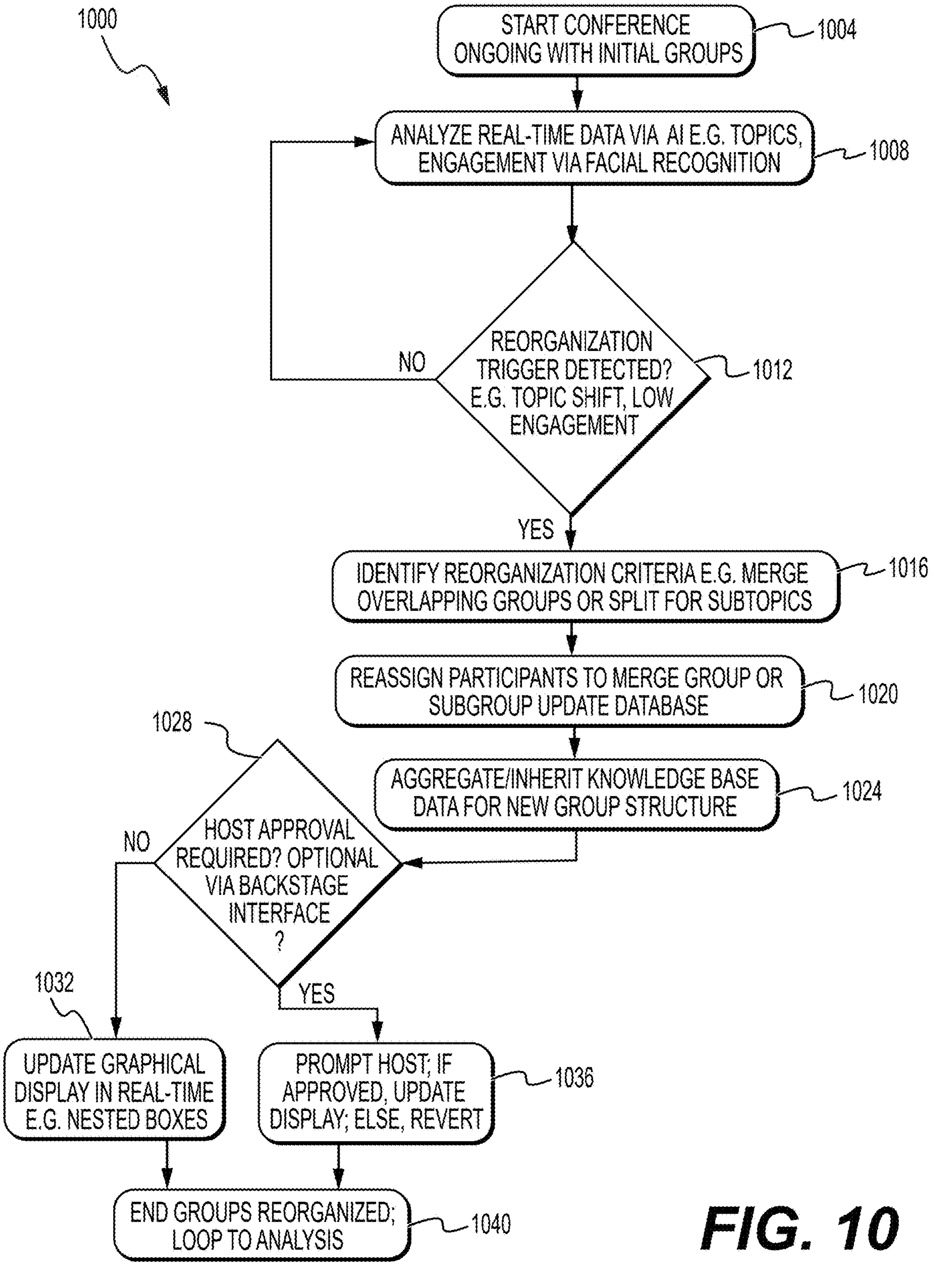
FIG. 10 is a flowchart illustrating a dynamic group reorganization process of an illustrative embodiment of a video conferencing system.

FIG. 10 illustrates a dynamic group reorganization process 1000 that addresses adapting video conference structures in real-time to optimize participant collaboration and information flow based on evolving meeting dynamics. The overall purpose of this process 1000 is to continuously analyze ongoing conference data through artificial intelligence monitoring, automatically detect when the current group organization no longer serves the meeting's objectives, and seamlessly reorganize participants into merged groups or subgroups without disrupting the conference flow—all while preserving access to relevant knowledge base resources and maintaining visual clarity for all participants.

This process 1000 addresses limitations in conventional video conferencing systems, where participant groupings remain static throughout the entire meeting duration regardless of how the discussion evolves. Traditional systems lack the intelligence to recognize when topics shift, when certain participants become more relevant to specific discussions, or when subgroups would benefit from focused collaboration. This rigidity often leads to inefficient meetings where participants remain passive observers during irrelevant segments, or where valuable expertise goes unutilized because the system cannot dynamically connect the right people at the right time. The static nature of conventional groupings also prevents the formation of cross-functional teams that could emerge organically during collaborative discussions.

The process 1000 begins at step 1004 with a conference ongoing with initial groups 138 established through the login process 800 described earlier. At step 1008, the system continuously analyzes real-time data via the knowledge base artificial intelligence subsystem 166, monitoring multiple data streams including audio content processed through natural language processing, video feeds analyzed for engagement patterns using facial recognition capabilities referenced in the specification, chat messages parsed for keywords and context, and participant interaction metrics. This comprehensive analysis utilizes the processors 276 executing specialized code 270 to identify patterns that suggest reorganization would be beneficial.

At step 1012 the AI subsystem determines whether a reorganization trigger has been detected based on predetermined criteria such as topic shifts identified through semantic analysis, changes in participant engagement levels, expertise requirements that don't align with current groupings, or explicit requests for collaboration. If no trigger is detected, the process 1000 returns to step 1008 to continue analysis. When a trigger is identified, the process 1000 advances to step 1016, where the system identifies specific reorganization criteria, such as merging groups with overlapping discussion topics or splitting large groups into focused subgroups based on detected subtopics or expertise areas.

At step 1020, the system reassigns participants to merged groups or subgroups based on the identified criteria, updating the participant associations in the database 174 while maintaining session continuity. Step 1024 involves aggregating or inheriting knowledge base data for the new group structure, ensuring that merged groups have access to combined resources from their constituent groups, or that subgroups receive specialized knowledge base information 154 relevant to their focused discussion area. This data aggregation preserves the contextual intelligence that makes the system valuable while adapting to new organizational structures.

The process 1000 includes an optional approval checkpoint at decision step 1028, where the system determines whether host approval is required based on predefined rules stored in the database 174. If approval is not required, the process 1000 proceeds directly to step 1032, updating the graphical display in real-time through the user interface 312 to reflect the new group structure, such as creating nested boxes for subgroups or combining visual containers for merged groups. If host approval is required, at step 1036 the system prompts the host via the backstage interface described in the specification, and upon approval updates the display, or reverts to the previous structure if denied.

The process 1000 concludes its current cycle at step 1040, where groups have been successfully reorganized and the display updated to reflect the new structure. The process 1000 then returns to step 1008 to continue analysis, creating a continuous loop that enables ongoing adaptation throughout the conference duration. This cyclical approach ensures that the system can respond to multiple reorganization needs during a single meeting, such as forming subgroups for parallel discussions and later merging them back for consolidated reporting, ultimately transforming static video conferences into dynamic, intelligence-driven collaborative environments that adapt to participant needs and discussion evolution.

Figure 11:
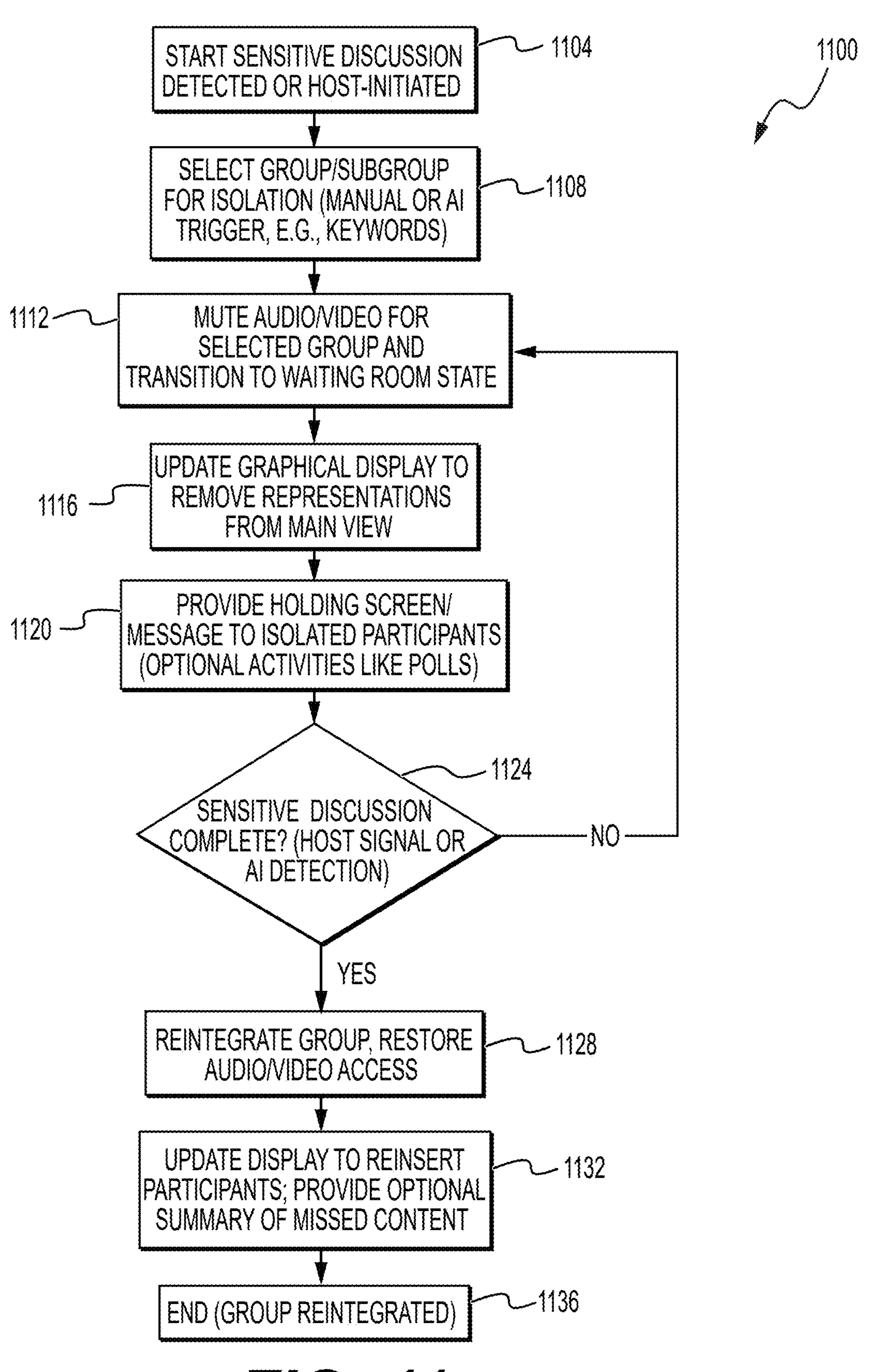
FIG. 11 is a flowchart illustrating a group isolation to waiting room process of an illustrative embodiment of a video conferencing system.

FIG. 11 illustrates a group isolation to waiting room process 1100 that addresses maintaining privacy and confidentiality during sensitive discussions within multi-party video conferences while preserving session continuity and participant engagement. The overall purpose of this process 1100 is to dynamically isolate one or more groups or subgroups from the main conference environment by removing their access to audio, video, chat, and shared content during confidential discussions, then seamlessly reintegrate them once the sensitive portion concludes—all without requiring disconnection, re-authentication, or disruption to the overall meeting flow.

This process 1100 addresses maintaining privacy during sensitive discussions that in conventional systems typically requires either ending the call entirely, manually managing complex breakout room configurations, or relying on participants to voluntarily mute themselves and look away—none of which provide reliable confidentiality assurance. Traditional systems lack the capability to dynamically isolate entire groups while maintaining their connection state, often forcing hosts to choose between transparency and privacy, leading to awkward interruptions, security vulnerabilities, or the need to schedule separate meetings for confidential matters. The static nature of conventional participant management also prevents fluid transitions between open discussion and private consultation phases that are common in business negotiations, legal proceedings, and strategic planning sessions.

The process 1100 begins at step 1104 when a sensitive discussion is detected or host-initiated, either through automatic triggers identified by the knowledge base artificial intelligence subsystem 166 using natural language processing to detect keywords such as "confidential" or "proprietary," or through manual activation by a host via the backstage interface described in the specification. At step 1108, the system selects the appropriate group or subgroup for isolation based on predetermined criteria, such as organizational affiliation, security clearance levels, or specific participant roles stored in the database 174.

The isolation process continues at step 1112, where the system mutes audio and video feeds for the selected group and transitions them to a waiting room state, effectively creating a sensory barrier that prevents the isolated participants from accessing any content from the main conference. Simultaneously, at step 1116, the system updates the graphical display through the user interface 312 to remove the isolated participants' representations from the main view, making them invisible to the remaining active participants while maintaining their connection to the servers 266 via the cloud services 258 and SaaS interface 262.

At step 1120, the system provides a holding screen or message to the isolated participants, such as "You have been placed in a waiting room for a brief private discussion," along with optional access to non-sensitive features like personal notes or offline knowledge base queries that do not compromise the confidential discussion occurring in the main conference. The process 1100 includes a monitoring phase at decision step 1124, where the system continuously evaluates whether the sensitive discussion has been completed through host signals, keyword resolution detected by the AI subsystem, or time-based thresholds established in the database 174.

Upon completion of the sensitive discussion, the process 1100 advances to step 1128, where the system reintegrates the isolated group by restoring their full audio and video access and updating the graphical display to reinsert their participant representations seamlessly into the main conference view. At step 1132, the system may optionally provide the reintegrated participants with a summary of missed non-sensitive content derived from the knowledge base information 154, ensuring they can quickly rejoin the discussion context without compromising the confidentiality of the private segment. The process 1100 concludes at step 1136 with the group successfully reintegrated, having maintained session continuity throughout the isolation period while ensuring complete privacy protection during the sensitive discussion phase.

Figure 12:
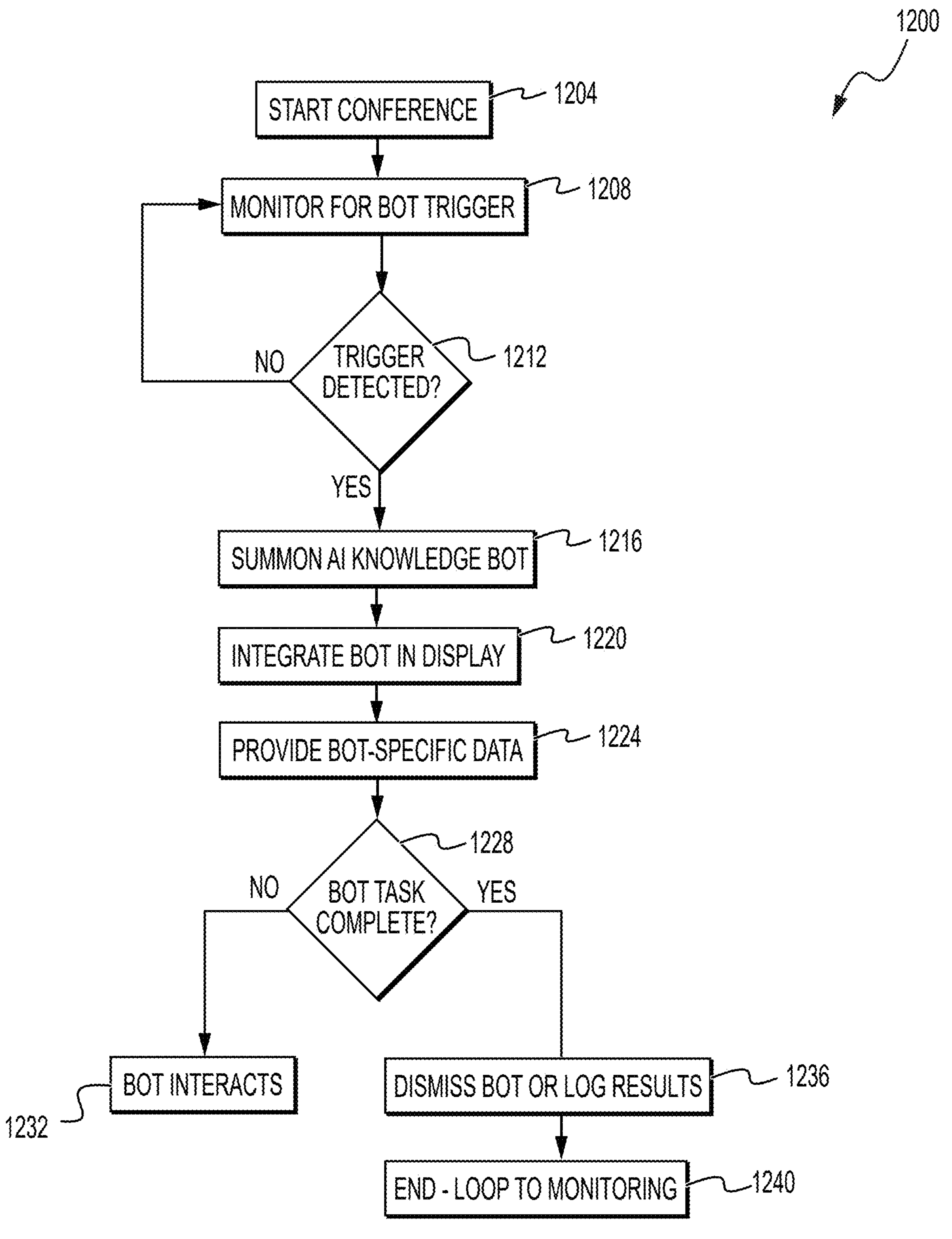
FIG. 12 is a flowchart illustrating a bot summoning and integration process of an illustrative embodiment of a video conferencing system.

FIG. 12 illustrates a bot summoning and integration process 1200 that addresses providing specialized expertise and automated assistance during video conferences without requiring additional human participants or interrupting the natural flow of discussion. The overall purpose of this process 1200 is to intelligently detect when participants would benefit from AI-powered assistance, automatically summon and integrate specialized knowledge bots into the conference environment, and provide contextual support through bot interactions—all while maintaining the visual organization and group structure that defines the video conferencing system's core functionality.

This process 1200 addresses the expertise gap that exists in conventional video conferencing systems, where participants often lack immediate access to specialized knowledge, technical support, or automated assistance that could enhance their decision-making or problem-solving capabilities during meetings. Traditional systems require participants to manually search for information, contact subject matter experts outside the meeting, or rely on incomplete knowledge, leading to delayed decisions, follow-up meetings, or suboptimal outcomes. The static nature of conventional video conferencing also prevents the dynamic introduction of AI-powered resources that could provide real-time analysis, recommendations, or automated task execution based on the evolving needs of the discussion.

The process 1200 begins at step 1204 with a conference in progress, where participants are already organized into their respective groups 138 and the knowledge base artificial intelligence subsystem 166 is actively monitoring the session. At step 1208, the system continuously monitors for bot triggers through multiple detection mechanisms, including natural language processing of audio streams to identify product mentions, service requests, or technical queries; voice command recognition for explicit bot summoning requests; and contextual analysis of discussion topics that align with available bot capabilities stored in the database 174.

A decision point occurs at step 1212, where the AI subsystem determines whether a trigger has been detected based on predetermined criteria such as specific keywords related to bot specializations, explicit user requests for assistance, or discussion contexts that would benefit from automated support. If no trigger is detected, the process 1200 returns to step 1208 to continue monitoring. When a trigger is identified, the process 1200 advances to step 1216, where the system summons the appropriate AI knowledge bot from the available bot ecosystem, selecting based on the detected trigger type and the requesting group's access permissions established in the database 174.

At step 1220, the summoned bot is integrated as a participant in the graphical display, appearing as a distinct visual element such as a specialized bot panel or avatar within the appropriate group container, maintaining the visual organization principles described in FIG. 2. Step 1224 involves providing the bot with specific data from the knowledge base information 154 or external APIs, ensuring the bot has access to relevant context, group-specific information, and current discussion topics to provide meaningful assistance. This data provisioning utilizes the same access rights 206 and security configurations 202 that govern human participant access to sensitive information.

The process 1200 includes a task completion checkpoint at decision step 1228, where the system evaluates whether the bot's assigned task has been completed based on query resolution, user satisfaction indicators, or predetermined task parameters. If the task is not complete, the process 1200 continues at step 1232, where the bot actively interacts with participants through various channels such as responding in chat, providing audio responses, displaying visual information, or executing automated tasks like document retrieval or data analysis.

Upon task completion, the process 1200 proceeds to step 1236, where the system either dismisses the bot from the active conference display or logs the bot's results and interactions to the database 174 for future reference and system learning. The process 1200 concludes its current cycle at step 1240, returning to the monitoring phase to detect additional bot summoning opportunities. This cyclical approach enables multiple bot integrations throughout a single conference, supporting complex discussions that may require various types of specialized assistance, ultimately transforming traditional video conferences into intelligent, AI-augmented collaborative environments that can dynamically provide expertise and automation as needed.

Figure 13:
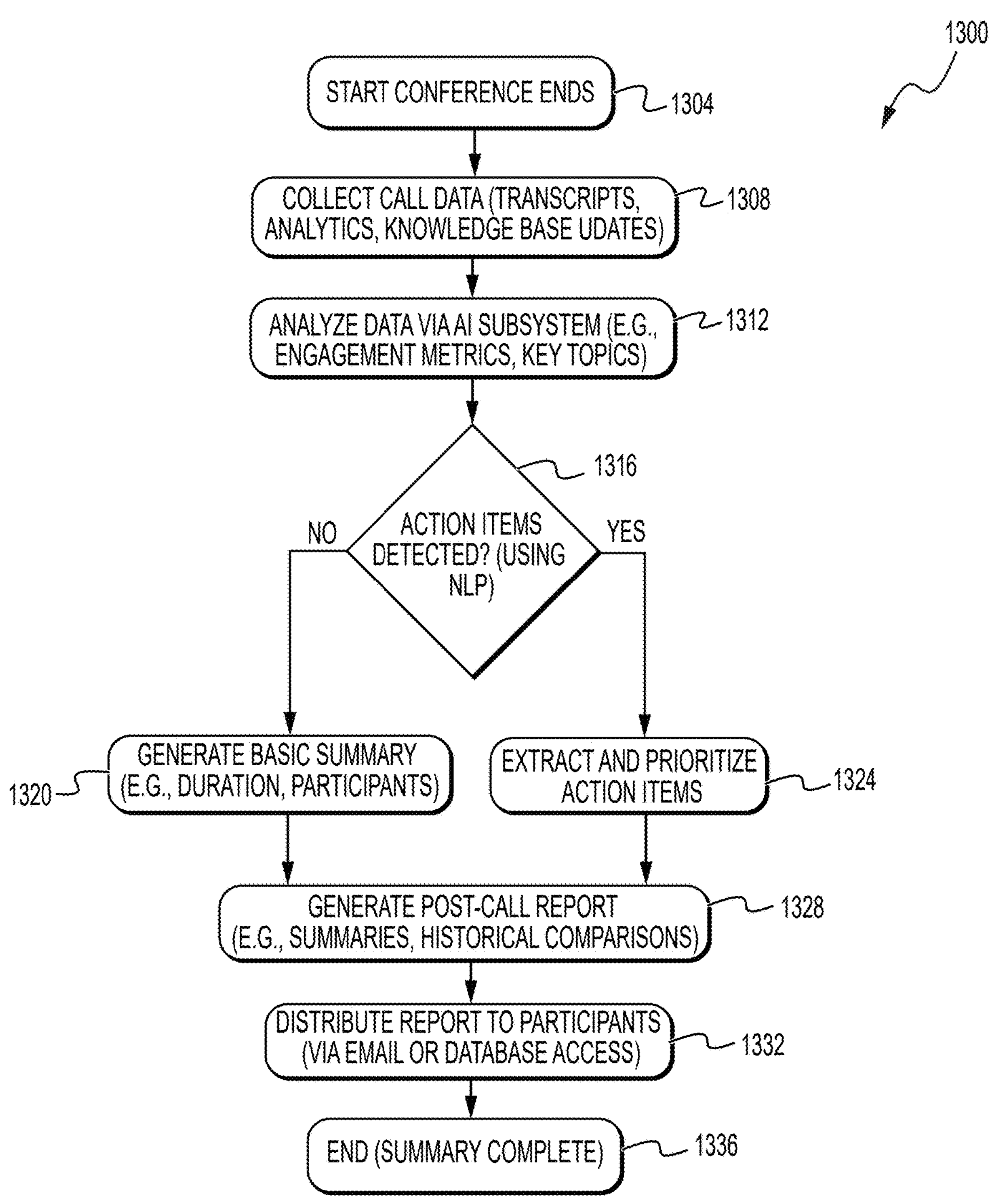
FIG. 13 is a flowchart illustrating a post-call summary and analysis process of an illustrative embodiment of a video conferencing system.

FIG. 13 illustrates a post-call summary and analysis process 1300 that addresses the challenge of extracting actionable insights and maintaining continuity between video conferences through intelligent data analysis and automated report generation. The overall purpose of this process 1300 is to systematically collect and analyze conference data immediately following call termination, automatically identify action items and key discussion points through artificial intelligence processing, and generate comprehensive reports that leverage the system's group-based knowledge base to provide contextual summaries and historical comparisons—all while distributing relevant information to appropriate participants based on their group membership and access permissions.

This process 1300 addresses the information loss and follow-up inefficiency that plague conventional video conferencing systems, where valuable discussion content, decisions, and commitments often disappear after calls end due to inadequate recording, analysis, or distribution mechanisms. Traditional systems typically provide basic transcripts or generic summaries that lack contextual intelligence, fail to identify actionable items, and cannot leverage organizational knowledge to enhance post-call value. The static nature of conventional post-call processes also prevents the integration of group-specific insights, historical context, or intelligent prioritization that could transform meeting outcomes into structured, actionable workflows. This leads to missed opportunities, forgotten commitments, and the need for additional follow-up meetings to clarify decisions or redistribute information.

The process 1300 begins at step 1304 when the conference ends, triggering the immediate activation of the post-call analysis workflow. At step 1308, the system systematically collects comprehensive call data, including complete transcripts generated through speech-to-text processing, analytics data captured during the session such as participant engagement metrics and speaking time distributions, and knowledge base updates that occurred during the call through the AI subsystem's real-time monitoring. This data collection may utilize the same processors 276 and database 174 infrastructure described earlier in the specification, ensuring seamless integration with the system's existing data management capabilities.

At step 1312, the knowledge base artificial intelligence subsystem 166 performs comprehensive analysis of the collected data, applying natural language processing techniques to identify key topics, sentiment analysis to gauge discussion tone and participant reactions, and semantic analysis to extract meaningful insights from the conversation content. This analysis leverages the group-specific knowledge base information 154 to provide contextual understanding that goes beyond simple keyword detection, enabling the system to recognize industry-specific terminology, company-specific references, and topic relationships that would be missed by generic analysis tools.

A decision point occurs at step 1316, where the AI subsystem determines whether action items have been detected within the analyzed content based on linguistic patterns such as commitment language ("we will," "I'll follow up"), deadline references, task assignments, or explicit action item declarations. If no action items are detected, the process 1300 proceeds to step 1320, where the system generates a basic summary containing fundamental meeting information such as duration, participant list, primary topics discussed, and general outcomes without specific task assignments.

When action items are identified, the process 1300 advances to step 1324, where the system extracts and prioritizes these items based on factors such as deadline urgency, participant seniority, strategic importance determined through knowledge base context, and explicit priority indicators mentioned during the discussion. This prioritization utilizes the user/group preferences 190 and artificial intelligence produced information and analytics 186 stored in the database 174 to ensure that the most critical items receive appropriate emphasis in the final report.

At step 1328, the system generates a comprehensive post-call report that integrates the analyzed content with relevant historical context from previous meetings between the same groups 138, comparative data from similar discussions stored in the knowledge base, and supplementary information that enhances understanding of the decisions made or topics covered. This report generation process leverages the same access rights 206 and security configurations 202 that govern real-time information display, ensuring that sensitive information is appropriately protected in the distributed summaries.

The process 1300 moves to step 1332, where the generated report is distributed to participants through multiple channels such as email delivery, database access through the user interface 312, or integration with external project management systems via API connections. The distribution respects group membership boundaries established during the conference, ensuring that participants receive information appropriate to their organizational affiliation and access level. At step 1336, the process 1300 ends with the summary complete, having transformed the raw conference content into structured, actionable intelligence that maintains continuity between meetings and enhances the overall productivity of the video conferencing experience.

Figure 14:
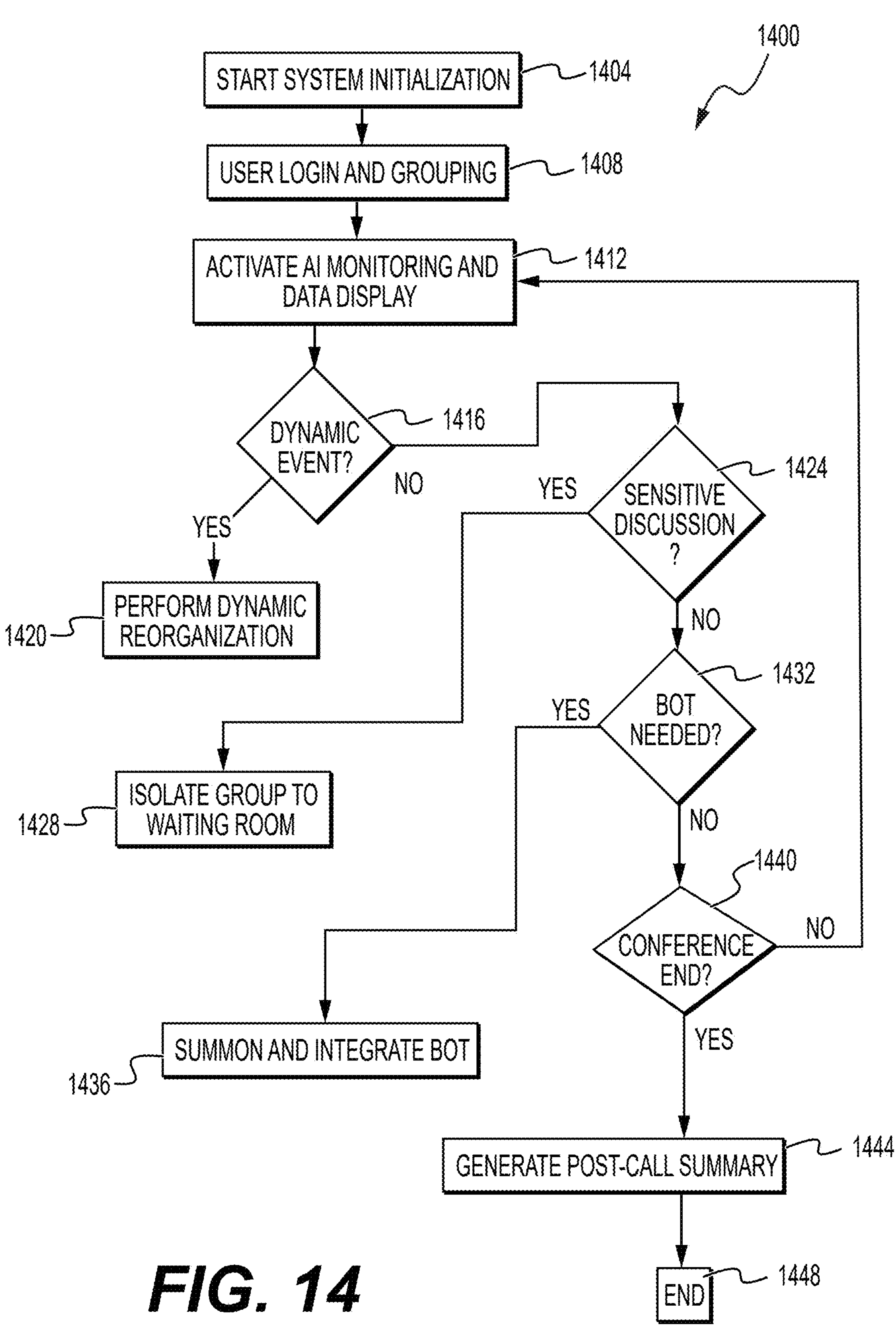
FIG. 14 is a flowchart illustrating an overall system operation process of an illustrative embodiment of a video conferencing system.

FIG. 14 illustrates an overall system operation process 1400 that addresses the challenge of coordinating multiple intelligent subsystems within a video conferencing environment to provide seamless, adaptive, and responsive meeting experiences. The overall purpose of this process 1400 is to orchestrate the integration of all system components—from initial user authentication and grouping through dynamic reorganization, privacy management, AI assistance, and post-call analysis—while maintaining continuous monitoring and intelligent decision-making throughout the entire conference lifecycle, ensuring that participants experience a cohesive, professionally managed virtual meeting environment that adapts to their needs in real-time.

This process 1400 addresses the fragmentation and lack of intelligent coordination that characterizes conventional video conferencing systems, where individual features operate in isolation without awareness of broader meeting context or participant needs. Traditional systems lack the capability to dynamically coordinate multiple intelligent functions such as participant management, content delivery, privacy controls, and automated assistance in response to evolving meeting conditions. This results in disjointed user experiences where participants must manually manage multiple aspects of the conference, leading to inefficient meetings, missed opportunities for optimization, and suboptimal collaboration outcomes. The static nature of conventional systems also prevents the seamless integration of advanced features like AI-powered reorganization, contextual bot assistance, and intelligent privacy management that could significantly enhance meeting productivity and participant satisfaction.

The process 1400 begins at step 1404 with system initialization, establishing the foundational infrastructure including server connections, database access, and AI subsystem activation as described in the hardware components discussion of FIGS. 5-7. At step 1408, the system implements user login and grouping procedures, referencing the participant login and initial grouping process 800 described earlier, where users 104 authenticate through the single login interface and are automatically associated with appropriate groups based on stored organizational data in the database 174.

At step 1412, the system activates AI monitoring and data display capabilities, implementing the AI knowledge base activation and real-time data display process 900 to begin continuous analysis of conference content and delivery of relevant information to authorized participants. This monitoring phase utilizes the knowledge base artificial intelligence subsystem 166 to process audio, video, and text inputs while maintaining security protocols through access rights 206 and security configurations 202.

The process 1400 includes multiple decision points that enable dynamic response to changing conference conditions. At step 1416, the system evaluates whether dynamic events have occurred, such as topic shifts, engagement changes, or explicit reorganization requests detected through the AI monitoring capabilities. If dynamic events are detected, the process 1400 advances to step 1420, implementing the dynamic group reorganization process 1000 to adapt group structures in real-time based on evolving meeting needs.

At decision step 1424, the system determines whether sensitive discussions have been detected or initiated, either through automatic keyword detection by the AI subsystem or manual host activation via the backstage interface. When sensitive content is identified, the process 1400 proceeds to step 1428, executing the group isolation to waiting room process 1100 to maintain privacy while preserving session continuity for all participants.

The process 1400 continues with decision step 1432, where the system evaluates whether specialized AI assistance is needed based on detected queries, technical discussions, or explicit bot summoning requests from participants. If bot assistance is required, the process 1400 advances to step 1436, implementing the bot summoning and integration process 1200 to provide contextual expertise and automated support without disrupting the natural flow of discussion.

At decision step 1440, the system determines whether the conference has concluded based on host signals, participant departure patterns, or scheduled end times stored in the database 174. If the conference continues, the process 1400 returns to step 1412 to maintain continuous AI monitoring and responsiveness to new events. Upon conference conclusion, the process 1400 advances to step 1444, implementing the post-call summary and analysis process 1300 to generate comprehensive reports, extract action items, and update the knowledge base with insights gained during the session. The process 1400 concludes at step 1448 with system shutdown, having provided a complete, intelligently managed conference experience that adapts to participant needs while maintaining security, privacy, and organizational structure throughout the entire meeting lifecycle.

Figure 15:
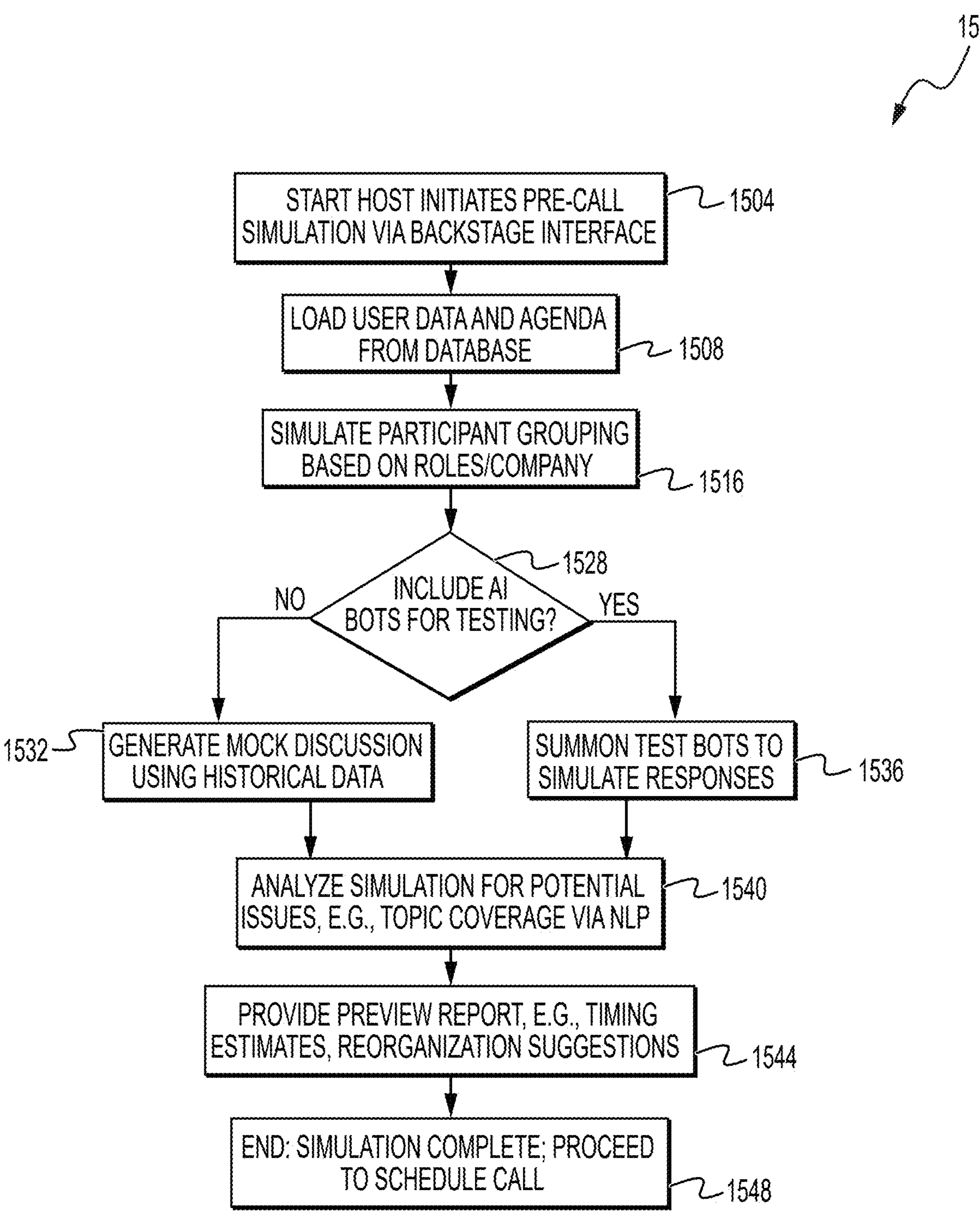
FIG. 15 is a flowchart illustrating a pre-call simulation process of an illustrative embodiment of a video conferencing system.

FIG. 15 illustrates a pre-call simulation process 1500 that addresses the challenge of optimizing video conference planning and preparation through predictive modeling and artificial intelligence-driven scenario analysis. The overall purpose of this process 1500 is to enable hosts to simulate upcoming conferences before they occur by leveraging historical data, participant profiles, and AI-powered interaction modeling to identify potential issues, optimize timing and content delivery, and generate actionable recommendations for improving meeting effectiveness—all while utilizing the system's group-based knowledge architecture to provide contextually relevant insights that enhance preparation and reduce the likelihood of unproductive or inefficient meetings.

This process 1500 addresses the preparation gap that exists in conventional video conferencing systems, where hosts typically enter meetings without adequate insight into potential participant dynamics, optimal content sequencing, or likely discussion patterns that could affect meeting outcomes. Traditional systems lack the capability to simulate participant interactions, predict engagement levels, or identify potential conflicts or synergies before they occur during actual meetings. This results in suboptimal meeting planning, inefficient use of participant time, unexpected disruptions during calls, and missed opportunities to tailor content or group structures for maximum effectiveness. The static nature of conventional preparation tools also prevents hosts from understanding how different participant combinations, topic sequences, or group arrangements might affect meeting flow and outcomes.

The process 1500 begins at step 1504 when a host initiates pre-call simulation via the backstage interface described earlier in the specification, accessing the simulation capabilities through the user interface 312 of their computing device 278. At step 1508, the system loads comprehensive user data and agenda information from the database 174, including participant profiles, historical interaction patterns, group affiliations, expertise areas, and previous meeting analytics stored as part of the knowledge base information 154, ensuring that the simulation has access to all relevant contextual information needed for accurate modeling.

The process 1500 continues at step 1516 with simulating participant grouping based on roles and company affiliations, utilizing the same grouping algorithms described in the participant login and initial grouping process 800 to create realistic group structures for the simulation, creating virtual representations of how participants would be organized during the actual conference.

A decision point occurs at step 1528, where the system determines whether to include AI bots for testing based on host preferences or the complexity of the planned discussion. If bots are not included, the process 1500 proceeds to step 1532, where the system generates mock discussions using historical data from previous meetings between similar participant groups, leveraging the conference call information 178 and artificial intelligence produced information and analytics 186 stored in the database 174. If bots are included, the process 1500 advances to step 1536, where test bots are summoned to simulate realistic responses and interactions, utilizing the same bot summoning capabilities described in the bot summoning and integration process 1200.

At step 1540, the knowledge base artificial intelligence subsystem 166 analyzes the simulation results for potential issues using natural language processing and predictive analytics, identifying factors such as topic coverage gaps, timing bottlenecks, potential participant conflicts, or opportunities for improved group dynamics. This analysis utilizes the processors 276 executing specialized code 270 to process the simulated interactions and generate actionable insights.

The process 1500 proceeds to step 1544 with the generation of a comprehensive preview report containing timing estimates, reorganization suggestions, content optimization recommendations, and potential risk mitigation strategies based on the simulation results. At step 1548, the simulation is complete and the system provides the host with actionable intelligence for proceeding to schedule and conduct the actual call with enhanced preparation and strategic insight. This process 1500 transforms traditional meeting planning from reactive to proactive, enabling hosts to optimize conference structures and content delivery before participants join, ultimately improving meeting effectiveness and participant satisfaction through data-driven preparation.

Figure 16:
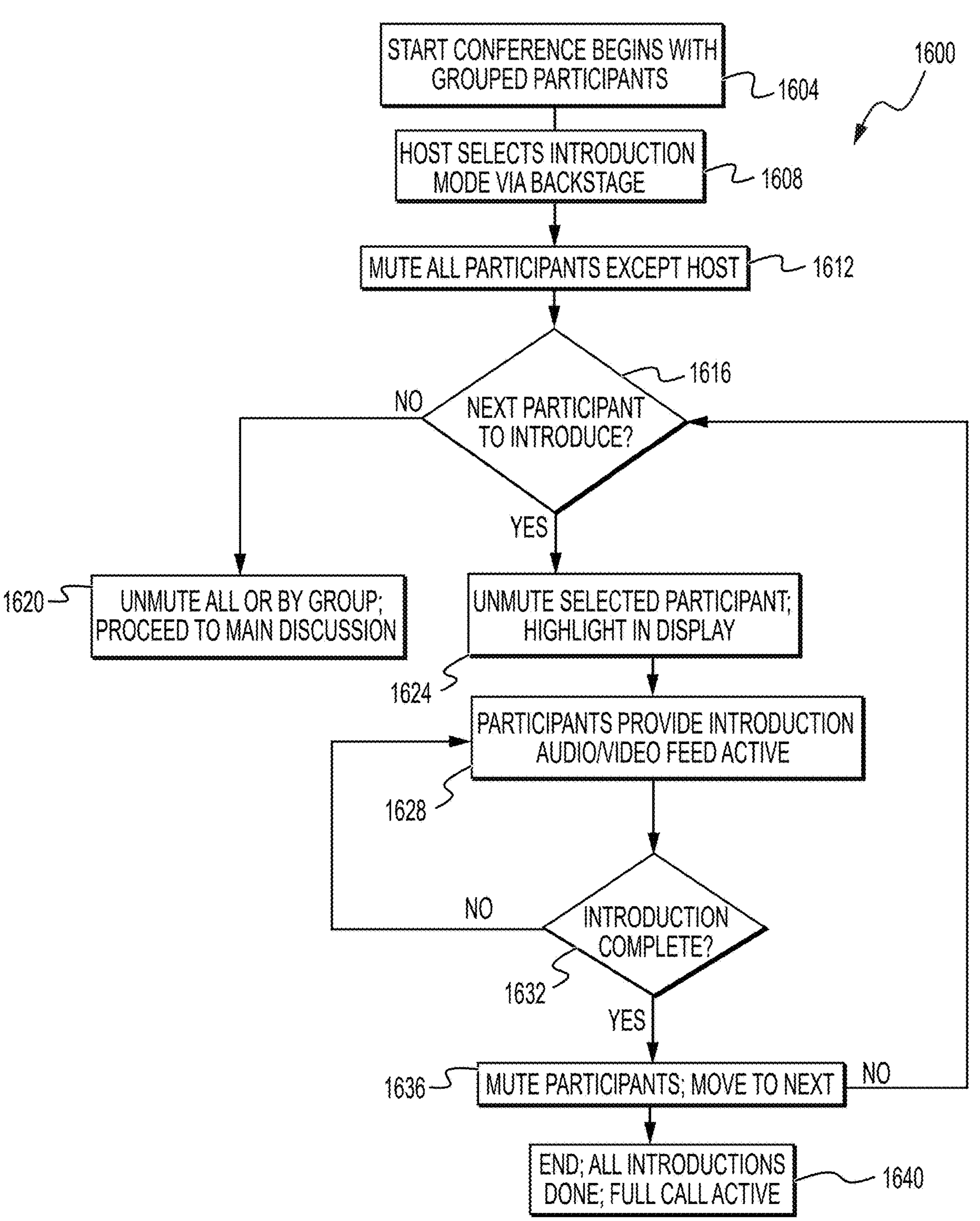
FIG. 16 is a flowchart illustrating a microphone control and participant introduction process of an illustrative embodiment of a video conferencing system.

FIG. 16 illustrates a microphone control and participant introduction process 1600 that addresses the challenge of managing audio chaos and facilitating structured participant introductions in multi-group video conferences. The overall purpose of this process 1600 is to provide hosts with granular audio control capabilities while automating the sequential introduction of participants in an organized, group-based manner that eliminates confusion about participant identities and organizational affiliations—all while maintaining professional meeting flow and preventing the audio disruptions that commonly plague large video conferences.

This process 1600 addresses the audio management and participant identification problems that plague conventional video conferencing systems, where hosts lack sophisticated tools to control multiple participants' audio feeds simultaneously, leading to overlapping conversations, background noise interference, and chaotic meeting openings. Traditional systems typically provide only basic mute/unmute functionality for individual participants, requiring hosts to manually manage each person separately, which becomes unwieldy in large meetings. The participant identification problem is equally significant—in conventional systems, attendees often spend valuable meeting time on lengthy, unstructured introductions where participants may forget to mention key information like their role or company affiliation, leading to confusion throughout the meeting about who represents which organization or possesses which expertise.

The process 1600 begins at step 1604 when a conference begins with grouped participants already organized through the participant login and initial grouping process 800 described earlier. At step 1608, the host selects the introduction mode via the backstage interface described in the specification, choosing from options such as manual control, automatic sequencing, or time-limited introductions. This selection utilizes the user interface 312 of the host's computing device 278 to access the microphone control tools referenced in the specification.

At step 1612, the system mutes all participants except the host, implementing the "smart mute" functionality described in the specification that provides executives and call leaders with one-click-mute capabilities for all attendees. This mass muting prevents audio interference during the structured introduction phase while allowing the host to maintain control over the meeting flow.

The process 1600 includes a decision point at step 1616, where the system determines whether there is a next participant to introduce based on a predetermined sequence, typically organized by group membership and hierarchy within each group as stored in the database 174. If no participants remain to be introduced, the process 1600 advances to step 1620, where the system unmutes all participants or unmutes by group according to host preferences, then proceeds to the main discussion phase of the conference.

When participants remain to be introduced, the process 1600 continues to step 1624, where the system unmutes the selected participant and highlights them in the graphical display through the user interface 312, implementing the visual emphasis techniques described for emphasized users 150 in FIG. 2. This highlighting may include enlarging the participant's video feed, adding visual borders, or repositioning them prominently within their group's display container.

At step 1628, the participant provides their introduction while their audio and video feeds are active, with all other participants remaining muted to ensure clear audio quality and prevent interruptions. The system may optionally display prompts or templates to guide participants in providing consistent, relevant information such as name, title, company affiliation, and role in the meeting context.

The process 1600 includes a monitoring phase at decision step 1632, where the system evaluates whether the introduction is complete based on predetermined time limits set by the host or explicit host signals through the backstage interface. If the introduction is not complete, the process 1600 continues to allow the participant to speak. Upon completion, the process 1600 advances to step 1636, where the system mutes the participant and moves to the next person in the sequence, returning to step 1616 to continue the structured introduction cycle.

The process 1600 concludes at step 1640 when all introductions are complete and the full call becomes active with appropriate audio permissions restored. This systematic approach transforms the typically chaotic opening phase of large video conferences into a professional, organized experience that ensures all participants are properly identified within their group context, while providing hosts with the audio control tools necessary to maintain meeting discipline and prevent the technical disruptions that commonly derail video conference productivity.

Figure 17:
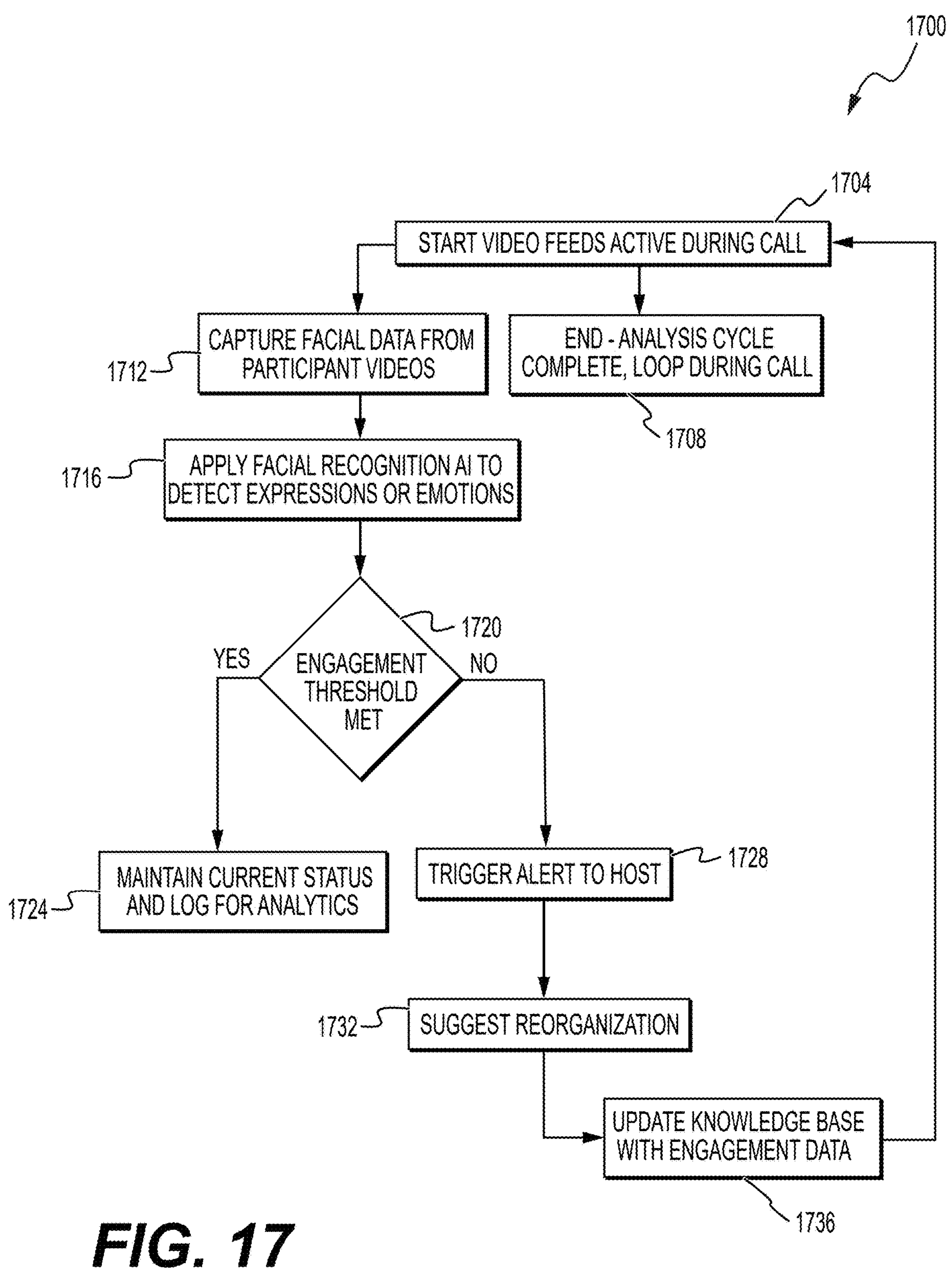
FIG. 17 is a flowchart illustrating a facial recognition for engagement and emotion analysis process of an illustrative embodiment of a video conferencing system.

FIG. 17 illustrates a facial recognition for engagement and emotion analysis process 1700 that addresses maintaining participant engagement and detecting emotional states during video conferences through real-time computer vision analysis. The overall purpose of this process 1700 is to continuously monitor participant video feeds using facial recognition artificial intelligence to assess engagement levels, detect emotional indicators such as attention, confusion, or stress, and provide hosts with actionable insights for improving meeting effectiveness—all while enabling automated responses such as participant reorganization or content adjustment based on detected engagement patterns and emotional states.

This process 1700 addresses the engagement monitoring gap that exists in conventional video conferencing systems, where hosts lack real-time visibility into participant attention levels, emotional responses, or overall meeting effectiveness beyond basic audio participation metrics. Traditional systems cannot detect when participants are disengaged, confused, or experiencing meeting fatigue, leading to ineffective presentations, missed communication cues, and suboptimal meeting outcomes. The inability to assess non-verbal feedback in virtual environments creates a significant disadvantage compared to in-person meetings, where hosts can naturally observe body language, facial expressions, and engagement indicators to adjust their approach in real-time. This limitation often results in one-way communication where presenters continue without awareness of audience comprehension or interest levels.

The process 1700 begins at step 1704 when video feeds become active during the call, with participants' cameras enabled and streaming to the servers 266 via the cloud services 258 and SaaS interface 262 described earlier in the specification. At step 1712, the system captures facial data from participant videos using the computing devices' 278 cameras and processes this visual information through the network interface 316 to the knowledge base artificial intelligence subsystem 166, which includes specialized computer vision capabilities for facial analysis.

At step 1716, the system applies facial recognition AI to detect expressions and emotions, utilizing machine learning algorithms executed by the processors 276 to analyze facial features, micro-expressions, eye movement patterns, and other visual indicators that correlate with engagement states such as attention, confusion, boredom, or stress. This analysis leverages the same AI infrastructure described in FIG. 3, extending the knowledge base artificial intelligence subsystem 166 to include emotion recognition capabilities that can identify patterns associated with different emotional and engagement states.

A decision point occurs at step 1720, where the system evaluates whether engagement thresholds have been met based on predetermined criteria stored in the database 174, such as sustained eye contact with the camera, facial expressions indicating attention or interest, or absence of indicators suggesting distraction or confusion. If engagement thresholds are met, the process 1700 continues to step 1724, where the system maintains the current status and logs engagement data for analytics purposes, contributing to the artificial intelligence produced information and analytics 186 stored in the database 174.

When engagement thresholds are not met, indicating low attention or negative emotional states, the process 1700 advances to step 1728, where the system triggers alerts to the host through the backstage interface described in the specification, providing real-time notifications about participant engagement issues without disrupting the main conference flow. At step 1732, the system may suggest reorganization strategies, such as emphasizing active participants through the dynamic reorganization capabilities described in the dynamic group reorganization process 1000, or implementing other engagement enhancement techniques like content adjustment or break recommendations.

The process 1700 concludes its current cycle at step 1736, where the system updates the knowledge base with engagement data, storing participant-specific engagement metrics, emotional state patterns, and meeting effectiveness indicators that can inform future meeting optimization and participant management strategies. This data becomes part of the user/group preferences 190 and conference call information 178 stored in the database 174, enabling the system to learn from engagement patterns and improve its ability to detect and respond to participant needs over time. The process 1700 then loops back to continue monitoring throughout the call duration, creating a continuous feedback system that enables real-time meeting optimization based on participant engagement and emotional states. At step 1708 the process may end or continue the loop.

Figure 18:
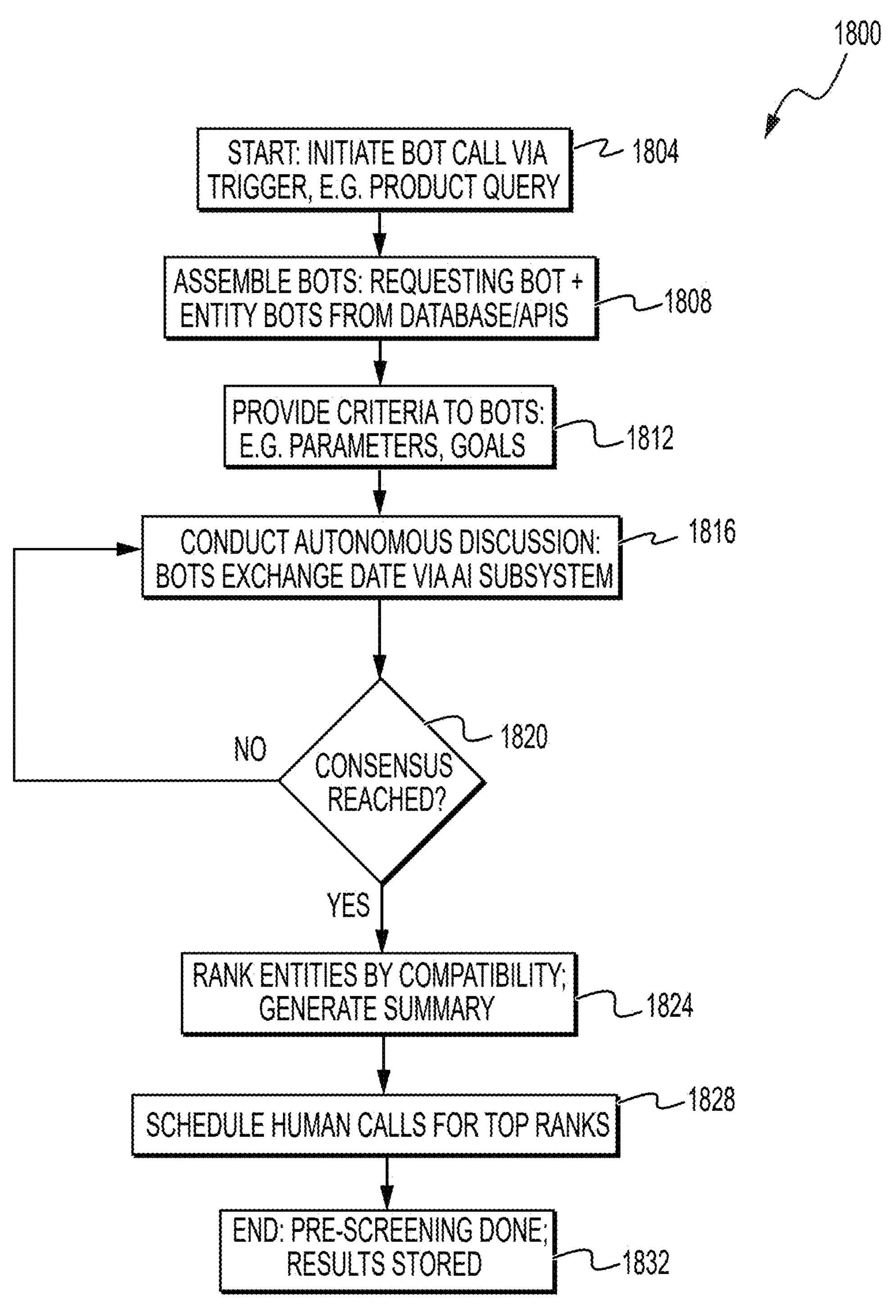
FIG. 18 is a flowchart illustrating a bot vs. bot pre-screening conference call process of an illustrative embodiment of a video conferencing system.

FIG. 18 illustrates a bot vs. bot pre-screening conference call process 1800 that addresses efficiently evaluating and ranking potential business partners, suppliers, or service providers before committing human resources to full meetings. The overall purpose of this process 1800 is to enable autonomous artificial intelligence bots to conduct preliminary negotiations, information exchanges, and compatibility assessments on behalf of their respective organizations, automatically filtering and prioritizing candidates based on predetermined criteria—all while leveraging the system's knowledge base architecture to provide contextual intelligence that would typically require extensive human preparation and multiple preliminary meetings.

This process 1800 addresses the inefficiency and resource waste that characterizes conventional business development and vendor evaluation processes, where organizations must commit significant human time to preliminary discussions with potentially unsuitable partners before determining basic compatibility. Traditional systems require multiple exploratory meetings, extensive manual research, and sequential human-to-human conversations to establish fundamental criteria matches, leading to scheduling conflicts, wasted executive time, and delayed decision-making. The static nature of conventional evaluation processes also prevents the rapid, parallel assessment of multiple candidates that could accelerate business development cycles and improve outcome quality through comprehensive comparison analysis.

The process 1800 begins at step 1804 when a bot call is initiated via a trigger, such as a product query or partnership exploration request detected by the knowledge base artificial intelligence subsystem 166 or explicitly requested through the backstage interface described in the specification. At step 1808, the system assembles the appropriate bots by requesting the initiating organization's bot plus relevant entity bots from the database 174 or external APIs, ensuring that all parties have AI representatives capable of conducting meaningful negotiations based on their stored knowledge base information 154.

At step 1812, the system provides comprehensive criteria to the assembled bots, including parameters such as budget ranges, technical requirements, timeline constraints, geographic preferences, and strategic goals derived from the requesting organization's knowledge base. This criteria provisioning utilizes the same access rights 206 and security configurations 202 that govern human participant access, ensuring that sensitive information is appropriately protected during bot interactions.

The process 1800 continues at step 1816 with the conduct of autonomous discussion, where bots exchange data via the AI subsystem using natural language processing and structured data sharing protocols. These discussions may include capability presentations, requirement clarifications, preliminary pricing discussions, and compatibility assessments, all conducted at machine speed without human intervention. The bots utilize their respective knowledge bases to provide accurate, up-to-date information about their organizations'offerings, constraints, and preferences.

A decision point occurs at step 1820, where the system evaluates whether consensus has been reached among the participating bots based on predetermined success criteria such as requirement matching, pricing alignment, or mutual interest indicators. If consensus is not reached, the process 1800 continues at step 1816 with further negotiation, potentially involving counteroffers, alternative proposals, or clarification requests that mirror human negotiation patterns but execute at accelerated timescales.

Upon reaching consensus, the process 1800 advances to step 1824, where the system ranks entities by compatibility and generates a comprehensive summary of the bot interactions, including key discussion points, areas of agreement, outstanding concerns, and recommended next steps. This ranking utilizes the artificial intelligence produced information and analytics 186 stored in the database 174 to provide sophisticated scoring based on multiple criteria weighted according to the requesting organization's priorities.

At step 1828, the system schedules human calls for the top-ranked candidates, automatically coordinating calendars and preparing briefing materials that summarize the bot negotiations and highlight the most promising opportunities. The process 1800 concludes at step 1832 with pre-screening complete and results stored in the database 174 for future reference and system learning. This automated pre-screening process transforms traditional business development from a time-intensive, sequential human activity into an efficient, parallel, AI-driven evaluation system that maximizes the value of subsequent human interactions by ensuring they focus only on the most viable opportunities.

Figure 19:
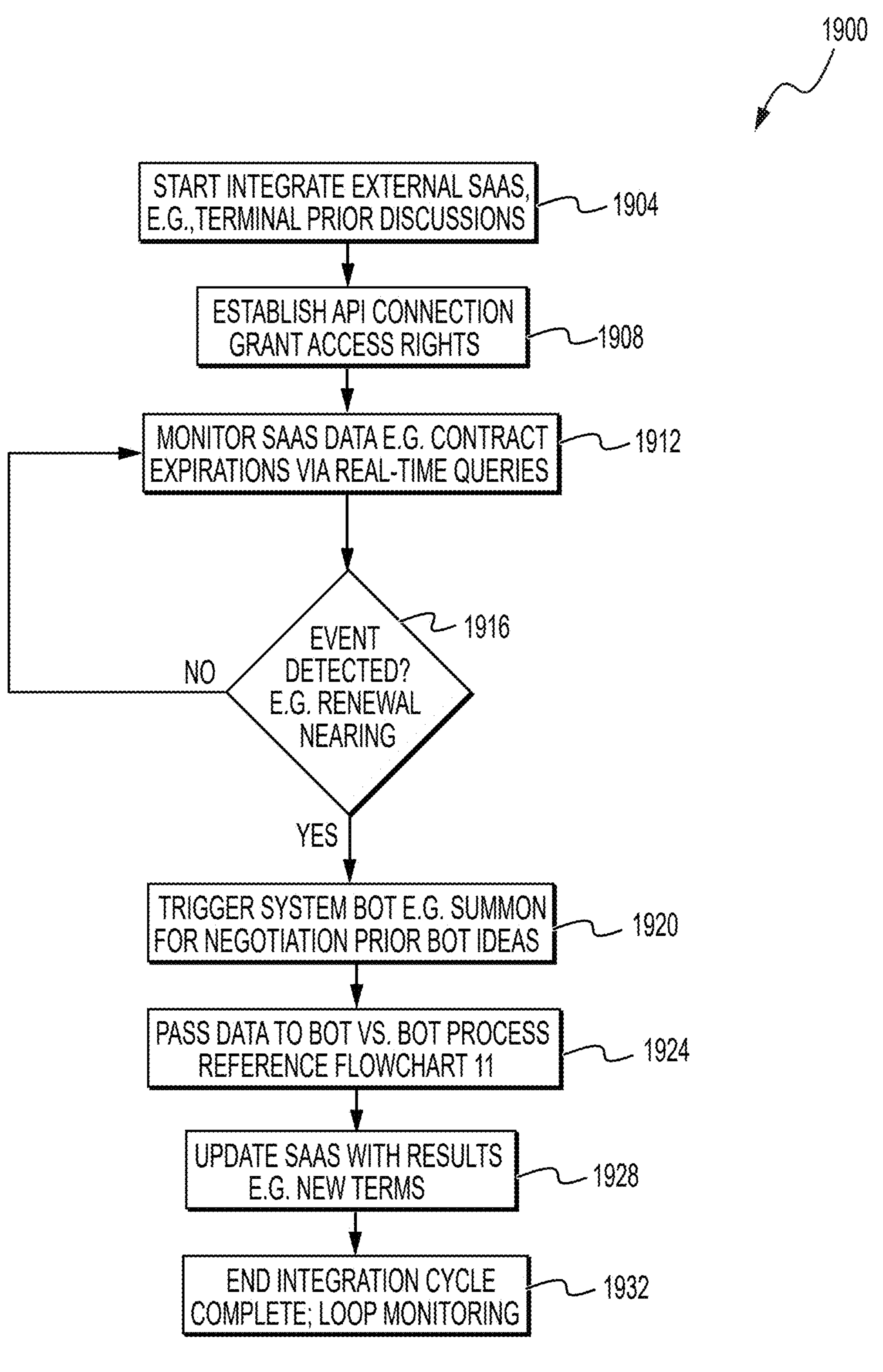
FIG. 19 is a flowchart illustrating an external SaaS integration for contract monitoring process of an illustrative embodiment of a video conferencing system.

FIG. 19 illustrates an external SaaS integration for contract monitoring process 1900 that addresses maintaining awareness of critical business events and contract obligations that occur outside the video conferencing environment while enabling automated response through intelligent bot deployment. The overall purpose of this process 1900 is to continuously monitor external Software-as-a-Service platforms for business-critical events such as contract expirations, renewal deadlines, or compliance triggers, and automatically initiate appropriate video conference responses including bot-to-bot negotiations or human meeting scheduling—all while leveraging the system's knowledge base architecture to provide contextual intelligence that transforms external data monitoring into actionable conference call workflows.

This process 1900 addresses the information silos and reactive business management that characterize conventional enterprise operations, where critical events in external systems often go unnoticed until they become urgent problems, leading to missed renewal opportunities, compliance violations, or suboptimal contract terms. Traditional systems lack the capability to bridge external data monitoring with intelligent meeting orchestration, requiring manual tracking of contract dates, separate scheduling of renewal discussions, and reactive rather than proactive business management. The disconnected nature of conventional business tools also prevents the seamless integration of external triggers with AI-powered negotiation capabilities, leading to delayed responses, missed opportunities, and inefficient resource allocation when time-sensitive business events occur.

The process 1900 begins at step 1904 when the system initiates integration with external SaaS platforms, such as contract management systems, CRM platforms, or compliance monitoring tools, establishing secure API connections that enable real-time data access. At step 1908, the system establishes API connection and grants appropriate access rights, utilizing the same security configurations 202 and access rights 206 framework described earlier in the specification to ensure that external data access complies with organizational security policies and data protection requirements.

At step 1912, the system begins continuous monitoring of SaaS data through real-time queries, tracking predetermined events such as contract expiration dates approaching within specified timeframes, renewal opportunities, compliance deadlines, or other business-critical milestones stored in the external systems. This monitoring utilizes the processors 276 executing specialized code 270 to process external data feeds and identify events that warrant automated response through the video conferencing system's capabilities.

A decision point occurs at step 1916, where the system evaluates whether a significant event has been detected based on predetermined criteria such as contract renewal dates within 30 days, compliance violations, or other business triggers configured in the database 174. If no events are detected, the process 1900 returns to step 1912 to continue monitoring. When an event is identified, the process 1900 advances to step 1920, where the system triggers a system bot specifically designed for the detected event type, such as a contract negotiation bot or compliance management bot.

At step 1924, the system passes relevant data to the bot vs. bot process, referencing the bot vs. bot pre-screening conference call process 1800 described earlier, where the triggered bot can engage with external partner bots or internal systems to address the detected event through automated negotiations, information gathering, or preliminary discussions. This integration enables the system to respond to external triggers with intelligent, automated actions that can resolve issues or advance negotiations without immediate human intervention.

The process 1900 continues at step 1928, where the system updates the external SaaS platform with results from the bot interactions, such as revised contract terms, compliance confirmations, or negotiated agreements, ensuring that the external systems reflect the outcomes of the automated processes. At step 1932, the integration cycle concludes with the system returning to monitoring mode, creating a continuous loop that enables ongoing responsiveness to external business events. This cyclical approach transforms static external system monitoring into dynamic, intelligence-driven business process automation that can proactively address critical events through the video conferencing system's AI and bot capabilities, ultimately improving business outcomes through automated vigilance and response.

Figure 20:
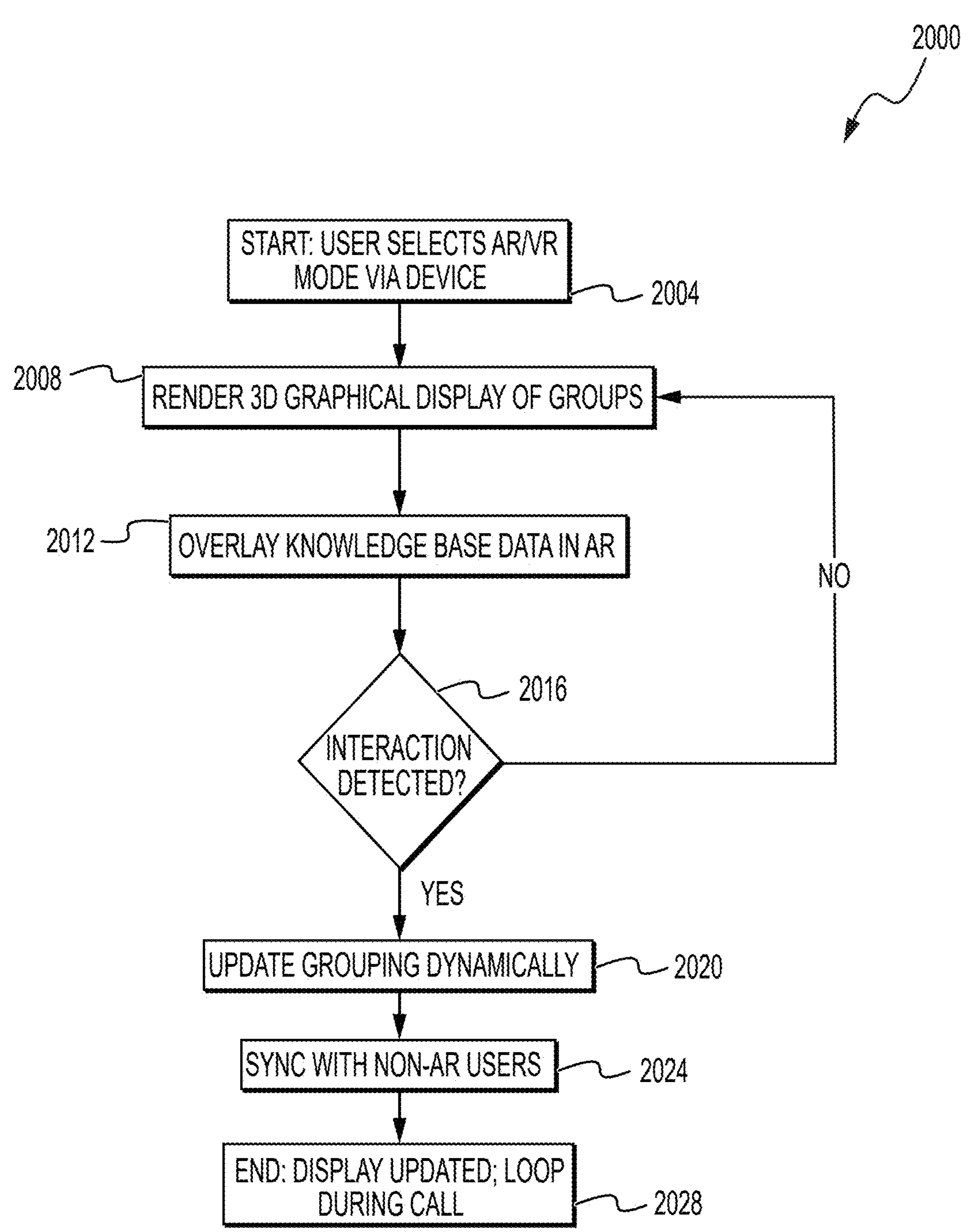
FIG. 20 is a flowchart illustrating an AR/VR enhanced grouping display process of an illustrative embodiment of a video conferencing system.

FIG. 20 illustrates an AR/VR enhanced grouping display process 2000 that addresses providing immersive, three-dimensional visualization of group-based video conferences while maintaining the organizational clarity and knowledge base integration that defines the system's core functionality. The overall purpose of this process 2000 is to enable users to experience video conferences through augmented reality or virtual reality interfaces that spatially represent participant groups in three-dimensional environments, overlay contextual knowledge base information as interactive holographic elements, and provide intuitive gesture-based controls for group management—all while synchronizing seamlessly with traditional two-dimensional displays used by non-AR/VR participants to ensure inclusive collaboration across different interface modalities.

This process 2000 addresses the spatial limitation and engagement deficit that characterizes conventional video conferencing interfaces, where participants are constrained to flat, grid-based layouts that fail to leverage human spatial cognition and natural interaction patterns. Traditional systems lack the capability to provide immersive environments that could enhance participant engagement, improve information retention, and enable more intuitive group management through three-dimensional spatial relationships. The static nature of conventional interfaces also prevents the integration of contextual information overlays that could provide real-time knowledge base data in spatially relevant locations, leading to cognitive overload when participants must switch attention between video feeds and separate information panels. This limitation becomes particularly pronounced in complex multi-group conferences where spatial organization could significantly improve comprehension of organizational relationships and information flow.

The process 2000 begins at step 2004 when a user selects AR/VR mode via their device, activating specialized rendering capabilities through compatible hardware such as VR headsets, AR glasses, or mobile devices with AR capabilities. The system utilizes the computing device's 278 enhanced graphics processing capabilities and specialized sensors to create immersive environments while maintaining network connectivity through the same cloud services 258 and SaaS interface 262 infrastructure described earlier in the specification.

At step 2008, the system renders a three-dimensional graphical display of groups, transforming the traditional two-dimensional group containers or boxes 152, 156 illustrated in FIG. 2 into spatial environments where participants appear as avatars or three-dimensional video representations organized within virtual spaces that correspond to their group affiliations. This spatial rendering utilizes the same group association logic described in the participant login and initial grouping process 800, but presents the information in immersive three-dimensional layouts that leverage depth, proximity, and spatial relationships to communicate organizational structures more intuitively than traditional flat interfaces.

The process 2000 continues at step 2012 with overlaying knowledge base data in AR, where relevant information from the knowledge base information 154 stored in database 174 is presented as interactive holographic elements, floating text panels, or three-dimensional information objects positioned contextually within the virtual environment. For example, group-specific talking points might appear as floating notes near the corresponding group's spatial location, while shared documents or collateral could be represented as interactive three-dimensional objects that participants can manipulate through gesture controls.

A decision point occurs at step 2016, where the system detects user interactions through gesture recognition, voice commands, or other input methods supported by the AR/VR hardware. These interactions might include gestures to reorganize groups spatially, voice commands to access knowledge base information, or hand movements to manipulate shared content within the three-dimensional environment. If no interaction is detected, the process 2000 continues at step 2020 to maintain the current display state.

When interactions are detected, the process 2000 advances to step 2020, where the system updates grouping dynamically, potentially referencing the dynamic group reorganization process 1000 described earlier but implementing the changes within the three-dimensional spatial environment. This might involve moving participant avatars between different spatial zones, creating new virtual meeting spaces for subgroups, or adjusting the spatial relationships between groups based on detected interaction patterns or explicit user commands.

At step 2024, the system synchronizes with non-AR users by ensuring that changes made within the immersive environment are reflected in the traditional two-dimensional interfaces used by participants who are not using AR/VR technology. This synchronization maintains the inclusive nature of the video conferencing system by ensuring that all participants, regardless of their interface choice, have access to the same information and can observe the same group organizational changes. The process 2000 concludes its current cycle at step 2028 with the display updated and synchronized, then returns to step 2008 to continue rendering and monitoring for additional interactions throughout the conference duration. This cyclical approach enables continuous adaptation of the immersive environment while maintaining seamless integration with traditional video conferencing interfaces, ultimately transforming static video conferences into dynamic, spatially-aware collaborative experiences that leverage the full potential of immersive technologies.

Figure 21:
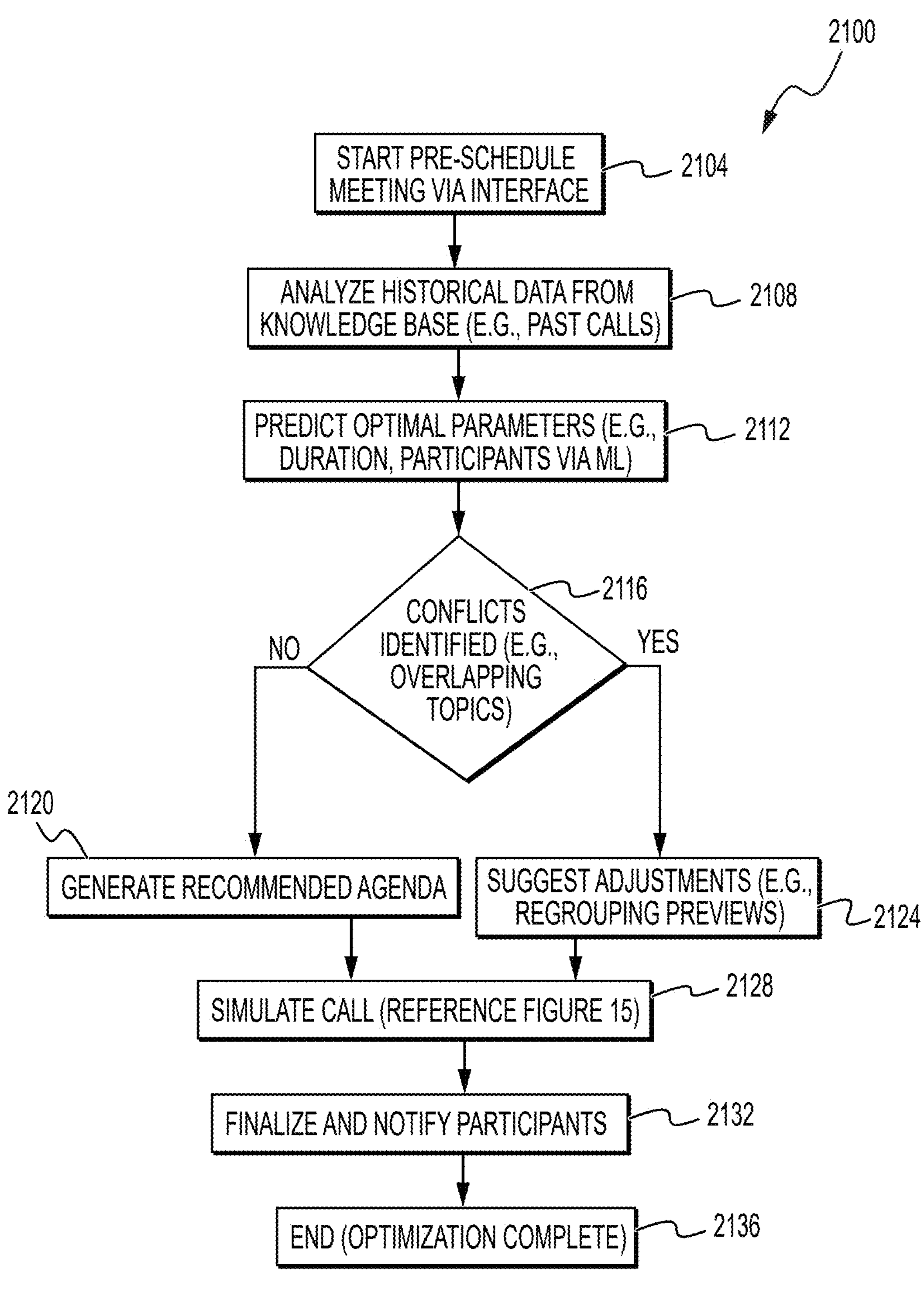
FIG. 21 is a flowchart illustrating a predictive meeting optimization process of an illustrative embodiment of a video conferencing system.

FIG. 21 illustrates a predictive meeting optimization process 2100 that addresses optimizing video conference planning and preparation through predictive modeling and artificial intelligence-driven scenario analysis. The overall purpose of this process 2100 is to enable hosts to simulate upcoming conferences before they occur by leveraging historical data, participant profiles, and AI-powered interaction modeling to identify potential issues, optimize timing and content delivery, and generate actionable recommendations for improving meeting effectiveness—all while utilizing the system's group-based knowledge architecture to provide contextually relevant insights that enhance preparation and reduce the likelihood of unproductive or inefficient meetings.

This process 2100 addresses the preparation gap that exists in conventional video conferencing systems, where hosts typically enter meetings without adequate insight into potential participant dynamics, optimal content sequencing, or likely discussion patterns that could affect meeting outcomes. Traditional systems lack the capability to simulate participant interactions, predict engagement levels, or identify potential conflicts or synergies before they occur during actual meetings. This results in suboptimal meeting planning, inefficient use of participant time, unexpected disruptions during calls, and missed opportunities to tailor content or group structures for maximum effectiveness. The static nature of conventional preparation tools also prevents hosts from understanding how different participant combinations, topic sequences, or group arrangements might affect meeting flow and outcomes.

The process 2100 begins at step 2104 when a host initiates pre-schedule meeting optimization via the backstage interface described earlier in the specification, accessing the predictive capabilities through the user interface 312 of their computing device 278. At step 2108, the system analyzes comprehensive historical data from the knowledge base information 154 stored in database 174, including previous meeting patterns between similar participant groups, engagement metrics from past conferences, and successful agenda structures that have proven effective for comparable scenarios.

At step 2112, the knowledge base artificial intelligence subsystem 166 predicts optimal parameters for the upcoming meeting using machine learning algorithms executed by the processors 276, generating recommendations for duration, participant selection, topic sequencing, and group arrangements based on historical success patterns and participant compatibility data. This predictive analysis utilizes the same AI infrastructure described in FIG. 3, extending the system's capabilities to include forward-looking optimization rather than just real-time response.

A decision point occurs at step 2116, where the system evaluates whether conflicts have been identified in the proposed meeting structure, such as overlapping topics that could cause confusion, participant combinations that have historically led to unproductive discussions, or timing constraints that might compress important agenda items. If no conflicts are detected, the process 2100 proceeds to step 2120, where the system generates a recommended agenda optimized for the predicted participant dynamics and available time constraints.

When conflicts are identified, the process 2100 advances to step 2124, where the system suggests specific adjustments to resolve the detected issues, such as regrouping participants to avoid known personality conflicts, resequencing topics to improve logical flow, or recommending alternative meeting formats that better suit the participant mix. These suggestions leverage the user/group preferences 190 and artificial intelligence produced information and analytics 186 stored in the database 174 to provide contextually appropriate recommendations.

The process 2100 continues at step 2128, where the system simulates the optimized call structure, referencing the pre-call simulation process described earlier to model how the proposed changes might affect meeting dynamics, participant engagement, and overall effectiveness. At step 2132, the system finalizes the optimization recommendations and automatically notifies participants of any changes, such as updated agendas, revised time allocations, or modified group assignments, ensuring all attendees are prepared for the optimized meeting structure.

The process 2100 concludes at step 2136 with optimization complete, having transformed traditional reactive meeting planning into proactive, data-driven preparation that maximizes the likelihood of successful outcomes. This predictive approach enables hosts to address potential issues before they occur, optimize resource allocation, and create meeting structures that are specifically tailored to the unique dynamics of the participating groups, ultimately improving meeting effectiveness and participant satisfaction through intelligent preparation and strategic planning.

Figure 22:
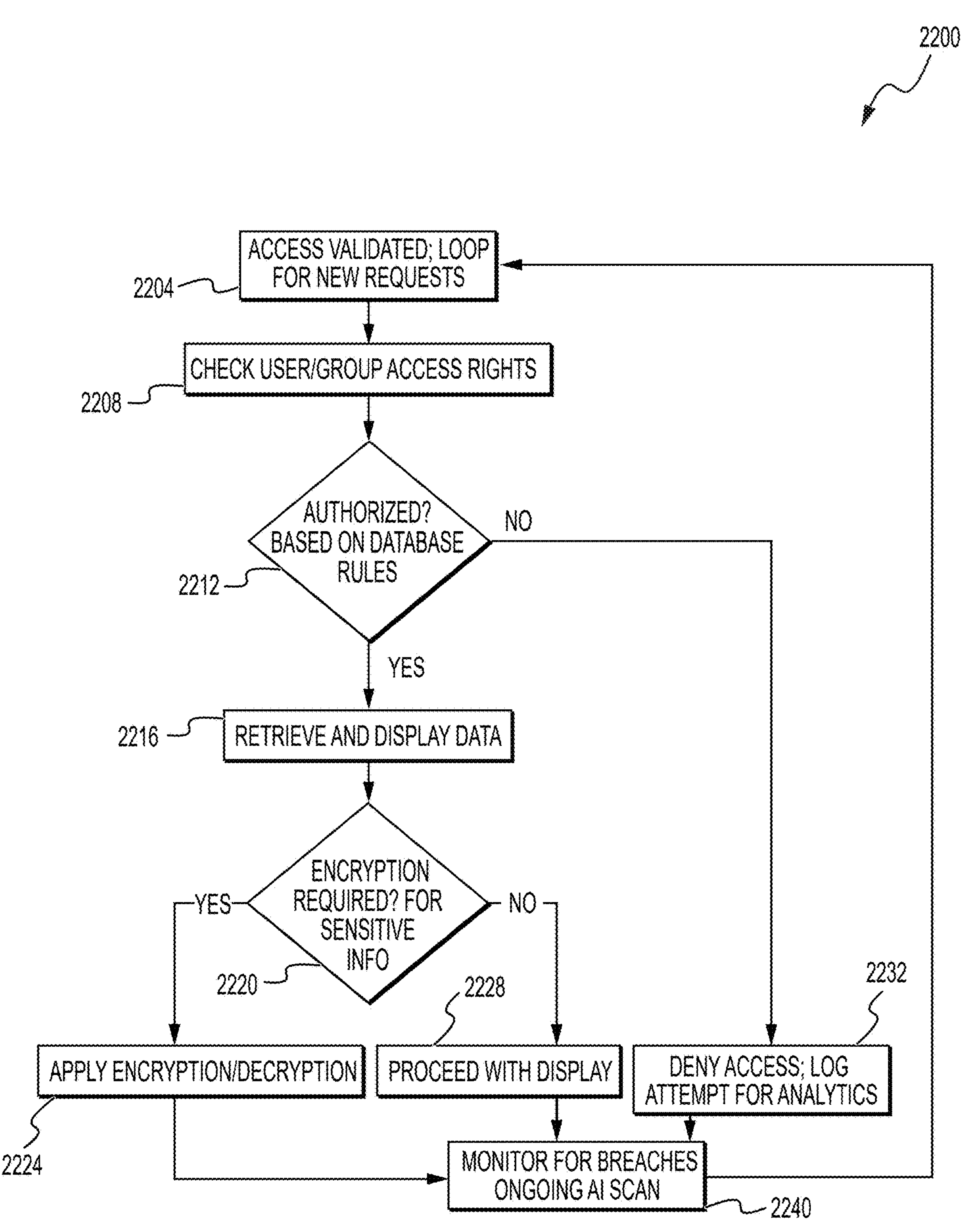
FIG. 22 is a flowchart illustrating a security and access control validation process of an illustrative embodiment of a video conferencing system.

FIG. 22 illustrates a security and access control validation process 2200 that addresses maintaining data security and privacy in group-based video conferences where sensitive information must be selectively shared based on participant authorization levels and organizational boundaries. The overall purpose of this process 2200 is to implement real-time security validation for knowledge base information requests, ensuring that only authorized participants receive sensitive data while maintaining seamless information flow during conferences—all while providing encryption for highly sensitive content and continuous monitoring for potential security breaches or unauthorized access attempts.

This process 2200 addresses the security vulnerabilities that exist in conventional video conferencing systems, where information sharing typically operates on an all-or-nothing basis without granular access controls based on participant roles, group membership, or data sensitivity levels. Traditional systems lack the capability to dynamically validate access rights for specific pieces of information during ongoing conferences, leading to either overly restrictive information sharing that hampers collaboration or overly permissive sharing that creates security risks. The static nature of conventional security models also prevents real-time adaptation to changing participant roles or evolving data sensitivity requirements during meetings, potentially exposing confidential information to unauthorized participants or preventing authorized users from accessing relevant data they need for effective participation.

The process 2200 begins at step 2204 when a request for knowledge base data occurs during an active call, typically triggered by the AI knowledge base activation process described earlier or through explicit participant requests for specific information. At step 2208, the system checks user and group access rights by querying the database 174 for the requesting participant's authorization level, group membership, and any specific permissions or restrictions associated with the requested information, utilizing the same access rights 206 and security configurations 202 framework described earlier in the specification.

A decision point occurs at step 2212, where the system determines whether the requesting participant or group is authorized to access the specific knowledge base information based on predetermined security rules, organizational policies, and data classification levels stored in the database 174. If authorization is denied, the process 2200 routes to step 2232, where the system denies access and logs the attempt for analytics purposes, creating an audit trail that can be used for security monitoring and compliance reporting while providing appropriate feedback to the requesting participant about the access restriction.

Upon successful authorization, the process 2200 advances to step 2216, where the system retrieves and prepares to display the requested data through the user interface 312, ensuring that the information is formatted appropriately for the requesting participant's group context and access level. Before final delivery, the process 2200 includes an additional security checkpoint at decision step 2220, where the system evaluates whether encryption is required for the sensitive information based on data classification rules, regulatory requirements, or organizational security policies stored in the database 174.

If encryption is not required, the process 2200 proceeds directly to step 2228, where the system displays the information in the standard graphical interface format. When encryption is required, the process 2200 advances to step 2224, where the system applies appropriate encryption or decryption protocols to protect the sensitive information during transmission and display, utilizing industry-standard security measures to ensure data protection while maintaining usability for authorized participants.

The process 2200 concludes its current cycle at step 2240, where the system implements continuous monitoring for security breaches through ongoing AI-powered scanning that detects unusual access patterns, potential data leakage, or unauthorized sharing attempts during the conference. This monitoring utilizes the same artificial intelligence capabilities described in the knowledge base artificial intelligence subsystem 166, extending the system's intelligence to include security threat detection and response. The process 2200 then returns to step 2204, creating a continuous security validation loop that ensures ongoing protection throughout the conference duration while enabling authorized information sharing that enhances collaboration and decision-making effectiveness.

Figure 23:
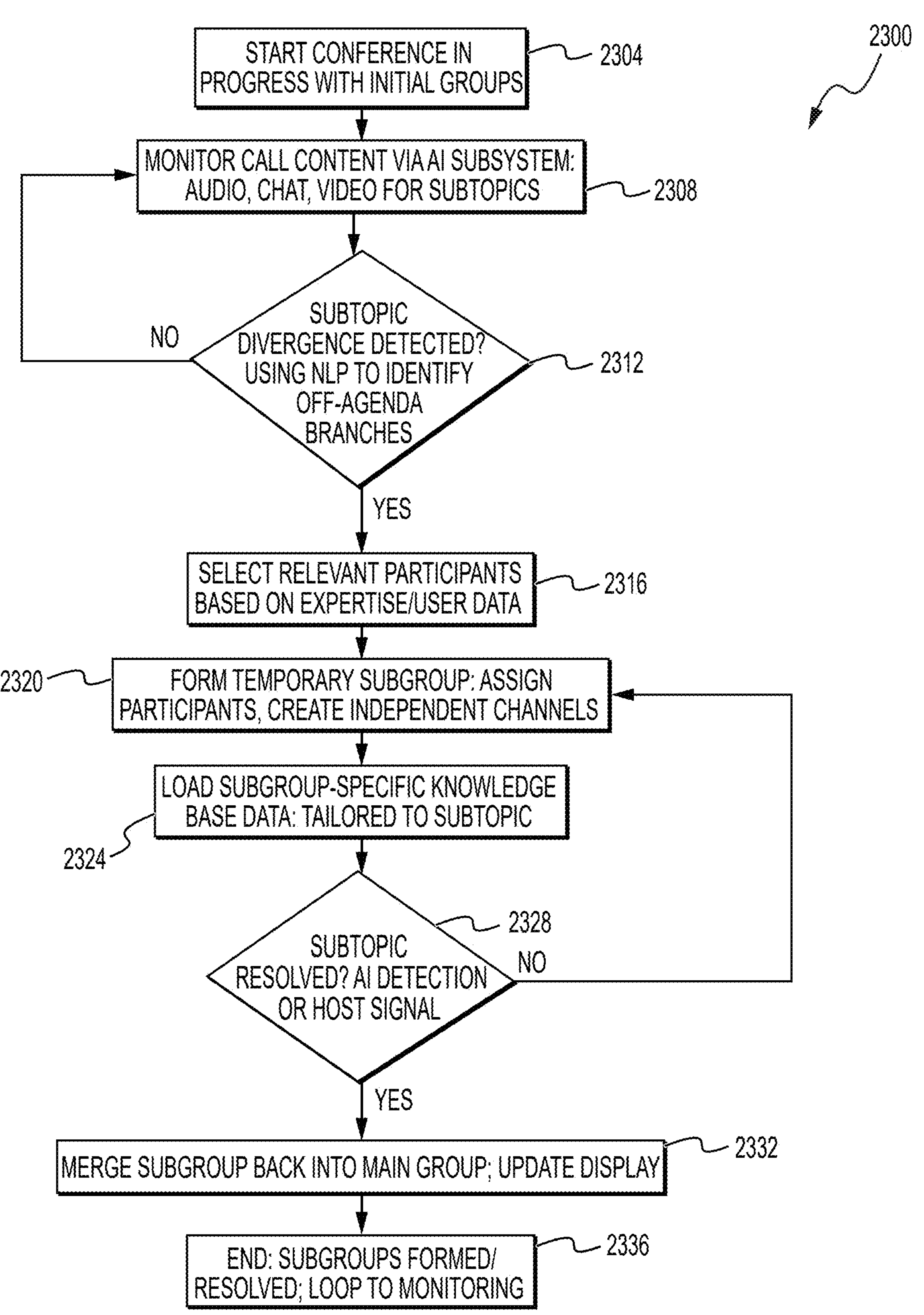
FIG. 23 is a flowchart illustrating a topic-driven adaptive subgroup formation process of an illustrative embodiment of a video conferencing system.

FIG. 23 illustrates a topic-driven adaptive subgroup formation process 2300 that addresses managing divergent discussions and specialized subtopics that emerge during multi-participant video conferences without disrupting the main meeting flow. The overall purpose of this process 2300 is to automatically detect when conversations branch into specialized subtopics or off-agenda discussions, dynamically form temporary subgroups of relevant participants based on their expertise and involvement, and enable parallel focused discussions that can later be reintegrated into the main conference—all while maintaining the organizational structure and knowledge base access that defines the system's core functionality.

This process 2300 addresses the discussion fragmentation and inefficiency that characterizes conventional video conferencing systems, where emergent subtopics either derail the main agenda by consuming time from participants who lack relevant expertise, or are deferred to separate follow-up meetings that fragment decision-making and delay progress. Traditional systems lack the intelligence to recognize when discussions naturally branch into specialized areas that would benefit from focused subgroup attention, leading to either forced participation by irrelevant attendees or missed opportunities for immediate resolution of subsidiary issues. The static nature of conventional participant management also prevents the dynamic formation of expertise-based subgroups that could address multiple parallel discussions simultaneously, ultimately reducing overall meeting efficiency and participant engagement.

The process 2300 begins at step 2304 with a conference in progress with initial groups 138 already established through the participant login and initial grouping process 800 described earlier. At step 2308, the knowledge base artificial intelligence subsystem 166 continuously monitors call content through multiple channels, including audio streams processed via natural language processing to detect topic shifts, chat messages analyzed for keyword patterns, and video feeds assessed for engagement indicators that suggest specialized interest or expertise activation among specific participants.

A decision point occurs at step 2312, where the AI subsystem determines whether subtopic divergence has been detected using natural language processing to identify off-agenda branches, semantic analysis to recognize when discussions shift from general topics to specialized areas, or engagement pattern analysis that indicates certain participants have become more active in response to specific subject matter. If no divergence is detected, the process 2300 returns to step 2308 to continue monitoring. When subtopic divergence is identified, the process 2300 advances to step 2316, where the system selects relevant participants based on expertise data stored in the database 174, historical participation patterns in similar discussions, or real-time engagement indicators that suggest specialized knowledge or interest in the detected subtopic.

At step 2320, the system forms temporary subgroups by assigning selected participants to independent communication channels while maintaining their connection to the main conference session. This subgroup formation creates parallel discussion environments with dedicated audio channels, separate chat streams, and independent screen sharing capabilities, all managed through the same user interface 312 infrastructure but logically separated to prevent interference with the main conference flow. Step 2324 involves loading subgroup-specific knowledge base information 154 tailored to the detected subtopic, ensuring that the focused discussion has access to relevant data, documentation, and resources that may not be appropriate or necessary for the broader conference audience.

The process 2300 includes a monitoring phase at decision step 2328, where the system continuously evaluates whether the subtopic has been resolved through AI detection of conclusion indicators such as decision language, consensus statements, or explicit resolution declarations, or through time-based thresholds and host signals that indicate the parallel discussion should conclude. If the subtopic remains unresolved, the process 2300 loops to step 2320, maintaining subgroup operations to allow parallel discussions to proceed independently while the main conference continues with its primary agenda.

Upon subtopic resolution, the process 2300 advances to step 2332, where the system merges the subgroup back into the main group structure, updating the graphical display through the user interface 312 to reintegrate the participants seamlessly and potentially providing a brief summary of the subgroup's conclusions to the main conference attendees. The process ends at step 2336 with sub-groups resolved. The process 2300 may return to step 2308, creating a continuous loop that enables multiple subtopic formations throughout a single conference. This cyclical approach allows the system to manage complex, multi-faceted discussions by dynamically creating and dissolving specialized subgroups as needed, ultimately transforming traditional linear conference structures into adaptive, parallel-processing collaborative environments that maximize both efficiency and expertise utilization.

Figure 24:
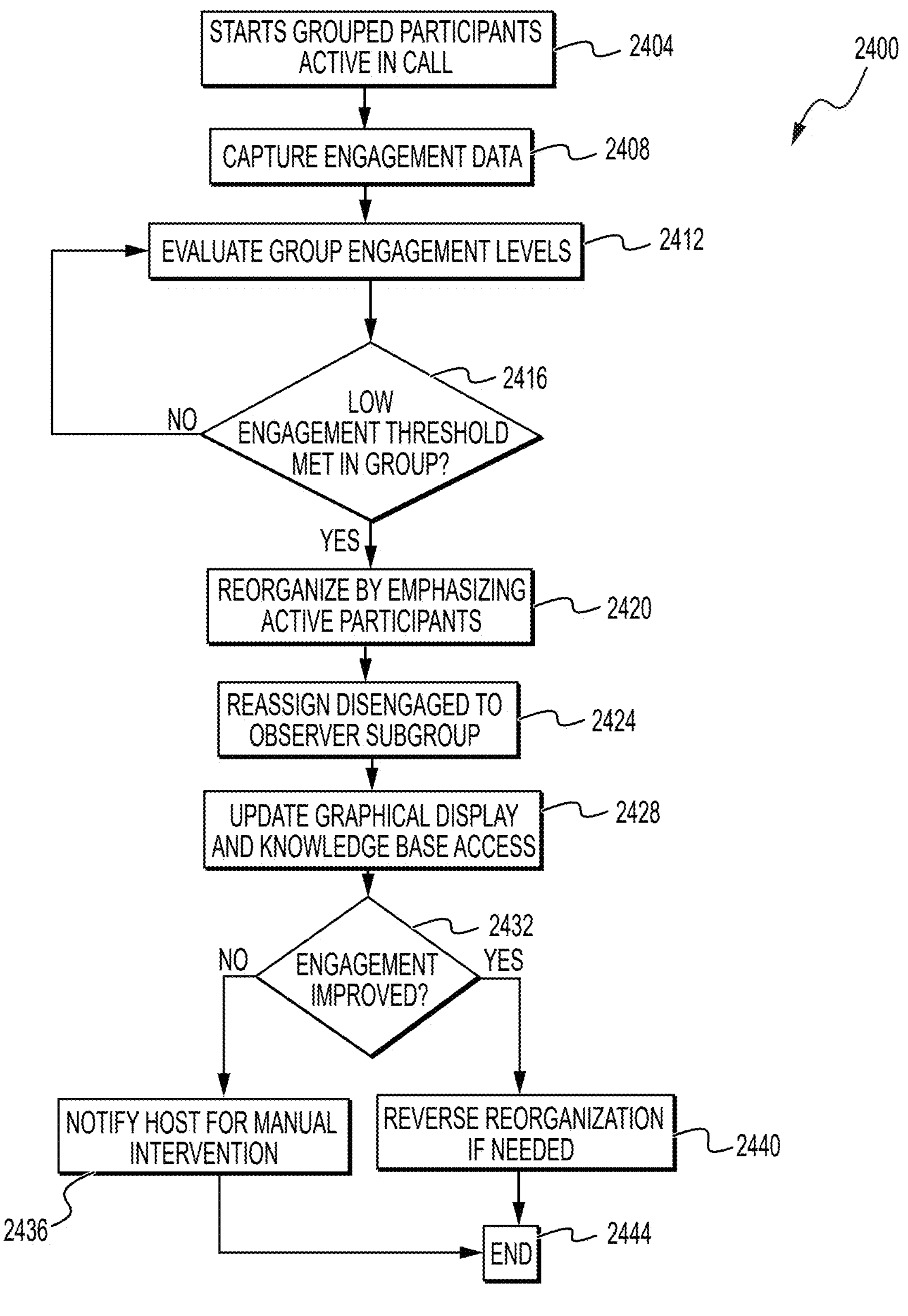
FIG. 24 is a flowchart illustrating an engagement-based participant emphasis and reorganization process of an illustrative embodiment of a video conferencing system.

FIG. 24 illustrates an engagement-based participant emphasis and reorganization process 2400 that addresses maintaining optimal participant engagement and visual prominence during video conferences by dynamically adjusting display layouts and group structures based on real-time engagement metrics. The overall purpose of this process 2400 is to continuously monitor participant engagement levels through artificial intelligence analysis of facial expressions, speaking frequency, and interaction patterns, then automatically reorganize the graphical interface to emphasize active contributors while managing disengaged participants—all while preserving the group-based organizational structure that defines the system's core functionality and ensuring that meeting productivity is maximized through intelligent participant management.

This process 2400 addresses the engagement visibility and management gap that exists in conventional video conferencing systems, where hosts and participants lack real-time insight into engagement levels across multiple participants, leading to ineffective meetings where disengaged attendees remain prominently displayed while active contributors may be visually de-emphasized in standard grid layouts. Traditional systems cannot detect when participants are mentally checked out, confused, or actively contributing, resulting in suboptimal meeting dynamics where presenters continue without awareness of audience engagement levels. The static nature of conventional display layouts also prevents the dynamic emphasis of engaged participants or the tactful management of disengaged attendees, leading to meetings where the most valuable contributors may be visually buried among passive observers, ultimately reducing overall meeting effectiveness and participant satisfaction.

The process 2400 begins at step 2404 with grouped participants active in the call, where participants are already organized into their respective groups 138 through the participant login and initial grouping process 800 described earlier. At step 2408, the system captures comprehensive engagement data through multiple channels, including facial expressions analyzed via computer vision algorithms to detect attention indicators such as eye contact with the camera, nodding, or expressions of interest versus confusion; speaking frequency and duration metrics tracked through audio analysis; and interaction patterns measured through chat participation, reaction usage, or other active engagement behaviors. This data capture utilizes the same artificial intelligence capabilities described in the knowledge base artificial intelligence subsystem 166, extending the system's monitoring to include behavioral and emotional indicators.

At step 2412, the system evaluates group engagement levels by aggregating individual participant metrics into group-wide engagement scores, enabling the identification of highly engaged groups versus groups with declining attention or participation. A decision point occurs at step 2416, where the system determines whether low engagement thresholds have been met within any group, such as when less than 50% of group members show active engagement indicators or when aggregate attention scores fall below predetermined levels stored in the database 174.

If engagement levels are satisfactory, the process 2400 returns to steps 2408 and 2412 to continue monitoring. When low engagement is detected, the process 2400 advances to step 2420, where the system reorganizes the display by emphasizing active participants through visual techniques such as enlarging their video feeds, repositioning them to more prominent locations within their group containers, or adding visual indicators like borders or highlighting that draw attention to engaged contributors. At step 2424, the system reassigns disengaged participants to an observer subgroup with reduced interaction privileges, such as smaller video feeds, muted audio capabilities, or view-only access to shared content, effectively creating a tiered participation structure that reflects actual engagement levels.

The process 2400 continues at step 2428 with updating the graphical display through the user interface 312 to reflect the new emphasis patterns and adjusting knowledge base access permissions to align with the reorganized participation levels, ensuring that highly engaged participants receive priority access to relevant information while disengaged participants have appropriately limited access. At step 2432, the system implements a feedback loop by evaluating whether engagement has improved following the reorganization, using the same metrics captured in step 2408 to assess whether the visual emphasis and privilege adjustments have successfully re-engaged participants or motivated increased participation.

If engagement improvement is detected, the process 2400 proceeds to step 2440, where the system may reverse the reorganization by restoring disengaged participants to full participation status and normalizing the display emphasis, creating a dynamic reward system that encourages sustained engagement. If engagement does not improve, the process 2400 advances to step 2436, where the system notifies the host through the backstage interface described in the specification, providing alerts about persistently disengaged participants and potentially recommending manual interventions such as direct engagement attempts or meeting structure adjustments. The process 2400 concludes its current cycle at step 2444 and then may return to step 2408 to continue the engagement monitoring loop, creating a continuous optimization system that adapts meeting dynamics in real-time based on participant behavior and attention levels, ultimately transforming static video conferences into responsive, engagement-driven collaborative environments that maximize the contribution potential of all participants.

Figure 25:
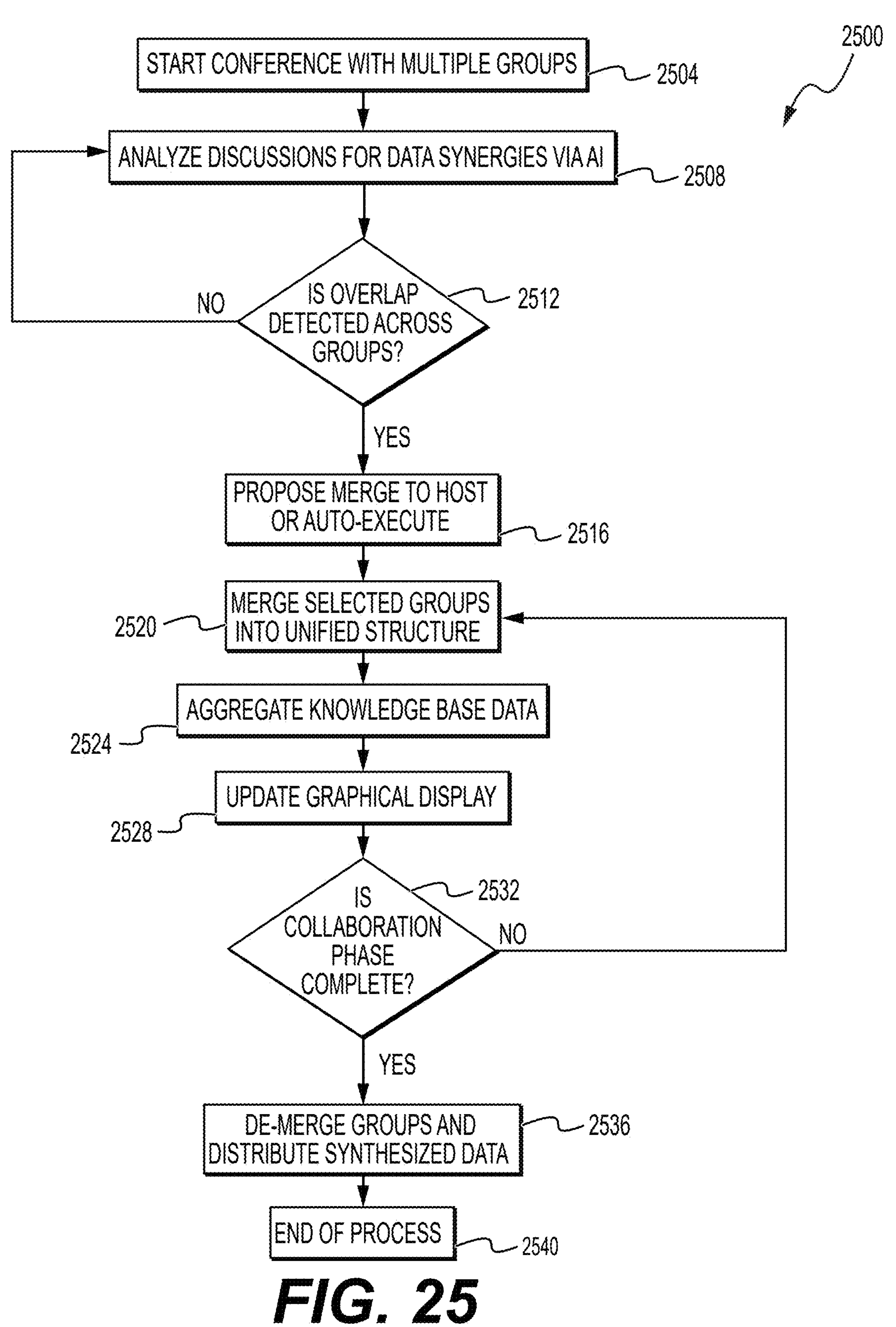
FIG. 25 is a flowchart illustrating a knowledge base-triggered group merging process of an illustrative embodiment of a video conferencing system.

FIG. 25 illustrates a knowledge base-triggered group merging process 2500 that addresses optimizing collaborative data synthesis when separate groups within a video conference are discussing overlapping or complementary topics that would benefit from unified analysis and resource sharing. The overall purpose of this process 2500 is to automatically detect when multiple groups are referencing similar knowledge base content, discussing related subject matter, or would benefit from combined expertise, then dynamically merge these groups into unified collaborative structures that aggregate their respective knowledge base resources—all while maintaining the organizational clarity and access controls that define the system's core functionality and enabling seamless de-merging once the collaborative phase concludes.

This process 2500 addresses the information fragmentation and missed collaboration opportunities that characterize conventional video conferencing systems, where separate groups may unknowingly discuss related topics, duplicate research efforts, or fail to leverage complementary expertise that exists within the same conference session. Traditional systems lack the intelligence to recognize when discussions across different groups would benefit from knowledge synthesis, leading to inefficient parallel conversations where valuable insights remain siloed within individual groups. The static nature of conventional group structures also prevents the dynamic formation of collaborative teams that could emerge when the AI system detects synergistic opportunities, ultimately reducing the overall value and efficiency of multi-group conferences where cross-pollination of ideas and resources could significantly enhance outcomes.

The process 2500 begins at step 2504 with multiple groups active in a conference, where participants are already organized into their respective groups 138 through the participant login and initial grouping process 800 described earlier. At step 2508, the knowledge base artificial intelligence subsystem 166 continuously analyzes discussions for data synergies through multiple detection mechanisms, including semantic analysis of audio content to identify shared keywords, references to similar knowledge base materials, complementary technical discussions that could benefit from combined expertise, and overlapping business objectives or project requirements mentioned during the conference.

A decision point occurs at step 2512, where the AI subsystem determines whether significant overlap has been detected across groups based on predetermined criteria such as shared terminology exceeding threshold frequencies, references to complementary knowledge base information 154 stored in the database 174, or discussion topics that align with collaborative opportunities identified through natural language processing. If no overlap is detected, the process 2500 returns to step 2508 to continue analysis. When overlap is identified, the process 2500 advances to step 2516, where the system either proposes the merge to the host through the backstage interface described in the specification or automatically executes the merge based on predefined rules and permissions stored in the database 174.

At step 2520, the system merges the selected groups into a unified collaborative structure by reassigning participants to a combined group while maintaining their individual identities and access permissions. Step 2524 involves aggregating knowledge base data from the constituent groups, synthesizing combined information such as merged talking points, consolidated collateral libraries, and integrated expertise profiles that provide the collaborative group with comprehensive resources drawn from all participating groups. This data aggregation utilizes the same access rights 206 and security configurations 202 that govern individual group access, ensuring that sensitive information remains appropriately protected even within the merged structure.

The process 2500 continues at step 2528 with updating the graphical display through the user interface 312 to reflect the new merged structure, potentially showing a combined visual container with aggregated information panels that clearly indicate the collaborative nature of the group while maintaining visual clarity about the constituent organizations. At step 2532, the system monitors the collaboration phase through continuous AI analysis to determine when the collaborative objectives have been achieved, using indicators such as consensus language, completion of joint tasks, or explicit signals from participants or hosts that the collaboration phase should conclude.

A decision point occurs at step 2532, where the system evaluates whether the collaboration phase is complete based on the monitoring results, predetermined time limits, or explicit host commands. If the collaboration continues, the process 2500 loops to step 2520 to maintain the merged operations to allow ongoing joint work. Upon completion, the process 2500 advances to step 2536, where the system de-merges the groups by restoring the original group structures while distributing the synthesized data and collaborative outcomes to all participating groups according to their access permissions and contribution levels. The process 2500 concludes its current cycle at step 2540, and then may return to step 2508 to continue monitoring for additional collaboration opportunities, creating a continuous loop that enables multiple merge-collaborate-de-merge cycles throughout a single conference, ultimately transforming static group structures into dynamic, intelligence-driven collaborative networks that maximize the value of multi-group expertise and resources.

Figure 26:
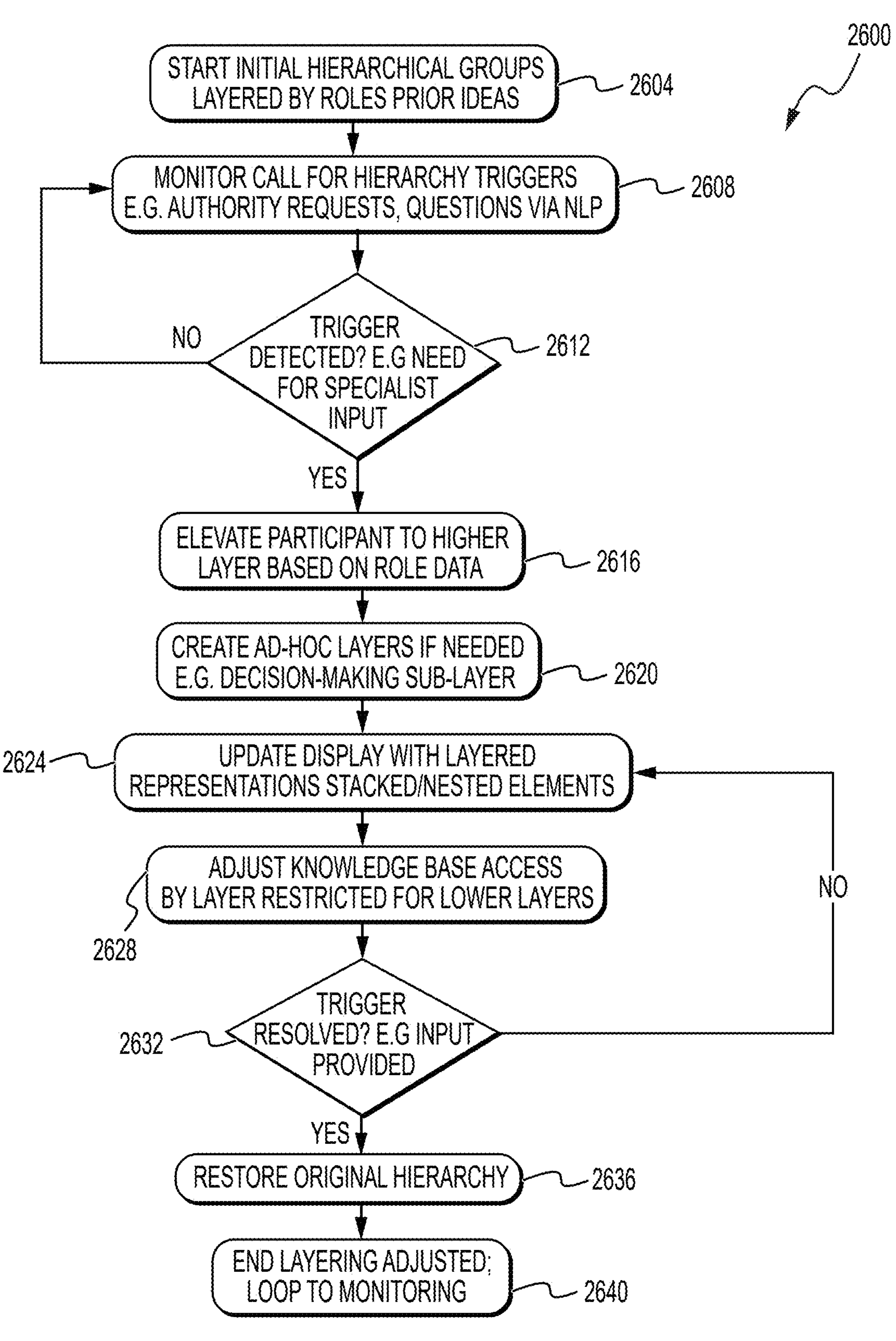
FIG. 26 is a flowchart illustrating a role-hierarchy dynamic group layering process of an illustrative embodiment of a video conferencing system.

FIG. 26 illustrates a role-hierarchy dynamic group layering process 2600 that addresses managing hierarchical organizational structures within video conferences while enabling dynamic elevation of participants based on evolving expertise needs and authority requirements. The overall purpose of this process 2600 is to organize participants into layered groups based on their organizational roles and hierarchical positions, then dynamically adjust these layers during the conference to elevate specialists for expertise input, create ad-hoc decision-making layers, or restructure authority levels—all while maintaining appropriate knowledge base access controls that reflect the hierarchical relationships and ensuring that the visual display accurately represents the organizational structure and current authority flow.

This process 2600 addresses the organizational hierarchy management gap that exists in conventional video conferencing systems, where participants are typically presented in flat, egalitarian layouts that fail to reflect real-world organizational structures, authority relationships, or expertise hierarchies that are crucial for effective business communication. Traditional systems lack the capability to dynamically recognize when lower-level specialists need to be elevated for technical input, when executive decision-making layers should be formed, or when hierarchical restructuring would improve meeting flow and decision-making efficiency. The static nature of conventional participant management also prevents the fluid elevation and demotion of participants based on evolving discussion needs, leading to inefficient meetings where valuable expertise remains buried in organizational layers or where authority structures become unclear during complex discussions requiring multiple levels of input and approval.

The process 2600 begins at step 2604 with initial hierarchical groups layered by roles, where participants are organized into distinct hierarchical levels based on their organizational positions, authority levels, or expertise areas stored in the database 174. At step 2608, the knowledge base artificial intelligence subsystem 166 continuously monitors the call for hierarchy triggers through natural language processing of audio content to detect authority requests, questions directed at specific expertise levels, or discussions that would benefit from hierarchical restructuring, such as technical queries requiring specialist input or strategic decisions requiring executive approval.

A decision point occurs at step 2612, where the AI subsystem determines whether a trigger has been detected based on predetermined criteria such as explicit requests for higher-level authority, technical questions that align with specialist expertise profiles stored in the database 174, or discussion contexts that would benefit from hierarchical adjustment. If no trigger is detected, the process 2600 returns to step 2608 to continue monitoring. When a trigger is identified, the process 2600 advances to step 2616, where the system elevates a participant to a higher layer based on their role data and the specific trigger type, such as promoting a technical specialist to an executive layer for expert testimony or creating temporary authority elevation for decision-making purposes.

The process 2600 continues at step 2620 with the creation of ad-hoc layers if needed, such as forming temporary decision-making sub-layers that bring together participants from different organizational levels for specific collaborative tasks or creating expertise-focused layers that group specialists regardless of their traditional hierarchical positions.

At step 2624, the system updates the display with layered representations through the user interface 312, presenting participants in stacked or nested visual elements that clearly communicate the current hierarchical structure, with higher layers receiving visual prominence through positioning, sizing, or special indicators that reflect their elevated status.

Step 2628 involves adjusting knowledge base access by layer, ensuring that participants in higher layers receive access to more sensitive or strategic information from the knowledge base information 154, while lower layers maintain appropriate restrictions based on their current hierarchical position and security clearance levels stored in the database 174. The process 2600 includes a monitoring phase at decision step 2632, where the system evaluates whether the trigger has been resolved, such as when the required expertise input has been provided, the decision-making phase has concluded, or the hierarchical adjustment is no longer needed based on the evolving discussion context.

Upon trigger resolution, the process 2600 advances to step 2636, where the system restores the original hierarchy by returning elevated participants to their standard organizational layers and dissolving any temporary ad-hoc layers that were created for specific purposes. If the trigger is not resolved the process 2600 loops to step 2624.

The process 2600 concludes its current cycle at step 2640, then may return to step 2608 to continue monitoring for additional hierarchy triggers, creating a continuous loop that enables multiple hierarchical adjustments throughout a single conference. This cyclical approach allows the system to adapt to complex organizational dynamics where different phases of discussion may require different authority structures, expertise elevations, or decision-making configurations, ultimately transforming static organizational hierarchies into dynamic, intelligence-driven structures that optimize both expertise utilization and authority flow based on real-time meeting needs.

Figure 27:
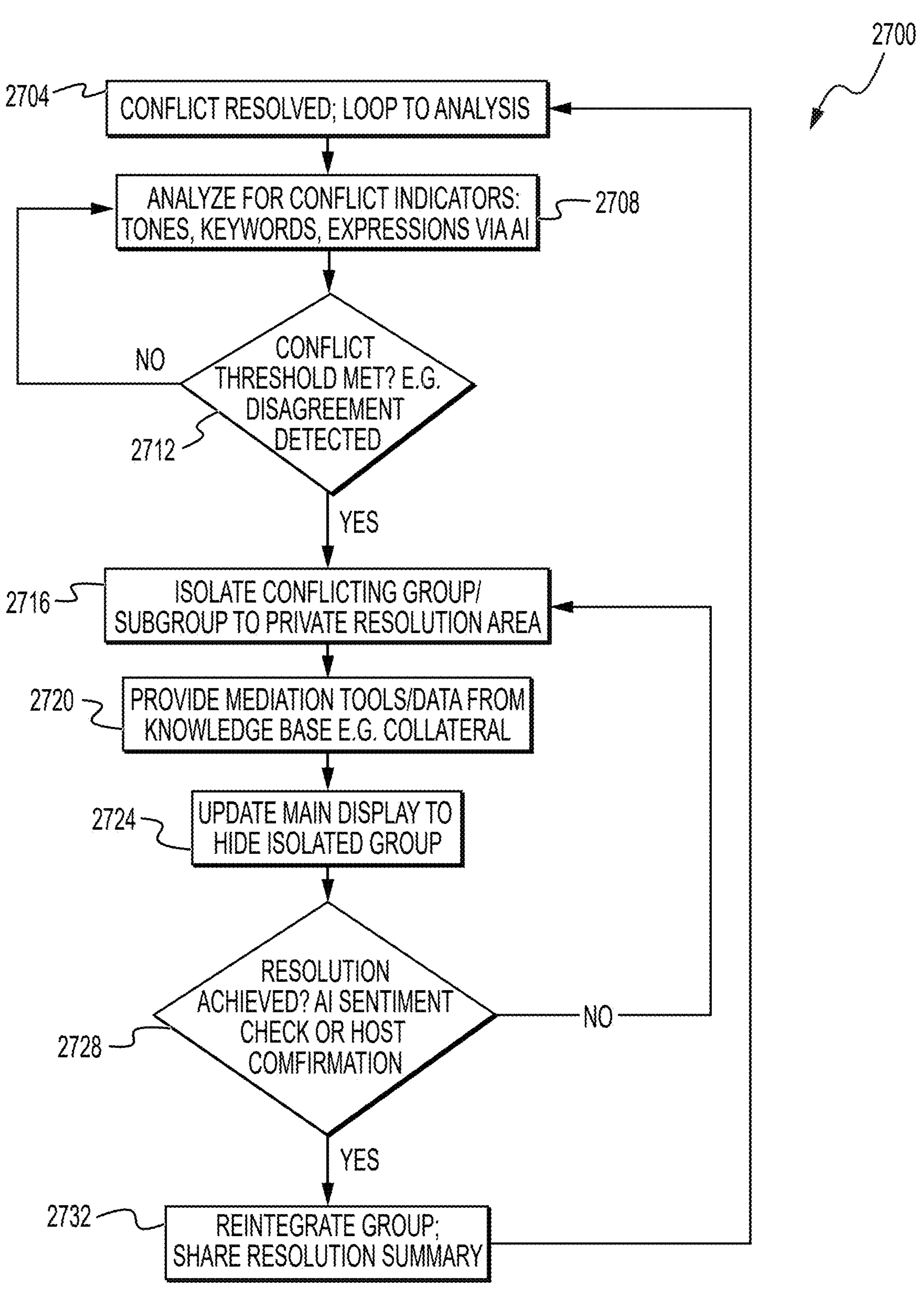
FIG. 27 is a flowchart illustrating a conflict-resolution subgroup isolation process of an illustrative embodiment of a video conferencing system.

FIG. 27 illustrates a conflict-resolution subgroup isolation process 2700 that addresses managing disagreements and contentious discussions within video conferences by automatically detecting conflict indicators and temporarily isolating conflicting participants for private resolution. The overall purpose of this process 2700 is to maintain productive meeting dynamics by using artificial intelligence to identify potential conflicts through sentiment analysis, tone detection, and behavioral indicators, then seamlessly isolating the conflicting parties into a private resolution environment while allowing the main conference to continue uninterrupted—all while providing mediation resources and ensuring smooth reintegration once the conflict is resolved.

This process 2700 addresses the disruption and productivity loss that characterizes conventional video conferencing systems when conflicts or heated disagreements arise during meetings, where such situations typically derail the entire conference for all participants, forcing hosts to either endure the disruption, manually manage complex breakout room configurations, or terminate the meeting entirely. Traditional systems lack the intelligence to detect brewing conflicts before they escalate or the capability to seamlessly isolate conflicting parties without disrupting other participants' experience. The static nature of conventional conflict management also prevents automated mediation support or intelligent reintegration strategies, leading to awkward interruptions, damaged relationships, and suboptimal meeting outcomes where valuable time is lost to interpersonal disputes rather than productive collaboration.

The process 2700 begins at step 2704 when conflict resolution is initiated, either through automatic detection by the knowledge base artificial intelligence subsystem 166 using sentiment analysis of audio tones, facial expression analysis to detect stress or anger indicators, or keyword detection for disagreement language, or through manual activation by a host who recognizes escalating tension. At step 2708, the system analyzes discussions for conflict indicators through multiple detection mechanisms, including natural language processing to identify confrontational language patterns, voice tone analysis to detect elevated stress levels, and facial recognition capabilities to identify expressions associated with frustration or disagreement.

A decision point occurs at step 2712, where the AI subsystem determines whether the conflict threshold has been met based on predetermined criteria such as sustained negative sentiment scores, multiple participants showing stress indicators simultaneously, or explicit disagreement language exceeding acceptable levels stored in the database 174. If no conflict is detected, the process 2700 returns to step 2708 to continue monitoring. When conflict indicators exceed the threshold, the process 2700 advances to step 2716, where the system isolates the conflicting group or subgroup to a private resolution area, effectively removing them from the main conference's audio and video streams while maintaining their connection to the system.

At step 2720, the system provides specialized mediation tools and data from the knowledge base information 154, such as conflict resolution guidelines, relevant policy documents, or historical examples of successful dispute resolution that may help the isolated participants work through their disagreement constructively. Step 2724 involves updating the main conference display through the user interface 312 to remove the isolated participants from the primary view, ensuring that the remaining attendees can continue their productive discussions without distraction while the conflict resolution occurs in parallel.

The process 2700 includes a monitoring phase at decision step 2728, where the system continuously evaluates whether resolution has been achieved through AI sentiment analysis to detect improved emotional states, explicit resolution statements from the participants, or host confirmation that the dispute has been satisfactorily addressed. If resolution has not been achieved, the process 2700 continues to maintain the isolation while potentially escalating to additional mediation resources or host intervention.

Upon successful resolution, the process 2700 advances to step 2732, where the system reintegrates the previously conflicting participants back into the main conference by restoring their full audio and video access and updating the graphical display to reinsert their representations seamlessly. The system may optionally provide a brief, neutral summary of the resolution to the main conference attendees, ensuring transparency while maintaining the privacy of the specific dispute details. If the conflict has not been resolved, the process 2700 loops to step 2716. The process 2700 concludes its current cycle and may return to step 2704 to create a continuous loop that enables ongoing conflict prevention and resolution throughout the conference duration, ultimately transforming potentially disruptive disagreements into managed, private resolution opportunities that preserve both relationships and meeting productivity.

Figure 28:
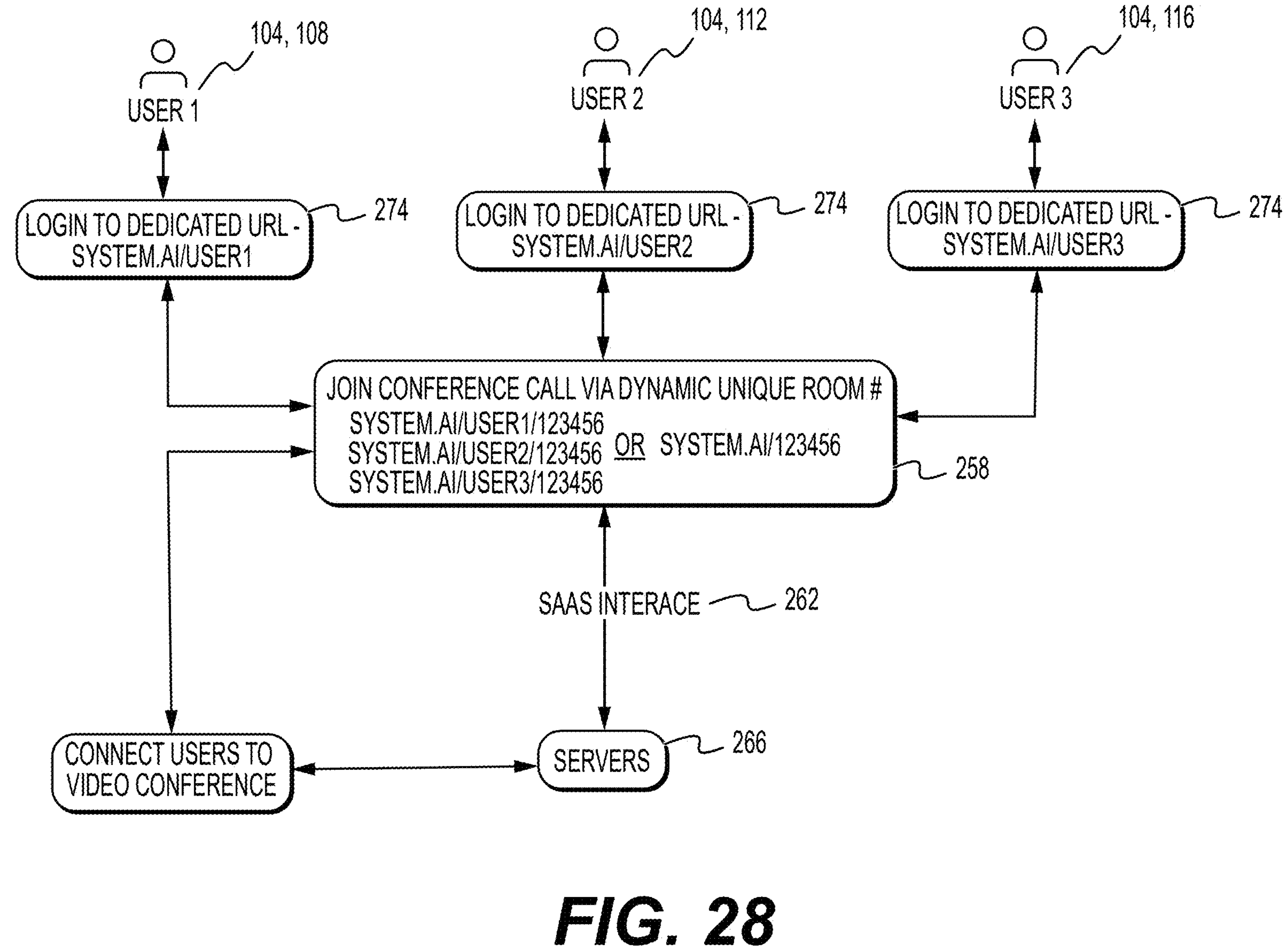
FIG. 28 is a schematic diagram illustrating a system architecture of an illustrative embodiment of a video conferencing system.
Figure 29:
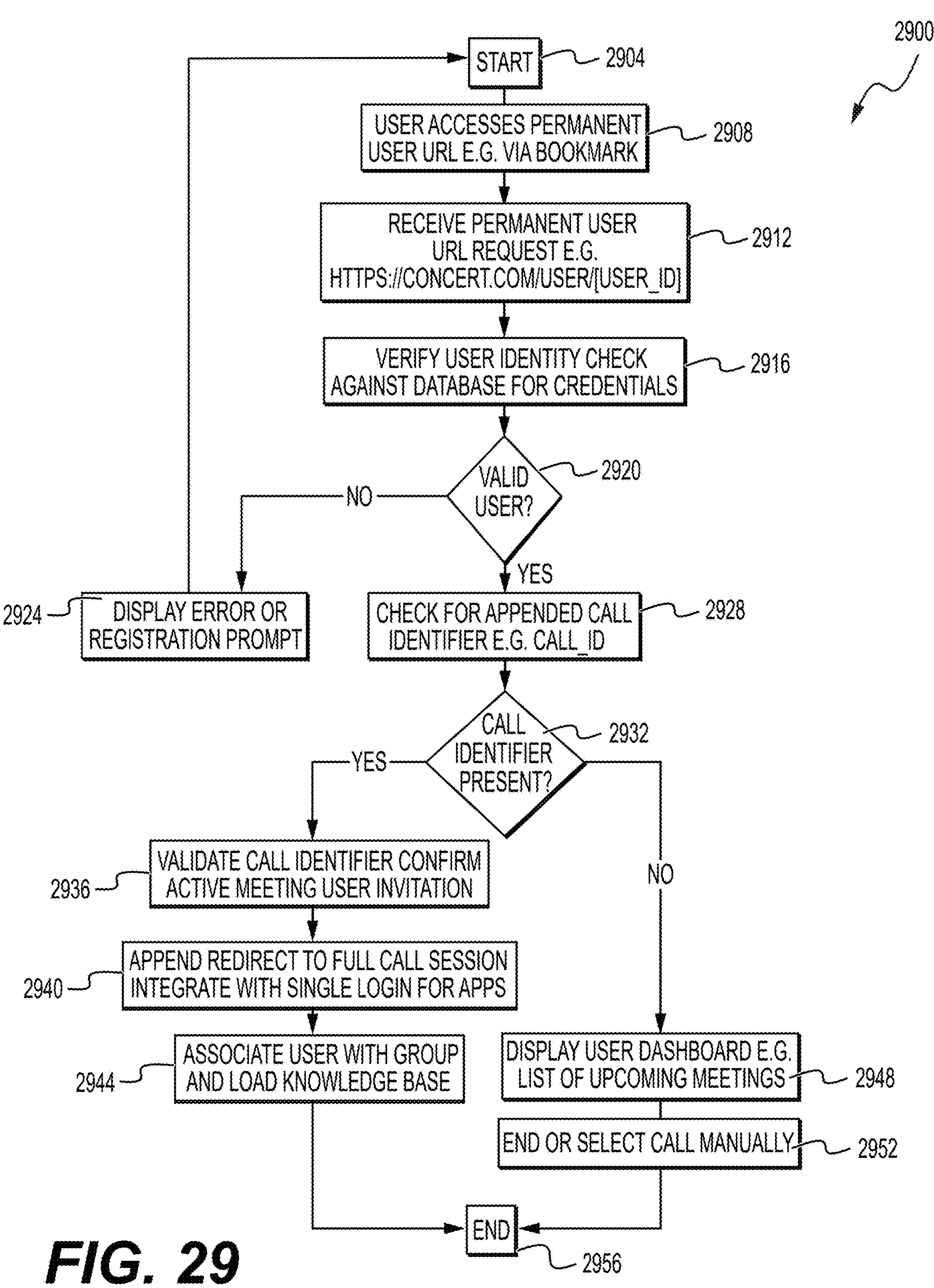
FIG. 29 is a flowchart illustrating a permanent user URL login and call appending process of an illustrative embodiment of a video conferencing system.

Referring now to FIGS. 28 and 29, FIG. 28 illustrates a system architecture diagram of an illustrative embodiment of a video conferencing system, while FIG. 29 illustrates a permanent user URL login and call appending process that addresses the challenge of simplifying user access to multiple video conferences through a unified, persistent authentication system. The overall purpose of these combined processes is to provide users with a single, permanent URL that serves as their unique entry point for all video conference activities, automatically appending dynamic call identifiers to redirect users to specific meetings while maintaining their group associations and knowledge base access—all while supporting the distributed system architecture that enables scalable, intelligent video conferencing across multiple servers and user devices.

This combined approach addresses the access complexity and credential management burden that characterizes conventional video conferencing systems, where users must remember multiple meeting links, manage separate login credentials for different platforms, and navigate various interfaces to join conferences. Traditional systems require users to bookmark numerous meeting URLs, remember different passwords for various platforms, or rely on calendar invitations with embedded links that can become outdated or inaccessible.

The fragmented nature of conventional access methods also prevents seamless integration with intelligent features like group-based organization and knowledge base access, leading to inefficient meeting preparation and reduced productivity when users struggle to access the right conference with appropriate permissions and contextual information.

The system architecture illustrated in FIG. 28 provides the foundational infrastructure that supports the permanent URL process, showing how user devices 274 connect through cloud services 258 and SaaS interface 262 to servers 266 that host the video conferencing system 100, database 174, and code 270. This distributed architecture enables the processors 276 to execute the permanent URL authentication and redirection logic while maintaining scalable access to user data, group associations, and knowledge base information 154 stored across the server infrastructure.

The permanent user URL process begins at step 2904 when a user accesses their permanent user URL, such as through a bookmarked link like "system.com/username" that remains constant regardless of which specific meetings the user needs to attend. At step 2908, a user accesses that user's permanent user URL, and at step 2912 the system receives the permanent user URL request and processes it through the network interface 316 and cloud services 258 infrastructure shown in the system architecture. Step 2916 involves verifying user identity by checking credentials against the database 174, utilizing the same authentication mechanisms described in earlier processes but streamlined through the permanent URL structure.

A decision point occurs at step 2920, where the system determines whether the user credentials are valid based on stored authentication data. If validation fails, the process routes to step 2924, displaying an error message or registration prompt through the user interface 312, then returns to the start of the process at step 2904. Upon successful authentication, the process advances to step 2928, where the system checks for an appended call identifier in the URL structure, such as a query parameter or path extension that indicates the user is attempting to join a specific conference.

At decision step 2932, the system evaluates whether a call identifier is present in the URL. If no identifier is found, the process proceeds to step 2948, where the system displays the user dashboard showing available and upcoming meetings in a graphical format, allowing the user to manually select which conference to join at step 2952 or allowing the user to end the process. This dashboard leverages the same group association logic described in earlier processes, presenting meetings organized by the user's group memberships and access permissions.

When a call identifier is present, the process continues to step 2936, where the system validates the call identifier by confirming that the meeting is active and that the user has appropriate invitation or access rights stored in the database 174. Step 2940 involves appending or redirecting to the full call session by integrating with the single login interface described in earlier processes, seamlessly connecting the user to the appropriate conference calling application 120 while maintaining their permanent URL structure.

The process advances to step 2944, where the system associates the user with their appropriate group 138 based on stored organizational data and loads relevant knowledge base information 154, utilizing the same group assignment algorithms described in the participant login and initial grouping process.

The process concludes at step 2956. This combined architecture and process transforms the traditionally fragmented experience of joining multiple video conferences into a streamlined, single-point-of-access system that maintains user convenience while enabling the full range of intelligent features provided by the group-based video conferencing system, ultimately reducing cognitive load and improving meeting accessibility through persistent, user-friendly URL management.

Figure 30:
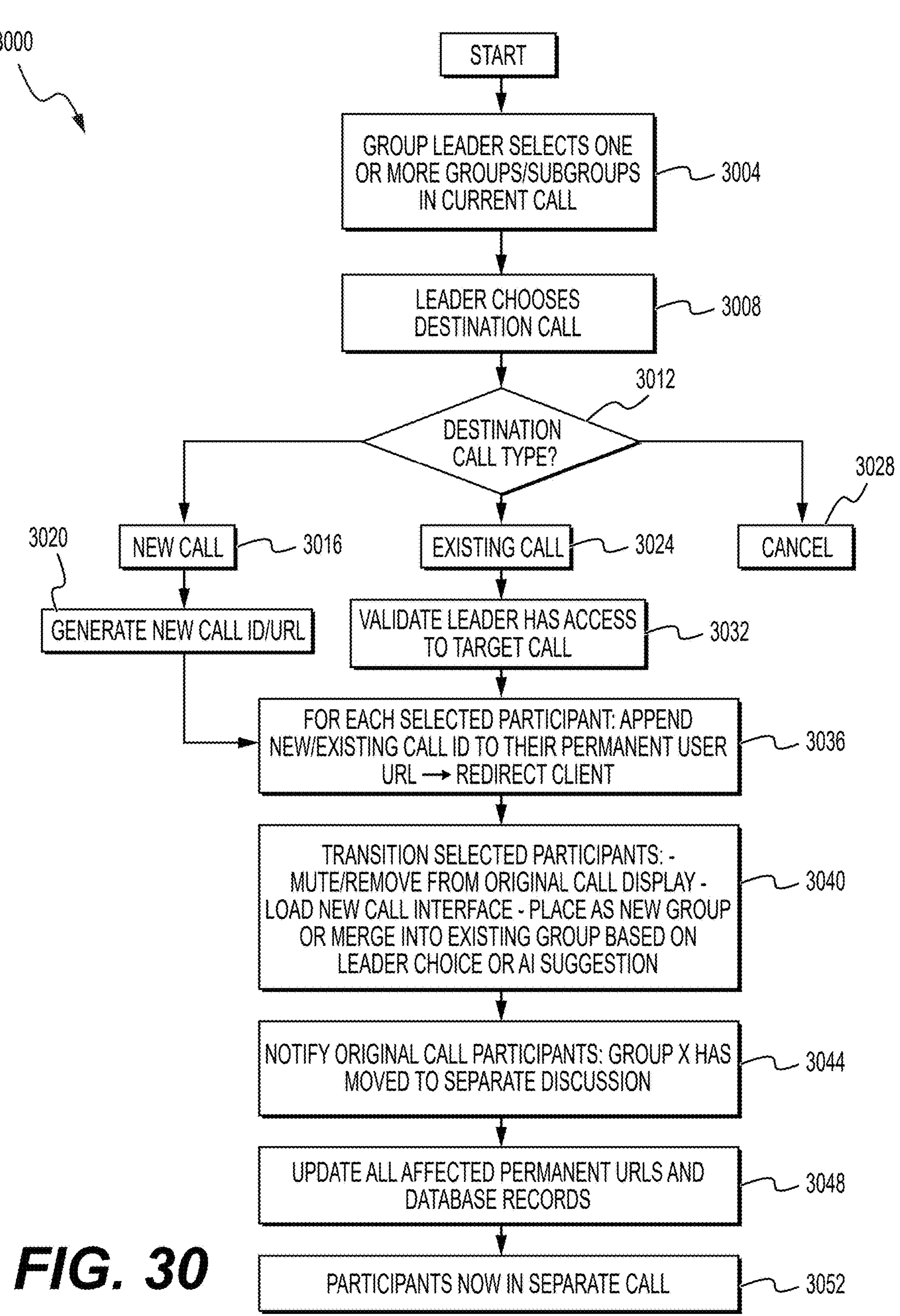
FIG. 30 is a flowchart illustrating a group leader-initiated separate conference call process of an illustrative embodiment of a video conferencing system.

FIG. 30 illustrates a group leader-initiated separate conference call process 3000 that addresses the challenge of enabling dynamic breakout discussions and executive caucuses without disrupting the main meeting flow or requiring complex coordination. The overall purpose of this process 3000 is to allow designated group 138 leaders to instantly move entire groups 138 or subgroups to new or existing separate conference calls while maintaining session continuity through the permanent user URL mechanism, automatically updating participant connections and preserving group associations—all while providing seamless redirection that eliminates the need for manual link sharing, re-authentication, or meeting coordination that typically complicates impromptu breakout sessions.

This process 3000 addresses the breakout session complexity and coordination burden that characterizes conventional video conferencing systems, where creating separate discussions typically requires manual breakout room management, complex link sharing, or entirely separate meeting scheduling that disrupts the natural flow of collaborative discussions. Traditional systems lack the capability to seamlessly transition entire organized groups between different conference sessions while maintaining their organizational structure, knowledge base access, and session continuity. The static nature of conventional meeting management also prevents the fluid movement of participants between related discussions, leading to fragmented conversations, lost context, and inefficient coordination when business discussions naturally evolve into specialized or confidential segments that would benefit from separate conference environments.

The process 3000 begins at step 3004 when a group 138 leader selects one or more groups 138 or subgroups in the current call, utilizing their leadership privileges established through the group association logic described in earlier processes and stored in the database 174. At step 3008, the leader chooses a destination call through the backstage interface described in the specification, selecting from options to create a new conference session or join an existing separate meeting that may already be in progress.

A decision point occurs at step 3012, where the system determines the destination call type based on the leader's selection. If a new call is chosen, the process 3000 advances to step 3016, where the system generates a new call ID and URL using the same infrastructure described in the permanent user URL process. If an existing call is selected, the process 3000 proceeds to step 3024 and then to step 3032 where the system validates leader access to the target call, ensuring that the requesting leader has appropriate permissions to move participants to the designated destination based on permissions stored in the database 174. If the operation is cancelled, the process 3000 terminates at step 3028.

At step 3036 the system automatically appends the new or existing call identifier to each selected participant's permanent user URL, causing their client applications to seamlessly redirect to the new call session without requiring manual intervention, link clicking, or re-authentication through the same permanent URL infrastructure described in FIG. 29.

The process 3000 continues at step 3040 with the transition of selected participants, where the system mutes and removes them from the original call display while simultaneously loading the new call interface and placing them as either a new standalone group 138 in the destination call or merging them into an existing group 138 based on leader choice or AI suggestions derived from the knowledge base artificial intelligence subsystem 166. This transition maintains the group's organizational structure and knowledge base access while adapting to the new conference environment.

At step 3044, the system notifies participants remaining in the original call that the moved group 138 has departed for a separate discussion, providing transparency about the group 138 movement without disrupting the main meeting flow. Step 3048 involves updating all affected permanent URLs and database records to reflect the new participant locations and group associations, ensuring that the system maintains accurate tracking of participant distribution across multiple concurrent conference sessions.

The process 3000 concludes at step 3052 with participants successfully established in the separate call, having maintained their group identity, knowledge base access, and organizational relationships while seamlessly transitioning to a new conference environment. This process 3000 transforms traditional breakout session management from a complex, manually-intensive coordination task into an automated, leader-controlled capability that preserves the intelligent group-based features of the video conferencing system across multiple concurrent sessions, ultimately enabling more flexible and responsive meeting structures that can adapt to evolving business discussion needs without sacrificing organizational clarity or technological sophistication.

Figure 31:
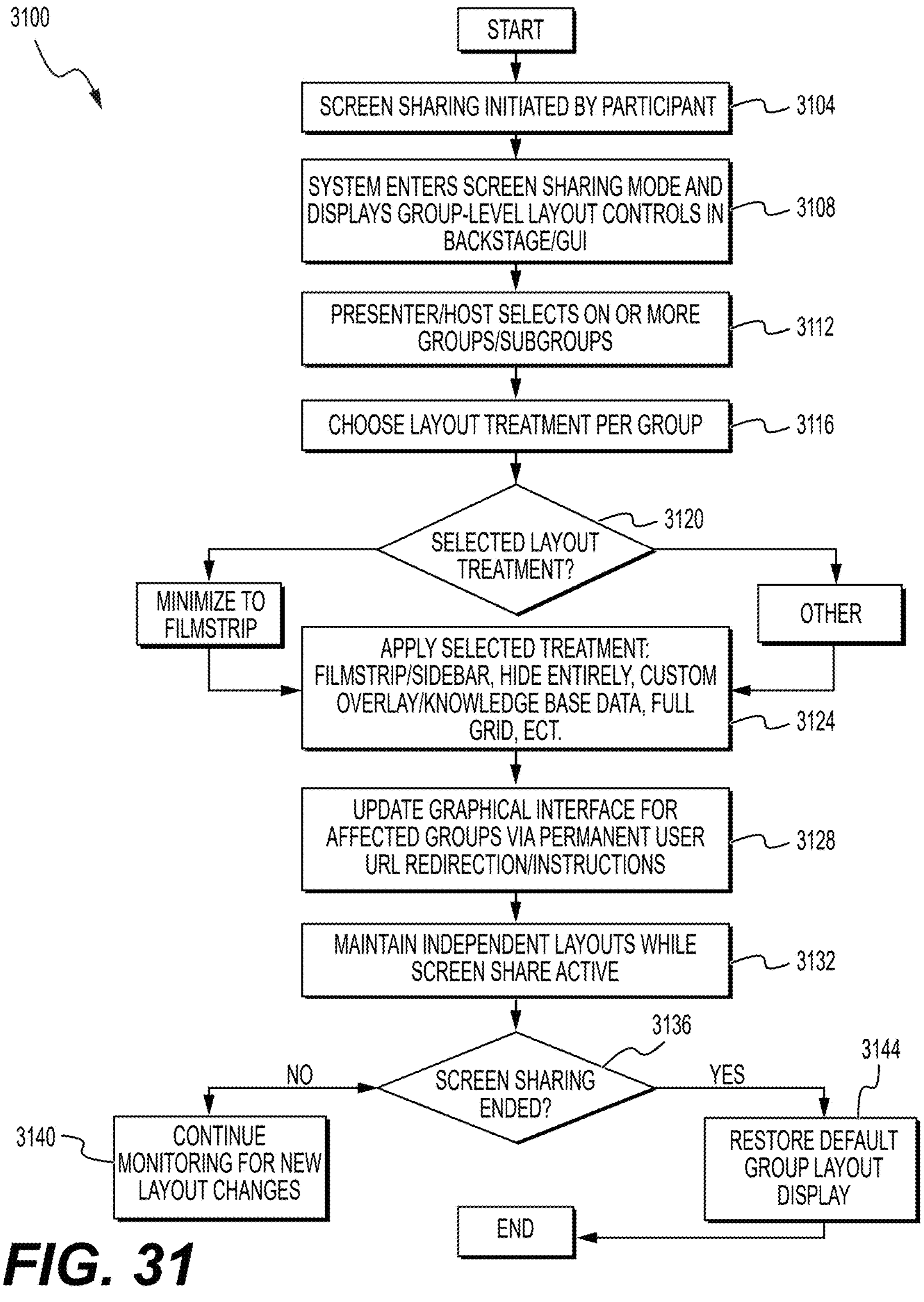
FIG. 31 is a flowchart illustrating a group-level visual layout control process during screen sharing of an illustrative embodiment of a video conferencing system.

FIG. 31 illustrates a group-level visual layout control process during screen sharing 3100 that addresses the challenge of providing customized viewing experiences for different groups during screen sharing sessions while maintaining organizational structure and meeting productivity. The overall purpose of this process 3100 is to enable presenters or hosts to independently customize the display layout of each group 138 or subgroup while a shared screen is active, leveraging the organized group structure to allow granular control over how different groups 138 view the shared content and participant feeds—all while preserving the group-based organizational principles that define the system's core functionality and ensuring that sensitive or less-relevant audiences can be appropriately managed without affecting other groups' viewing experience.

This process 3100 addresses the uniform layout limitation that characterizes conventional video conferencing systems during screen sharing, where all participants receive identical viewing experiences regardless of their organizational role, relevance to the shared content, or need for different levels of detail or emphasis. Traditional systems lack the capability to provide differentiated viewing experiences during presentations, leading to suboptimal engagement where some groups 138 may be overwhelmed with unnecessary detail while others lack sufficient focus on critical information. The static nature of conventional screen sharing also prevents hosts from tactfully managing different audience segments, such as minimizing distracting participant feeds for focused groups 138 while maintaining full visibility for collaborative groups 138, ultimately reducing the effectiveness of presentations and limiting the host's ability to tailor content delivery to diverse organizational audiences.

The process 3100 begins at step 3104 when screen sharing is initiated by a participant, activating the screen sharing capabilities within the video conferencing system while maintaining the group-based organizational structure established through earlier processes. At step 3108, the system enters screen-sharing mode and displays group-level layout control options in the backstage interface described in the specification or directly in the graphical user interface, providing the presenter or host with granular control tools that respect the existing group boundaries and hierarchical relationships stored in the database 174.

At step 3112, the presenter or host selects one or more groups 138 or subgroups for layout customization, utilizing the specialized layout control features that become available during screen sharing sessions. Step 3116 involves choosing specific layout treatments for each selected group 138, with options including minimizing a group 138 to a filmstrip or sidebar view to reduce visual distraction, completely hiding a group's participant video feeds to maximize screen sharing space, displaying a group 138 in full-grid layout for enhanced collaboration, or overlaying group-specific knowledge base annotations on the shared screen to provide contextual information relevant to that group's role or expertise.

A decision point occurs at step 3120, where the system evaluates the selected layout treatment and routes the process accordingly. For minimizing to filmstrip or other standard layout options, the process 3100 continues to step 3124, where the system applies the selected treatment by adjusting the visual presentation for the targeted groups 138 while maintaining different layouts for non-selected groups 138. This differential treatment utilizes the same graphical user interface capabilities described earlier in the specification but applies them selectively based on group membership and host preferences.

At step 3128, the system updates the graphical interface for affected groups 138 via layout redirection and instructions, ensuring that each group 138 receives their customized viewing experience through the user interface 312 of their respective computing devices 278 while maintaining the shared screen content visibility. Step 3132 involves maintaining on-screen sharing, where the knowledge base artificial intelligence subsystem 166 continues to monitor the presentation content and provide group-specific overlays, annotations, or contextual information based on the customized layout settings and each group's access permissions stored in the database 174.

The process 3100 includes a monitoring phase at decision step 3136, where the system evaluates whether the screen sharing session has ended based on presenter actions, host commands, or automatic detection of presentation conclusion. If screen sharing continues, the process 3100 moves to step 3140 to continue monitoring for new layout changes, enabling dynamic adjustment of group 138 viewing experiences throughout the presentation duration. Upon screen sharing conclusion, the process 3100 advances to step 3144, where the system restores default group layout display, returning all groups 138 to their standard viewing configurations while preserving the group-based organizational structure for continued conference activities. This process 3100 transforms traditional uniform screen sharing into a sophisticated, group-aware presentation system that enables hosts to optimize viewing experiences for different organizational audiences while maintaining the intelligent group management capabilities that define the video conferencing system's core value proposition.

Figure 32:
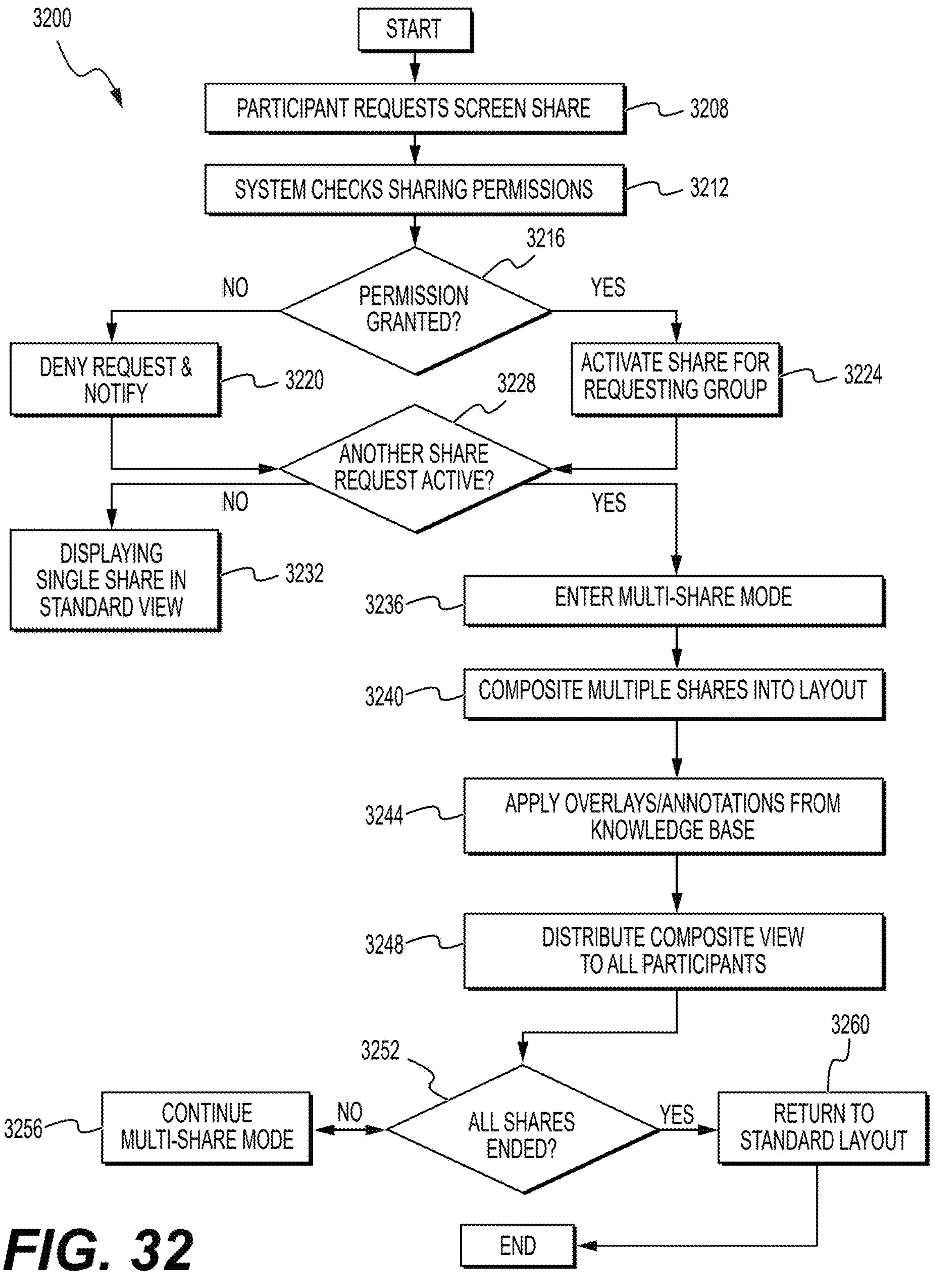
FIG. 32 is a flowchart illustrating a simultaneous multi-group screen sharing process of an illustrative embodiment of a video conferencing system.

FIG. 32 illustrates a simultaneous multi-group screen sharing process 3200 that addresses the challenge of enabling multiple participants or groups 138 to share screens concurrently while maintaining organized, group-aware display layouts that facilitate comparative analysis and collaborative workflows. The overall purpose of this process 3200 is to overcome the traditional limitation of single-screen sharing by allowing authorized participants from different groups 138 or subgroups to initiate simultaneous shares, with the system intelligently arranging the shared content in side-by-side, tiled, or overlaid views that respect group boundaries and permissions—all while leveraging AI-suggested layouts based on content analysis and providing group-specific overlays and annotations that enhance collaborative comparison and decision-making processes.

This process 3200 addresses the screen sharing bottleneck that characterizes conventional video conferencing systems, where only one participant can share their screen at a time, creating significant limitations for comparative workflows, collaborative analysis, and multi-perspective presentations that are common in business negotiations, design reviews, and training sessions. Traditional systems force participants to take turns sharing content, leading to fragmented discussions where comparative analysis becomes difficult, context is lost between screen sharing transitions, and collaborative decision-making is hampered by the inability to view multiple relevant documents or applications simultaneously. The sequential nature of conventional screen sharing also prevents real-time document comparison, side-by-side analysis of competing proposals, or parallel presentation of complementary information that could significantly enhance meeting productivity and decision quality.

The process 3200 begins at step 3208 when a participant requests screen sharing, utilizing the same screen sharing initiation mechanisms described in earlier processes but extending the capability to support multiple concurrent shares. At step 3212, the system checks group-level sharing permissions by validating the requesting participant's authorization against access rights and security configurations stored in the database 174, ensuring that only authorized users can initiate screen sharing and that their content is appropriate for the current audience composition.

A decision point occurs at step 3216, where the system determines whether permission has been granted for the screen sharing request based on the participant's group membership, role-based permissions, and any content-specific restrictions that may apply. If permission is denied, the process 3200 routes to step 3220, where the system denies the request and notifies the participant of the restriction. Upon successful permission validation, the process 3200 advances to step 3224, where the system activates screen sharing for the requesting group 138, enabling their content to be captured and processed for multi-share integration.

At decision step 3228, the system evaluates whether another share request is active, determining if this is the first screen share of the session or if multiple shares should be coordinated. If no other shares are active, the process 3200 proceeds to step 3232, where the system displays the single share in standard view using conventional screen sharing display methods. When multiple shares are detected, the process 3200 advances to step 3236, where the system enters multi-share mode, activating the specialized capabilities needed to coordinate and display multiple concurrent screen shares.

The process 3200 continues at step 3240 with compositing multiple shared screens into a unified multi-share view arranged by group 138, utilizing intelligent layout algorithms that may, for example, position Group A's document on the left half and Group B's spreadsheet on the right half of the view for direct comparison, or arrange multiple shares in tiled configurations that optimize visibility and comparative analysis. Step 3244 involves applying overlays and annotations from the knowledge base information 154, where the system may display group-specific highlights, contextual information, or analytical insights that enhance understanding of the shared content based on each group's perspective and expertise.

At step 3248, the system distributes the composite view to all participants through their respective user interfaces 312, ensuring that each participant receives the multi-share layout while maintaining their group-based organizational structure and access permissions. The process 3200 includes a monitoring phase at decision step 3252, where the system continuously evaluates whether all shares have ended based on participant actions, host commands, or automatic detection of sharing conclusion.

If shares remain active, the process 3200 continues at step 3256 to maintain multi-share mode, enabling ongoing parallel sharing with potential dynamic adjustments to layout, content emphasis, or group-specific annotations based on evolving discussion needs. Upon conclusion of all shares, the process 3200 advances to step 3260, where the system returns to standard layout by restoring the normal group-based participant display and deactivating the multi-share coordination capabilities.

This process 3200 transforms traditional sequential screen sharing into a sophisticated, parallel-sharing system that enables comparative analysis, collaborative review, and multi-perspective presentations while maintaining the group-aware organizational structure that defines the video conferencing system's core functionality, ultimately enhancing decision-making effectiveness through simultaneous content visualization and intelligent layout management.

In some embodiments, the video conferencing system 100 may include one or more summary analysis features such as providing meeting summary videos for participant review or review by non-participants, automatically transforms a recurring meeting series into an externally accessible, branded, vertical short-form video feed. Upon detection that a meeting is part of a recurring series (either by host designation, recurring calendar pattern, identical permanent URL usage, or AI inference from title/participants), the video conferencing system 100 automatically generates a plurality of 15-90 second video clips from each episode. Clips are semantically segmented, captioned, and published in a vertical scrollable feed accessible via the same permanent series URL that invited guests already possess. External participants may perform natural-language or federated cross-series searches across multiple independent organizations and receive instant clip results. Participants may tag non-attendees on specific clips, causing a personalized "Catch-Up Reels" feed to appear when the absent party later accesses the permanent URL.

In some embodiments, the video conferencing system 100 performs method comprising the steps of: detecting a meeting marked as part of a recurring series; automatically generating a plurality of short-form video clips; publishing said clips in a vertical scrollable feed accessible via permanent URL to invited external parties; permitting participants to tag non-attendees on specific clips; and delivering a personalized catch-up feed to said non-attendees. In some embodiments the method may further include the steps of cross-series searching across multiple independent organizations with host opt-in permission and delivering, as vertical-first with burned-in captions and semantic metadata for vertical scrolling, short-form videos for user viewing.

In other embodiments, the video conferencing system 100 may provide long forms of meeting summaries or archives. The user or the non-attendee may request an on-demand "remix" of the entire series history. The video conferencing system 100 receives desired duration and topic filters, semantically selects and re-sequences clips from all episodes and generates synthetic voice narration in the timbre of a designated presenter (with explicit host opt-in voice cloning) to bridge discontinuities, producing a single coherent long-form presentation that auto-updates with each new episode.

In some embodiments, the video conferencing system 100 performs a method comprising: receiving user-specified duration and topic filters; semantically selecting and resequencing video fragments from a meeting series archive; generating synthetic voice narration in the timbre of a designated presenter to bridge discontinuities; outputting a single coherent long-form video; wherein the output video auto-updates when new episodes are added; and further comprising cross-series stitching with permissioned voice blending.

In some embodiments, the video conferencing system 100 performs a method comprising the steps of ingesting a master artifact; generating multiple concurrent adaptive video streams differentiated by audience segment; routing participants to appropriate stream based on role/visual group; permitting designated humans to override AI narration in any stream in real time; wherein non-attendees receive their tailored universe on-demand via permanent URL.

A single master artifact (deck, recording, or document) is ingested and used to simultaneously generate multiple concurrent, audience-adaptive video streams differentiated by visual group membership. Each stream is narrated by AI using voice cloning (opt-in) until a human presenter overrides it from the control room interface. Non-attendees receive their personalized universe on-demand via the permanent URL.

In some embodiments, the video conferencing system 100 provides dynamic pulsed convergent or divergent audience adaptive presentation streams, the system enables dynamic "pulsing" between unified and parallel states. The master timeline contains tagged universal and group-specific segments. On host command, the audience is diverged into parallel adaptive streams according to current visual group assignments; on subsequent command, streams are converged with personalized temporal catch-up injection for any content missed during divergence. Multiple pulse cycles may occur in one session.

In some embodiments, the video conferencing system 100 performs a method comprising the steps of maintaining a master timeline with universal and segment-specific sections; on command, diverging audience into parallel adaptive streams; on subsequent command, converging all streams with personalized temporal catch-up injection; and comprising engagement-aware auto-suggestion of convergence.

In some embodiments, the video conferencing system 100 provides fluid participant drifting between parallel presentation universes with cross-universe question pining. While in a parallel universe, participants see a permission-controlled filmstrip of live thumbnails of other concurrent universes. One-click selection temporarily migrates the participant's avatar as a ghost observer to the target universe while maintaining continuity in the home stream. Upon return, a brief AI-generated recap is injected. Participants may also "ping" a question to another universe's visual group, receiving a private short-form video answer reel.

In some embodiments, the video conferencing system 100 performs a method comprising the steps of displaying live thumbnail filmstrip of permitted parallel universes; enabling one-click temporary migration of participant avatar; maintaining continuity in home stream; routing cross-universe questions to target visual group and returning answer as private short-form video; and wherein drift history is persisted on permanent series URL.

In some embodiments, the video conferencing system 100 provides document-to-searchable multimodal short-form reel library with entity-aware avatar narration. The feature illustrates any uploaded document (PDF, Word, PowerPoint, etc.) placed into a visual group tray or shared in the meeting is automatically converted into a searchable multimodal short-form reel library. The system segments the document, generates avatar-based talking-head videos for each section using photos and names extracted from the document (or from visual group membership data), and enables natural-language search that returns highlighted, spoken answer reels inheriting the visual group's permissions and branding.

In some embodiments, the video conferencing system 100 performs a method comprising the steps: ingesting a document; segmenting into logical sections; generating short-form video/audio/text reels with entity-aware avatar narration; enabling natural-language search that returns highlighted spoken answer reels; and wherein reels inherit visual-group permissions and auto-regenerate on document revision with delta notification.

In some embodiments, the video conferencing system 100 provides crystallization of adaptive presentation states into personalized branded static collateral. At session end or on demand, the system synthesizes per-participant or per-visual-group branded static collateral (PDF deck, one-pager, executive summary, HTML email, portal page) containing exactly the content each recipient experienced—including universal segments, their parallel universe track, drift history, cross-universe Q&A answers, and live human interventions—using stored brand templates and layout engines.

In some embodiments, the video conferencing system 100 performs a method comprising the steps: capturing the precise content and interactions experienced by each participant or visual group in an adaptive presentation; synthesizing branded static documents tailored to each recipient; delivering via trackable external link; and wherein collateral includes embedded short-form video answers to individual questions.

Although the present disclosure and its advantages have been disclosed in the context of certain illustrative, non-limiting embodiments, it should be understood that various changes, substitutions, permutations, and alterations can be made without departing from the scope of the disclosure as defined by the claims. It will be appreciated that any feature that is described in a connection to any one embodiment may also be applicable to any other embodiment.

What is claimed:

1. A method for conducting a video conference call performed by at least one computer processor executing computer program instructions stored on at least one non-transitory computer-readable medium, the method comprising:

receiving login information from a user;

receiving data from the user indicating the user's desire to attend a scheduled video conference call;

connecting the user to the video conference call that the user desires to attend;

associating each of a plurality of participants of the connected video conference call with a group of a plurality of groups based on stored participant data;

displaying to the user each participant of the connected video conference call in a graphical interface, wherein displaying comprises visually organizing and displaying each participant by the group associated with each participant;

monitoring the ongoing connected video conference call via a knowledge base artificial intelligence subsystem to detect relevant subject matter being discussed by the participants;

in response to detecting relevant subject matter, automatically searching a knowledge base for information relevant to the detected subject matter and associated with at least one of the groups;

displaying the relevant information from the knowledge base to at least one participant in substantial real-time during the ongoing connected video conference call; and implementing a post-call summary and analysis comprising:

upon termination of the connected video conference call, automatically collecting call data including transcripts generated through speech-to-text processing, analytics data captured during the session, or knowledge base updates that occurred during the connected video conference call, analyzing the collected call data using the knowledge base artificial intelligence subsystem using natural language processing to identify key topics, sentiment analysis to gauge discussion tone, or semantic analysis to extract meeting insights, determining whether action items have been detected within the analyzed call data based on linguistic patterns including commitment language, deadline references, or task assignments, when action items are identified, extracting and prioritizing the action items, and generating a post-call report that integrates the meeting insights with identified action items, relevant historical context from previous meetings between the same groups, comparative data from similar discussions, or supplementary information from the knowledge base.

2. The method of claim 1, wherein associating each of the plurality of participants with the group comprises, automatically determining group membership based on the stored participant data including at least one of company affiliation, organizational role, team assignment, or project association.

3. The method of claim 1, wherein:

monitoring the ongoing connected video conference call via the knowledge base artificial intelligence subsystem comprises:

analyzing multiple data streams associated with the ongoing connected video conference call including audio content processed through natural language processing, video feeds analyzed for visual cues, or chat messages parsed for keywords and context, and detecting relevant subject matter based on predetermined triggers including specific keywords mentioned by participants, questions posed during discussions, or topics that align with available knowledge base content; and wherein displaying the relevant information comprises:

verifying that the at least one participant has appropriate access authorization based on security configurations and access rights stored in a database, and presenting the relevant information through the graphical interface in a group-specific display area.

4. The method of claim 1, further comprising the step of dynamically reorganizing membership of the plurality of groups during the ongoing connected video conference call.

5. The method of claim 4, wherein dynamically reorganizing the membership of the plurality of groups during the ongoing connected video conference call comprises:

analyzing real-time conference call data including audio content processed through natural language processing, video feeds analyzed for engagement patterns, or participant interaction metrics;

detecting a reorganization trigger based on predetermined criteria including topic shifts identified through semantic analysis, changes in participant engagement levels, or explicit reorganization requests;

upon detecting the reorganization trigger, automatically reassigning one or more participants from an initial group to a merged group or subgroup based on the detected criteria to form a new group structure; and updating the graphical interface in real-time to reflect the new group structure.

6. The method of claim 1, further comprising the step of providing a permanent user URL login.

7. The method of claim 6, wherein the step of providing the permanent user URL login comprises:

providing the user with a permanent user URL that serves as a unique, persistent entry point for authentication and meeting access;

storing the permanent user URL in a database upon user registration;

receiving a request when the user accesses the permanent user URL;

verifying user identity by checking user credentials against user authentication data stored in the database;

determining whether a call identifier is appended to the permanent user URL;

when no call identifier is present, displaying to the user a user dashboard showing available and upcoming meetings organized by the user's group memberships and access permissions; and when a call identifier is present, validating the call identifier by confirming that a video conference call associated with the call identifier is active and that the user has appropriate access rights and connecting the user to the video conference call associated with the call identifier.

8. The method of claim 1 further comprising the steps of:

dynamically reorganizing the plurality of groups during the ongoing connected video conference call;

implementing a post-call summary and analysis; and providing a permanent user URL login.

9. A video conferencing system comprising:

at least one processor; and at least one non-transitory computer-readable medium storing computer program instructions that, when executed by the at least one processor, cause the system to:

receive user login information, connect the user to a selected video conference call via one of a plurality of different conference call applications, organize a plurality of participants of the selected video conference call into a plurality of groups based on stored participant data, generate a graphical user interface that visually displays each participant of the selected video conference call organized by the groups to which the participants are assigned, monitor ongoing audio or text communications during the selected video conference call, search a knowledge base containing information associated with at least one of the plurality of groups for relevant information based on detected keywords or topics from the monitored audio or text communications, and display a least a portion of the relevant information from the knowledge base to at least one participant of the selected video conference call based on group membership and access permissions while the selected video conference call is ongoing; and wherein the computer program instructions further cause the system to:

provide each user with a permanent user URL that serves as a unique, persistent entry point for authentication and meeting access, store the permanent user URL in a database upon user registration, receive a request when the user accesses the user's permanent user URL, verify user identity by checking credentials against authentication data stored in the database, determine whether a call identifier associated with the selected video conference call is appended to the permanent user URL, when no call identifier is present, display to the user a user dashboard showing the user's available video conference calls, and when a call identifier is present, validate the call identifier by confirming that the selected video conference call associated with the call identifier is active and that the user has appropriate access rights to the selected video conference call associated with the call identifier and automatically connect the user to the selected video conference call associated with the call identifier.

10. The video conferencing system of claim 9, wherein the computer program instructions further cause the system to:

detect a reorganization trigger in the ongoing audio or text communications based on predetermined criteria;

upon detecting the reorganization trigger, create a new group structure by automatically reassigning one or more participants of the selected video conference call from an initial group to a new group based on the detected criteria; and update the graphical user interface in real-time to reflect the new group structure.

11. The video conferencing system of claim 9, wherein the computer program instructions further cause the system to:

upon termination of the selected video conference call, automatically collect call data including transcripts generated through speech-to-text processing, analytics data captured during the selected video conference call, or knowledge base updates that occurred during the selected video conference call;

analyze the collected call data using natural language processing to identify key topics, sentiment analysis to gauge discussion tone, or semantic analysis to extract insights;

update the knowledge base with the extracted insights;

determine whether action items have been detected within the collected call data based on linguistic patterns including commitment language, deadline references, or task assignments;

when action items are identified, extract and prioritize the action items based on factors including deadline urgency, participant seniority, or strategic importance determined through knowledge base context; and generate a post-call report that integrates at least a portion of the extracted insights with identified action items, relevant historical context from previous meetings between the same groups, comparative data from similar discussions, or supplementary information from the knowledge base.

12. The video conferencing system of claim 9, wherein the computer program instructions further cause the system to:

detect when sensitive discussions are occurring during the selected video conference call through automatic keyword detection or manual host activation;

select one or more groups for isolation based on predetermined criteria or host selection;

transition the selected one or more groups to a virtual waiting room state where the members of the selected one or more groups cannot access audio, video, chat, or shared content of the selected video conference call;

display a holding screen or message to the members of the selected one or more groups; and upon completion of the sensitive discussion, reintegrate the selected one or more groups into the selected video conference call by restoring full audio and video access to the selected one or more groups.

13. A method for managing participants in a video conference call performed by at least one computer processor executing computer program instructions stored on at least one non-transitory computer-readable medium, the method comprising:

organizing a plurality of participants of the video conference call into a plurality of groups based on participant data using an artificial intelligence process;

displaying the plurality of participants in a graphical interface with visual organization by group;

accessing a knowledge base database containing information associated with at least one of the plurality of groups or information associated with at least one of the plurality of participants;

monitoring communications during the video conference call using the artificial intelligence process;

automatically providing relevant information from the knowledge base database through the graphic user interface to at least one participant during the video conference call based on the monitored communications using the artificial intelligence process; and isolating at least one group from audio and video access during a portion of the video conference call, in response to the artificial intelligence process detecting a sensitive discussion occurring during the ongoing video conference call.

14. The method of claim 13, further comprising the step of dynamically reorganizing the plurality of groups during the video conference call, wherein the step of dynamically reorganizing the plurality of groups is performed by the artificial intelligence process in response to the artificial intelligence process detecting criteria for reorganization during the ongoing video conference call.

15. The method of claim 13, further comprising the step of generating an automated summary after completion of the video conference call in which the artificial intelligence process analyzes call data collected while the video conference call was ongoing and the information contained within the knowledge base database to generate the automated summary.

16. The method of claim 13, further comprising the step of providing at least one participant with a persistent access identifier associated with the video conference call.

* * * * *